US011139707B2

United States Patent
Klassen

(10) Patent No.: US 11,139,707 B2
(45) Date of Patent: *Oct. 5, 2021

(54) AXIAL GAP ELECTRIC MACHINE WITH PERMANENT MAGNETS ARRANGED BETWEEN POSTS

(71) Applicant: GENESIS ROBOTICS AND MOTION TECHNOLOGIES CANADA, ULC, Langley (CA)

(72) Inventor: James Brent Klassen, Surrey (CA)

(73) Assignee: Genesis Robotics and Motion Technologies Canada, ULC, Langley (CA)

( * ) Notice: Subject to any disclaimer, the term of this patent is extended or adjusted under 35 U.S.C. 154(b) by 226 days.

This patent is subject to a terminal disclaimer.

(21) Appl. No.: 16/317,726

(22) PCT Filed: Jul. 14, 2017

(86) PCT No.: PCT/CA2017/050857
§ 371 (c)(1),
(2) Date: Jan. 14, 2019

(87) PCT Pub. No.: WO2018/010031
PCT Pub. Date: Jan. 18, 2018

(65) Prior Publication Data
US 2019/0288580 A1 Sep. 19, 2019

Related U.S. Application Data

(63) Continuation-in-part of application No. 15/235,088, filed on Aug. 11, 2016, now Pat. No. 10,476,323.
(Continued)

(51) Int. Cl.
*H02K 1/22* (2006.01)
*H02K 1/27* (2006.01)
(Continued)

(52) U.S. Cl.
CPC .......... *H02K 1/2793* (2013.01); *F16C 19/10* (2013.01); *F16C 19/49* (2013.01); *F16C 19/545* (2013.01);
(Continued)

(58) Field of Classification Search
CPC ............ H02K 1/02; H02K 1/182; H02K 1/12; H02K 1/22; H02K 1/223; H02K 1/24;
(Continued)

(56) References Cited

U.S. PATENT DOCUMENTS

| 2,665,243 A | 1/1954 | Young et al. |
| 3,383,534 A | 5/1968 | Ebbs |

(Continued)

FOREIGN PATENT DOCUMENTS

| CA | 2187096 C | 6/2004 |
| CN | 102624108 A | 8/2012 |

(Continued)

OTHER PUBLICATIONS

Extended European search report received for EP application No. 17826733.2, dated Jun. 26, 2020, 9 pages.
(Continued)

*Primary Examiner* — Burton S Mullins

(57) ABSTRACT

An electric machine has a stator having an array of electromagnetic elements. A rotor is mounted on bearings and has an array of rotor posts. The rotor posts each have a length defining opposed ends and the array of rotor posts extends along the rotor in a direction perpendicular to the length of each of the rotor posts. The rotor has electromagnetic elements defining magnetic poles placed between the plurality of rotor posts. An airgap is formed between the rotor and the stator when they are in an operational position. A (Continued)

plurality of rotor flux restrictors are formed on the rotor, and each lies adjacent to one of the opposed ends of the rotor posts.

16 Claims, 43 Drawing Sheets

Related U.S. Application Data

(60) Provisional application No. 62/383,202, filed on Sep. 2, 2016, provisional application No. 62/460,086, filed on Feb. 16, 2017, provisional application No. 62/322,217, filed on Apr. 13, 2016, provisional application No. 62/292,860, filed on Feb. 8, 2016, provisional application No. 62/209,333, filed on Aug. 24, 2015, provisional application No. 62/203,903, filed on Aug. 11, 2015.

(51) Int. Cl.
  *H02K 1/32* (2006.01)
  *H02K 7/08* (2006.01)
  *H02K 21/24* (2006.01)
  *H02K 1/14* (2006.01)
  *F16C 19/10* (2006.01)
  *F16C 19/54* (2006.01)
  *F16C 35/06* (2006.01)
  *F16C 19/49* (2006.01)
  *F16C 19/18* (2006.01)
  *B25J 9/12* (2006.01)

(52) U.S. Cl.
  CPC ............ *F16C 35/061* (2013.01); *H02K 1/146* (2013.01); *H02K 1/22* (2013.01); *H02K 1/27* (2013.01); *H02K 1/32* (2013.01); *H02K 21/24* (2013.01); *B25J 9/126* (2013.01); *F16C 19/188* (2013.01); *F16C 2322/59* (2013.01); *F16C 2380/26* (2013.01); *H02K 7/088* (2013.01); *H02K 2205/03* (2013.01); *H02K 2213/03* (2013.01)

(58) Field of Classification Search
  CPC ........ H02K 1/2793; H02K 1/30; H02K 21/00; H02K 7/08; H02K 1/27; H02K 16/00; H02K 21/24; H02K 41/00; H02K 2201/12; H02K 2213/03; F16C 17/10; F16C 32/00
  USPC ......... 310/12.01, 12.04, 12.18, 12.27, 12.31, 310/267, 268, 90
  See application file for complete search history.

(56) References Cited

U.S. PATENT DOCUMENTS

| | | | |
|---|---|---|---|
| 4,245,870 A | 1/1981 | Punshon et al. | |
| 4,307,309 A | 12/1981 | Barrett | |
| 4,310,390 A | 1/1982 | Bradley et al. | |
| 4,319,152 A | 3/1982 | Van | |
| 4,394,594 A | 7/1983 | Schmider et al. | |
| 4,398,112 A | 8/1983 | Van | |
| 4,475,051 A * | 10/1984 | Chai | H02K 37/04 310/162 |
| 4,501,980 A | 2/1985 | Welburn | |
| 4,568,862 A | 2/1986 | Tassinario | |
| 4,658,165 A | 4/1987 | Vanderschaeghe | |
| 4,701,651 A * | 10/1987 | Tanaka | F16C 21/00 310/90 |
| 4,716,327 A | 12/1987 | Stone | |
| 4,900,965 A | 2/1990 | Fisher | |
| 4,959,577 A | 9/1990 | Radomski | |
| 5,004,944 A | 4/1991 | Fisher | |
| 5,010,267 A | 4/1991 | Lipo et al. | |
| 5,010,268 A | 4/1991 | Dijken | |
| 5,091,609 A | 2/1992 | Sawada et al. | |
| 5,128,575 A | 7/1992 | Heidelberg et al. | |
| 5,144,183 A | 9/1992 | Farrenkopf | |
| 5,212,419 A * | 5/1993 | Fisher | H02K 1/12 310/216.061 |
| 5,252,880 A | 10/1993 | Kazmierczak et al. | |
| 5,334,899 A | 8/1994 | Skybyk | |
| 5,396,140 A | 3/1995 | Goldie et al. | |
| 5,445,456 A | 8/1995 | Isoda et al. | |
| 5,604,390 A | 2/1997 | Ackermann | |
| 5,616,977 A | 4/1997 | Hill | |
| 5,625,241 A | 4/1997 | Ewing et al. | |
| 5,642,009 A | 6/1997 | McCleer et al. | |
| 5,642,013 A | 6/1997 | Wavre | |
| 5,646,467 A | 7/1997 | Floresta et al. | |
| 5,744,888 A | 4/1998 | Zajc et al. | |
| 5,834,864 A | 11/1998 | Hesterman et al. | |
| 5,942,830 A | 8/1999 | Hill | |
| 5,955,808 A | 9/1999 | Hill | |
| 5,982,074 A | 11/1999 | Smith et al. | |
| 6,006,792 A | 12/1999 | Krumm et al. | |
| 6,081,059 A | 6/2000 | Hsu | |
| 6,147,428 A | 11/2000 | Takezawa et al. | |
| 6,239,516 B1 | 5/2001 | Floresta et al. | |
| 6,242,831 B1 | 6/2001 | Khan | |
| 6,261,437 B1 | 7/2001 | Hernnaes et al. | |
| 6,313,556 B1 | 11/2001 | Dombrovski et al. | |
| 6,348,751 B1 | 2/2002 | Jermakian et al. | |
| 6,376,961 B2 | 4/2002 | Murakami et al. | |
| 6,417,587 B1 | 7/2002 | Komatsu et al. | |
| 6,590,312 B1 | 7/2003 | Seguchi et al. | |
| 6,601,287 B2 | 8/2003 | Pop, Sr. | |
| 6,664,704 B2 | 12/2003 | Calley | |
| 6,700,297 B2 | 3/2004 | Hsu et al. | |
| 6,768,238 B2 | 7/2004 | Knauff et al. | |
| 6,833,647 B2 | 12/2004 | Saint-Michel et al. | |
| 6,933,643 B1 | 8/2005 | Heine et al. | |
| 6,936,948 B2 | 8/2005 | Bell et al. | |
| 6,975,057 B2 | 12/2005 | Gauthier et al. | |
| 6,987,342 B2 | 1/2006 | Hans | |
| 6,995,494 B2 | 2/2006 | Haugan et al. | |
| 7,109,625 B1 | 9/2006 | Jore et al. | |
| 7,141,905 B2 | 11/2006 | Vollmer | |
| 7,157,827 B2 | 1/2007 | Heideman et al. | |
| 7,190,101 B2 | 3/2007 | Hirzel | |
| 7,215,056 B2 | 5/2007 | Dressel | |
| 7,385,329 B2 | 6/2008 | Hill | |
| 7,425,772 B2 | 9/2008 | Vidal | |
| 7,535,145 B2 * | 5/2009 | Murakami | H02K 1/2793 310/156.08 |
| 7,548,003 B2 | 6/2009 | Nickel-Jetter et al. | |
| 7,554,226 B2 | 6/2009 | Kojima et al. | |
| 7,586,217 B1 | 9/2009 | Smith et al. | |
| 7,597,025 B2 | 10/2009 | Narita et al. | |
| 7,646,124 B2 | 1/2010 | Himmelmann et al. | |
| 7,663,283 B2 | 2/2010 | Holtzapple et al. | |
| 7,675,213 B2 | 3/2010 | Tenhunen | |
| 7,679,260 B2 | 3/2010 | Yamamoto et al. | |
| 7,687,962 B2 | 3/2010 | Imai et al. | |
| 7,692,357 B2 | 4/2010 | Qu et al. | |
| 7,741,750 B1 | 6/2010 | Tang | |
| 7,800,471 B2 | 9/2010 | Fullerton et al. | |
| 7,816,822 B2 | 10/2010 | Nashiki | |
| 7,836,788 B2 | 11/2010 | Kamon et al. | |
| 7,851,965 B2 | 12/2010 | Calley et al. | |
| 7,868,508 B2 | 1/2011 | Calley et al. | |
| 7,868,721 B2 | 1/2011 | Fullerton et al. | |
| 7,898,123 B2 | 3/2011 | Usui | |
| 7,911,107 B2 | 3/2011 | Nashiki | |
| 7,915,776 B2 | 3/2011 | Takahata et al. | |
| 7,923,881 B2 | 4/2011 | Ionel et al. | |
| 7,923,886 B2 | 4/2011 | Calley et al. | |
| 7,948,340 B2 | 5/2011 | Rastogi et al. | |
| 7,965,011 B2 | 6/2011 | Liao | |
| 7,990,011 B2 | 8/2011 | Yoshino et al. | |
| 8,004,127 B2 | 8/2011 | Potter | |

(56) References Cited

U.S. PATENT DOCUMENTS

| | | | |
|---|---|---|---|
| 8,026,626 B1* | 9/2011 | Meller | F03D 9/25 |
| | | | 290/55 |
| 8,053,944 B2 | 11/2011 | Calley et al. | |
| 8,084,879 B2 | 12/2011 | Stiesdal | |
| 8,179,126 B2 | 5/2012 | Li et al. | |
| 8,179,219 B2 | 5/2012 | Fullerton et al. | |
| 8,222,786 B2 | 7/2012 | Calley et al. | |
| 8,242,658 B2 | 8/2012 | Calley et al. | |
| 8,264,113 B2 | 9/2012 | Takemoto et al. | |
| 8,330,317 B2 | 12/2012 | Burch et al. | |
| 8,395,291 B2 | 3/2013 | Calley et al. | |
| 8,395,292 B2 | 3/2013 | Amari et al. | |
| 8,405,275 B2 | 3/2013 | Calley et al. | |
| 8,415,848 B2 | 4/2013 | Calley et al. | |
| 8,450,899 B2 | 5/2013 | Umeda et al. | |
| 8,487,497 B2 | 7/2013 | Taniguchi | |
| 8,497,615 B2 | 7/2013 | Kimura et al. | |
| 8,558,426 B2 | 10/2013 | Stiesdal | |
| 8,704,626 B2 | 4/2014 | Fullerton et al. | |
| 8,736,133 B1 | 5/2014 | Smith et al. | |
| 8,749,108 B2 | 6/2014 | Dyer et al. | |
| 8,760,023 B2 | 6/2014 | Calley et al. | |
| 8,836,196 B2 | 9/2014 | Calley et al. | |
| 8,847,454 B2 | 9/2014 | Saito et al. | |
| 8,847,522 B2 | 9/2014 | Nashiki et al. | |
| 8,854,171 B2 | 10/2014 | Janecek | |
| 8,916,999 B2 | 12/2014 | Imai et al. | |
| 8,946,960 B2 | 2/2015 | Camilleri et al. | |
| 8,952,590 B2 | 2/2015 | Calley et al. | |
| 8,987,968 B2 | 3/2015 | Morishita et al. | |
| 9,006,941 B2 | 4/2015 | Zhao | |
| 9,006,951 B2 | 4/2015 | Janecek et al. | |
| 9,054,566 B2 | 6/2015 | Woolmer | |
| 9,059,621 B2 | 6/2015 | Aoyama | |
| 9,071,117 B2 | 6/2015 | Woolmer | |
| 9,111,673 B2 | 8/2015 | Fullerton et al. | |
| 9,126,332 B2 | 9/2015 | L'Ecuyer et al. | |
| 9,154,024 B2 | 10/2015 | Jore et al. | |
| 9,178,399 B2 | 11/2015 | Parviainen | |
| 9,281,735 B2 | 3/2016 | Gandhi et al. | |
| 9,287,755 B2 | 3/2016 | Woolmer et al. | |
| 9,475,199 B2 | 10/2016 | Burridge et al. | |
| 9,537,362 B2 | 1/2017 | Jansen et al. | |
| 9,698,636 B2* | 7/2017 | Matsuoka | H02K 1/2773 |
| 10,461,592 B2* | 10/2019 | Klassen | H02K 5/18 |
| 2003/0048021 A1* | 3/2003 | Frazee | H02K 1/182 |
| | | | 310/180 |
| 2003/0111926 A1 | 6/2003 | Decristofaro et al. | |
| 2004/0021386 A1 | 2/2004 | Swett | |
| 2005/0140227 A1 | 6/2005 | Kuwert | |
| 2005/0179336 A1 | 8/2005 | Hasebe et al. | |
| 2006/0061228 A1* | 3/2006 | Lee | H02K 1/2773 |
| | | | 310/156.57 |
| 2006/0238053 A1 | 10/2006 | Kascak et al. | |
| 2006/0284507 A1 | 12/2006 | Murakami | |
| 2007/0222306 A1 | 9/2007 | Hultman et al. | |
| 2007/0236090 A1 | 10/2007 | Hoppe et al. | |
| 2007/0278865 A1 | 12/2007 | Matscheko | |
| 2008/0001488 A1 | 1/2008 | Pyrhonen et al. | |
| 2008/0214347 A1 | 9/2008 | Scharfenberg et al. | |
| 2008/0224558 A1 | 9/2008 | Ionel | |
| 2009/0001835 A1 | 1/2009 | Kojima et al. | |
| 2010/0019586 A1 | 1/2010 | Lu | |
| 2010/0109466 A1 | 5/2010 | Kondo et al. | |
| 2010/0164313 A1 | 7/2010 | Langford et al. | |
| 2010/0183460 A1 | 7/2010 | Qin et al. | |
| 2011/0025146 A1 | 2/2011 | Goodzeit et al. | |
| 2011/0033321 A1 | 2/2011 | Mikkelsen et al. | |
| 2011/0037329 A1 | 2/2011 | Nord et al. | |
| 2011/0109099 A1 | 5/2011 | Stiesdal | |
| 2011/0260566 A1 | 10/2011 | Odvarka et al. | |
| 2011/0285141 A1 | 11/2011 | Groendahl et al. | |
| 2011/0309699 A1 | 12/2011 | Woolmer et al. | |
| 2012/0001018 A1 | 1/2012 | Gilleran et al. | |
| 2012/0001511 A1 | 1/2012 | Matt et al. | |
| 2012/0047523 A1 | 2/2012 | Smirnov et al. | |
| 2012/0104895 A1 | 5/2012 | Ramu | |
| 2012/0212085 A1 | 8/2012 | Fu et al. | |
| 2012/0267967 A1 | 10/2012 | Trago et al. | |
| 2012/0279338 A1 | 11/2012 | Ihrke et al. | |
| 2012/0299430 A1 | 11/2012 | Pennander et al. | |
| 2013/0113320 A1 | 5/2013 | Galley et al. | |
| 2013/0140920 A1 | 6/2013 | Wei et al. | |
| 2013/0147291 A1 | 6/2013 | Woolmer et al. | |
| 2013/0187492 A1 | 7/2013 | Woolmer | |
| 2013/0221889 A1* | 8/2013 | Kim | H02P 25/0925 |
| | | | 318/400.37 |
| 2013/0249330 A1 | 9/2013 | King et al. | |
| 2013/0249342 A1 | 9/2013 | Funk et al. | |
| 2013/0342048 A1 | 12/2013 | Hogmark | |
| 2014/0035417 A1 | 2/2014 | Nadeau et al. | |
| 2014/0035423 A1 | 2/2014 | Veronesi et al. | |
| 2014/0049124 A1 | 2/2014 | Gandhi et al. | |
| 2014/0054062 A1 | 2/2014 | Koshida et al. | |
| 2014/0132102 A1 | 5/2014 | Peng et al. | |
| 2014/0197701 A1 | 7/2014 | Hossain et al. | |
| 2014/0217944 A1 | 8/2014 | Yang | |
| 2014/0299668 A1 | 10/2014 | Fullerton et al. | |
| 2014/0333171 A1 | 11/2014 | Lange et al. | |
| 2014/0346910 A1 | 11/2014 | Nakano et al. | |
| 2015/0048712 A1 | 2/2015 | Janecek et al. | |
| 2015/0091403 A1 | 4/2015 | Ueda | |
| 2015/0171682 A1 | 6/2015 | Fujisawa et al. | |
| 2015/0229194 A1 | 8/2015 | Sromin | |
| 2015/0244219 A1 | 8/2015 | Woolmer | |
| 2015/0270760 A1 | 9/2015 | Kreidler et al. | |
| 2015/0308438 A1 | 10/2015 | Janecek | |
| 2015/0318745 A1 | 11/2015 | Matsuoka | |
| 2015/0364956 A1 | 12/2015 | Woolmer et al. | |
| 2015/0380996 A1 | 12/2015 | Kim et al. | |
| 2016/0164394 A1 | 6/2016 | Knaian et al. | |
| 2016/0315510 A1 | 10/2016 | Kawamata et al. | |
| 2017/0201164 A1 | 7/2017 | Copeland, Jr. | |

FOREIGN PATENT DOCUMENTS

| | | |
|---|---|---|
| CN | 203827088 U | 10/2014 |
| CN | 105048665 A | 11/2015 |
| CN | 105196889 A | 12/2015 |
| DE | 3320805 A1 | 12/1984 |
| DE | 4216489 C2 | 10/1996 |
| DE | 19851439 A1 | 3/2000 |
| DE | 19954196 A1 | 6/2000 |
| EP | 1734645 A2 | 12/2006 |
| EP | 2381559 A2 | 10/2011 |
| EP | 2773023 A1 | 3/2014 |
| EP | 2156536 B1 | 7/2014 |
| EP | 2765633 A1 | 8/2014 |
| EP | 2873551 A2 | 5/2015 |
| EP | 2873601 A1 | 5/2015 |
| EP | 2874227 A1 | 5/2015 |
| EP | 2874277 A2 | 5/2015 |
| EP | 2869433 B1 | 9/2016 |
| FR | 2519483 A1 | 7/1983 |
| GN | 205105071 U | 3/2016 |
| JP | H04-131179 U | 12/1992 |
| JP | H06-335191 A | 12/1994 |
| JP | 2005-045868 A | 2/2005 |
| JP | 2005-151725 A | 6/2005 |
| JP | 2006-166634 A | 6/2006 |
| JP | 2008-048498 A | 2/2008 |
| JP | 2008-113531 A | 5/2008 |
| JP | 2008-278551 A | 11/2008 |
| JP | 2010094001 A | 4/2010 |
| JP | 5292541 B2 | 9/2013 |
| JP | 2013208023 A | 10/2013 |
| JP | 2015-033287 A | 2/2015 |
| JP | 2015-116033 A | 6/2015 |
| JP | 2015-211624 A | 11/2015 |
| LV | 14007 B | 11/2009 |
| WO | 88/06375 A1 | 8/1988 |
| WO | 92/10024 A1 | 6/1992 |
| WO | 02/093720 A1 | 11/2002 |
| WO | 03/073591 A1 | 9/2003 |

(56) References Cited

FOREIGN PATENT DOCUMENTS

| | | |
|---|---|---|
| WO | 2007/026047 A1 | 3/2007 |
| WO | 2008/135628 A1 | 11/2008 |
| WO | 2012/101327 A1 | 8/2012 |
| WO | 2012/142230 A2 | 10/2012 |
| WO | 2012/156719 A2 | 11/2012 |
| WO | 2013/002658 A2 | 1/2013 |
| WO | 2014/090516 A1 | 6/2014 |
| WO | 2014/100255 A1 | 6/2014 |
| WO | 2014/205523 A2 | 12/2014 |
| WO | 2015/019107 A2 | 2/2015 |
| WO | 2015/032704 A1 | 3/2015 |
| WO | 2015/032705 A1 | 3/2015 |
| WO | 2015/032707 A1 | 3/2015 |
| WO | 2015/032708 A2 | 3/2015 |
| WO | 2015/032709 A1 | 3/2015 |
| WO | 2015/036779 A2 | 3/2015 |
| WO | 2015/036780 A2 | 3/2015 |
| WO | 2015/055265 A2 | 4/2015 |
| WO | 2015/070938 A1 | 5/2015 |
| WO | 2015/070978 A1 | 5/2015 |
| WO | 2015/070984 A1 | 5/2015 |
| WO | 2015/071012 A1 | 5/2015 |
| WO | 2015/071088 A1 | 5/2015 |
| WO | 2015/071096 A1 | 5/2015 |
| WO | 2015/071121 A1 | 5/2015 |
| WO | 2015/071127 A1 | 5/2015 |
| WO | 2015/071144 A1 | 5/2015 |
| WO | 2015/071186 A1 | 5/2015 |
| WO | 2015/071340 A1 | 5/2015 |
| WO | 2015/071400 A1 | 5/2015 |
| WO | 2015/071468 A2 | 5/2015 |
| WO | 2015/071469 A2 | 5/2015 |
| WO | 2015/071470 A1 | 5/2015 |
| WO | 2015/071576 A1 | 5/2015 |
| WO | 2015/072173 A1 | 5/2015 |
| WO | 2015/072299 A1 | 5/2015 |
| WO | 2015/089518 A1 | 6/2015 |
| WO | 2015/124922 A1 | 8/2015 |
| WO | 2016/203101 A1 | 12/2016 |
| WO | 2018/010031 A1 | 1/2018 |
| WO | 2018/010032 A1 | 1/2018 |

OTHER PUBLICATIONS

Office Action received for Korean patent application No. 10-2019-7004380, dated Oct. 10, 2019, 13 pages. (7 pages of English translation and 6 pages of Official copy).

The Timken® Company, "Angular Contact", Retrieved from the Internet URL: <https ://www .timken.com/products/timken -engineered -bearings/ball/angular-contact/>, Jan. 9, 2017, 4 pages.

Green Car Congress, "Delta Wing partners with DHX Electric Machines; ultra high-torque motors for automotive applications," Retrieved from the Internet URL:< http://www.greencarcongress.com/2016/01/20160126-dhx.html>, Feb. 7, 2016, 4 pages.

Grundfos, "Motor Book", Grundfos Management A/S, 2004, 252 pages.

Hendershot, "Recent Advances in Electric Machine Design and Operation", IEEE Miami Section in conjunction with Energy Systems Research Laboratory, 2013, 41 pages.

Henneberger et al., "Development of a New Transverse Flux Motor", The Institution of Electrical Engineers, 1997, 6 pages.

Hochberg et al., "Evaporative Cooling of Actuators for Humanoid Robots", Proceedings of 8th Workshop on Humanoid Soccer Robots, 13th IEEE-RAS International Conference on Humanoid Robots (Humanoids), 2013, 6 pages.

Hoganas, "Compact, Light and Cost-Efficient Solutions", Somaloy®Technology, 2013, 3 pages.

Infolytica Corporation, "Axial Flux Motor," Retrieved from the Internet URL: <http://www.infolytica.com/en/applications/ex0072/>, 2016, 2 pages.

Infolytica Corporation, "Iron loss separation in high-torque BLDC Motors", Retrieved from the Internet URL: <http://www.infolytica.com/en/applications/ex0156/>, 2015, 2 pages.

Instructables, "Make Your Own Miniature Electric Hub Motor," Retrieved from the Internet URL:<http://www.instructables.com/id/Make-Your-Own-Miniature-Electric-Hub-Motor/> Sep. 14, 2015, 6 pages.

International Search report and Written Opinion received for PCT Application No. PCT/CA2016/050947, dated Jan. 12, 2017, 13 pages.

Tanaka et al., "Study on a High Torque Density Motor for an Electric Traction Vehicle," Retrieved from the Internet URL: <http:!/papers.sae.org/2009-01-1337/>, 2016, 1 page.

Jack, "Advances in Electric Machines: Topology, Materials and Construction," University of Newcastle upon Tyne, Newcastle Drives and Machines Group, 2011, 52 pages.

Joby Motors, "Introducing the JM IS motor", Retrieved from the Internet URL: <http://www.jobymotors.com/public/views/pages/products.php>, 2011, 2 pages.

Jung et al., "Unique Axial Flux Motor Design Delivers Superior Torque Density", EET European Ele-Drive Conference International Advanced Mobility Forum, 2008, 6 pages.

Jungreuthmayer et al., "A Detailed Heat and Fluid Flow Analysis of an Internal Permanent Magnet Synchronous Machine by Means of Computational Fluid Dynamics", IEEE Transactions on Industrial Electronics, vol. 59, No. 12, 2012, pp. 4568-4578.

Kasinathan et al., "Force Density Limits in Low-Speed Permanent-Magnet Machines Due to Saturation," IEEE Transactions on Energy Conversion vol. 20, No. 1, 2005, pp. 37-44.

Kastinger, "Design of a novel transverse flux machine", Proceedings of the International Conference on Electrical Machines (ICEM), 2002, 6 pages.

Lee et al., "Design of an Axial Flux Permanent Magnet Generator for a Portable Hand Crank Generating System," EEE Transactions on Magnetics vol. 48, No. 11, 2012, pp. 2977-2980.

Libert, "Design, Optimization and Comparison of Permanent Magnet Motors for a Low-Speed Direct-Driven Mixer", Royal Institute of Technology Department of Electrical Engineering Electrical Machines and Power Electronics, 2004, 142 pages.

Lipo, Principles of Design, Choice of Electric Loading, Introduction to AC Machine Design, 2004, pp. 328-329.

Lipo, "Principles of Design, Practical Considerations Concerning Stator Construction", Introduction to AC Machine Design, Wisconsin Power Electronics Research Center, 2004, pp. 330-331.

Lipo, "Principles of Design, Practical Considerations Concerning Stator Construction", 6.11.4 Selection of Stator Slot Number, 2004, pp. 334-335.

Mahmoudi et al., "A Comparison between the TORUS and AFIR Axial-Flux Permanent-Magnet Machine Using Finite Element Analysis," IEEE International Electric Machines & Drives Conference (IEMDC), 2011, pp. 242-247.

Marignetti et al., "Design of Axial Flux PM Synchronous Machines Through 3-D Coupled Electromagnetic Thermal and Fluid-Dynamical Finite-Element Analysis", IEEE Transactions on Industrial Electronics, vol. 55, Issue 10, 2008, pp. 3591-3601.

Maxon Academy, "Maxon DC motor Permanent magnet DC motor with careless winding", Maxon Motor AG, 2012, 34 pages.

Maxon Academy, "Maxon EC motor, An introduction to brushless DC motors", Maxon Motor AG, 2012, 25 pages.

Maxon Academy, "Maxon Motor Data and Operating Ranges, How to interpret the data of Maxon Motors?", Maxon Motor AG, 2010, 29 pages.

Maxon Motor, "EC-i 40 040 mm, brushless, 70 Watt High Torque", Apr. 2015 edition,1 page.

Maxon Motor, "High speed DC motor—Tips and tricks", Sep. 3, 2015, 1 page.

Maxon Motor, "Trend toward multipole brushless DC motors increases", Media Release, Jun. 12, 2015, 2 pages.

Meier, "Theoretical design of surface-mounted permanent magnet motors with field-weakening capability", Master thesis, submitted to the Royal Institute of Technology Department of Electrical Engineering Electrical Machines and Power Electronics, 2001, 79 pages.

(56) References Cited

OTHER PUBLICATIONS

Moog Components Group, "Miniature, High-Torque, DC Servomotors and DC Gearmotors", Series C13 Samarium Cobalt, Retrieved from the Internet URL: <www.moog.com/components>, 2017, pp. 188-192.

Morris, "Elon Musk: Cooling, not power-to-weight ratio, is the challenge with AC induction motors", Retrieved from the Internet URL: <https://chargedevs.com/newswire/elon-musk-cooling-not-power-toweight-ratio-is-the-challenge-with-ac-induction-motors/>, on Nov. 4, 2014, 9 pages.

Myser, "A New Type of Motor Made from Gadget Guts", Retrieved from the Internet URL:< http://www.popsci.com/gadgets/article/2013-06/gardening-circuit>, Jun. 27, 2013, 3 pages.

Oleksandr, "Study on Permanent Magnet Transverse Flux Machine", Dissertation submitted to the Graduate Faculty of the Louisiana State University and Agricultural and Mechanical College, 2012, 149 pages.

Orlik, "Transverse Flux Generators—Principle and Operation Behaviour," 70 Conference at HUSUM Wind Energy, 2008, 20 pages.

Parviainen, "Design of Axial-Flux Permanent-Magnet Low-Speed Machines and Performance Comparison Between Radial-Flux and Axial-Flux Machines," Doctoral thesis, 2005, 155 pages.

Paulides et al., "Eddy-Current Losses in Laminated and Solid Steel Stator Back Iron in a Small Rotary Brushless Permanent-Magnet Actuator", IEEE Transactions on Magnetics, vol. 44, No. 11, 2008, pp. 4373-4376.

Pippuri et al., "Torque Density of Radial, Axial and Transverse Flux Permanent Magnet Machine Topologies", IEEE Transactions on Magnetics, vol. 49, No. 5, 2013, pp. 2339-2342.

Printed Motor Works, "Brushed Pancake Motors", Retrieved from the Internet URL:< http://www.printedmotorworks.com/brushed-pancake-motors/> , Feb. 2, 2016, 13 pages.

Qu et al., "Performance Comparison of Dual-Rotor Radial-Flux and Axial-Flux Permanent-Magnet BLDC Machines", IEEE International Electric Machines and Drives Conference (IEMDC '03), 2003, 7 pages.

Ricky, "Bright Hub Engineering, What Is Cogging in Electrical Motors?", Retrieved from the Internet URL:< http://www.brighthubengineering.com/commercial-electrical-applications/67622-what-is-coggingin-electrical-motors/>, Feb. 27, 2016, 5 pages.

Seo et al., "A Study on Brushless DC Motor for High Torque Density", World Academy of Science, Engineering and Technology International Journal of Mechanical, Aerospace, Industrial, Mechatronic and Manufacturing Engineering, vol. 5, No. 10, 2011, pp. 2084-2088.

Staton et al., "Solving the More Difficult Aspects of Electric Motor Thermal Analysis", IEEE International Electric Machines and Drives Conference, (IEMDC'03), 2003, 9 pages.

Yasa Motors, "Yasa-750 Axial Flux Electric Motor", Yasa Motors Limited, 2015, 2 pages.

International Preliminary Report on Patentability received for PCT Application No. PCT/CA2017/050857, dated Jan. 24, 2019, 11 pages.

Yang, "FEA Estimation and Experimental Validation Of Solid Rotor and Magnet Eddy Current Loss In Single-Sided Axial Flux Permanent Magnet Machines", Doctoral dissertation, presented to The Graduate College at the University of Nebraska, 2013, 98 pages.

Yang, "FEA Estimation and Experimental Validation of Solid Rotor and Magnet Eddy Current Loss In Single-Sided Axial Machines", Doctoral dissertation, presented to The Graduate College at the University of Nebraska, 2013, excerpt from pp. 49-50, 1 page.

Valavi et al., "Effects of Loading and Slot Harmonic on Radial Magnetic Forces in Low-Speed Permanent Magnet Machine With Concentrated Windings", IEEE Transactions on Magnetics, vol. 51, No. 6, Jun. 2015, 10 pages.

Wrobel et al., "Design Considerations of a Direct Drive Brushless Machine With Concentrated Windings", IEEE Transactions on Energy Conversion, vol. 23, No. 1, 2008, 8 pages.

Wu et al., "A Low-Speed, High-Torque, Direct-Drive Permanent Magnet Generator For Wind Turbines", Conference Record of the IEEE Industry Applications Conference, 2000, 8 pages.

Yahaya, "Single Layer Winding Of Three Phase Induction Motor", The International Journal of Engineering and Sciences, vol. 2, No. 4, 2013, pp. 8-13.

Yang et al., "FEA Estimation and Experimental Validation of Solid Rotor and Magnet Eddy Current Loss in Single-sided Axial Flux Permanent Magnet Machines", IEEE Energy Conversion and Exposition (ECCE), 2013, 9 pages.

International Preliminary Report on Patentability received for PCT Application No. PCT/CA2017/050858, dated Jan. 24, 2019, 7 pages.

Libert et al., Investigation on Pole-Slot Combinations for Permanent-Magnet Machines with Contrated Windings Jan. 2004, 7 pages.

International Search Report and The Written Opinion received for PCT Application No. PCT/CA2017/050470, dated Aug. 15, 2017, 10 pages.

International Search Report and The Written Opinion received for PCT Application No. PCT/CA2017/050471, dated Jul. 27, 2017, 8 pages.

International Search Report and The Written Opinion received for PCT Application No. PCT/CA2017/050856, dated Oct. 19, 2017, 8 pages.

International Search Report and The Written Opinion received for PCT Application No. PCT/CA2017/050857, dated Oct. 24, 2017, 13 pages.

International Search Report and The Written Opinion received for PCT Application No. PCT/CA2017/050957, dated Dec. 11, 2017, 9 pages.

International Search Report and The Written Opinion received for PCT Application No. PCT/CA2017/050858, dated Sep. 18, 2017, 8 pages.

Magnax Specification Sheet, "Magnax Axial Flux Synchronous Motor/Generator", Feb. 22, 2017, pp. 1-4.

Mezzarobba Thesis, "Study of innovative electric machines for high efficiency vehicular Traction applications" 2013, pp. 1-165.

Christopher A. Gallo, "Halbach Magnetic Rotor Development", Feb. 2008, NASA ITM, 25 pages.

Xo Wang, "Delicious Axial Flux Flap Jack"; Retrieved from Internet URL:< www.geekshavefeelings.com>, Feb. 24, 2013, 12 pages.

Ate, Axial -Flux-Motors (AF), Retrieved from Internet URL: <https://www.ate-system.de/en/products/af.html>, Accessed on Jan. 20, 2018, pp. 1-2.

Moreels et al., "High Efficiency Axial Flux Machines: Why Axial Flux Motor and Generator Technology Will Drive the Next Generation of Electric Machines", V1.2; Jan. 2018, pp. 1-20.

Bures et al., "Electric Properties of Fe Based Soft Magnetic Composite", Euro PM2011, pp. 1-64.

Baserrah et al., "Transverse flux machines with distributed windings for in-wheel Applications; Institute for Electrical Drives, Power Electronics and Devices", 2009, pp. 102-108.

Woolmer et al., Analysis Of The Yokeless And Segmented Armature Machine, 2007, 7 pages.

Axco Motors, "Axial flux technology," Retrieved from the Internet URL: <www.axcomotors.com/axialfluxtechnology.html> , Feb. 22, 2017, 5 pages.

Bannon et al., "Axial Flux Permanent Magnet Generator", Retrieved from the Internet URL: <https://depts.washington.edu/nnmrec/docs/Generator%20Final%20Report%20ME%20495%20Autumn%202013.pdf>, 2013, 24 pages.

Benlamine et al., "Design of an Axial-Flux Interior Permanent-Magnet Synchronous Motor for Automotive Application: Performance Comparison with Electric Motors used in EVs and HEVs", IEEE Vehicle Power and Propulsion Conftrence (VPPC), 2014, 6 pages.

Boglietti et al., "Evolution and Modern Approaches for Thermal Analysis of Electrical Machines", IEEE Transactions on Industrial Electronics, vol. 56, No. 3, 2009, pp. 871-882.

Capponi et al., "Recent Advances in Axial-Flux Permanent-Magnet Machine Technology", IEEE Transactions on Industry Applications, vol. 48, No. 6, 2012, pp. 2190-2205.

(56) References Cited

OTHER PUBLICATIONS

Cavagnino et al., "A Comparison Between the Axial Flux and the Radial Flux Structures for PM Synchronous Motors," IEEEXplore, 2001, pp. 1611-1618.
Cavagnino et al., "A Comparison Between the Axial Flux and the Radial Flux Structures for PM Synchronous Motors," IEEE Transactions on Industry Applications, vol. 38, No. 6, 2011, 1517-1524, 2002.
Celeroton AG, "Ultra-High-Speed Magnetic Bearings", Retrieved from the Internet URL: http://www.celeroton.com/en/technology/magnetic-bearings.html, Jul. 2, 2016, 3 pages.
Chau, "Electric Vehicle Machines and Drives: Design, Analysis and Application", Wiley, Kindle Edition, 2015, 9 pages.
Chau, Electric Vehicle Machines and Drives: Design, Analysis and Application, Wiley-IEEE Press, John Wiley and Sons, Google books publication information, Retrieved from the Internet URL: <https://books.google.ca/books?id-03FXCQAAQBAJ&pg=PA10I&lpg#v=onepage&q&f=false>, Sep. 23, 2015, 1 page.
Cheng et al., "Advanced Electrical Machines and Machine-Based Systems for Electric and Hybrid Vehicles", Energies, vol. 8, 2015, pp. 9541-9564.
Choi et al., "Design and Parametric Analysis of Axial Flux PM Motors With Minimized Cogging Torque", IEEE Transactions on Magnetics, vol. 45, No. 6, Jun. 2009, pp. 2855-2858.
Gogue et al., "Theory & Practice of Electromagnetic Design of DC Motors & Actuators", Technical Report, Chapter 7, Motor Design, 1993, 24 pages.
Commonplace Robotics GmbH, "SRA Service Robot Arm Version SRA 1000 HD", 2016, 1 page.
Commonplace Robotics GmbH, "Robot Arm Mover4", User Guide, 2012, 32 pages.
Core Gasless Power, "Technology", Retrieved from the Internet URL:<coreoutdoorpower.com/technology>, 2015, 3 pages.
Laser Technologies, Inc., "Image from Chicago Trade Center", Cornelius, Oct. 6, 2015, 1 page.
Cugat et al., "Magnetic Micro-Actuators and Systems (MAG-MAS)", IEEE Transactions on Magnetics, vol. 39, No. 5, Nov. 2003, pp. 3607-3612.
Custom Coils Inc., "Custom Coil Manufacturing", Retrieved from the Internet URL:<http://www.ccoils.com/Custom-coil-manufacturing.html>, 2014, 3 pages.
Toro, "Basic Electric Machines", Prentice Hall, 1989, pp. 2-3, 9-11, 124-126, 561-563, 141-143, 15 pages.

Desfosse, "What Drives CORE's Quiet Gasless Motors", Retrieved from the Internet URL: <www.popularmechanics.com/home/reviews/a905 2/what-drives-cores-quiet-gasless-motors-15558520>, Jun. 5, 2013, 12 pages.
Gerlando et al., "Axial Flux PM Machines With Concentrated Armature Windings: Design 22 Analysis and Test Validation of Wind Energy Generators", IEEE Transactions on Industrial Electronics, vol. 58, No. 9, Sep. 2011, pp. 3795-3805.
Electric Torque Machines (ETM), "Key Technology Attributes", Retrieved from the Internet URL: <http://etmpower.com/technology>, Jan. 24, 2016, 3 pages.
Emrax, "Emrax motors/generators", Roman Susnik Electric Motor Patent Application, Retrieved from the Internet URL: <http://www.enstroj.si/Electric-products/emraxmotorsgenerators.html>, Feb. 18, 2016, 2 pages.
Enstroj, "Manual for Emrax motors", Owner's manual for the brushless AC synchronous motor Emrax, V2.0, 2014, 36 pages.
Finken et al., "Study and Comparison of several Permanent-Magnet excited Rotor Types regarding their Applicability in Electric Vehicles", Emobility—Electrical Power Train, 2010, 7 pages.
Fourie, "Transverse Flux Electric Motor," Retrieved from the Internet URL: <http://www.danielfourie.net/motor.html>, Nov. 7, 2016, 2 pages.
Galea et al., "Development of an aircraft wheel actuator for Green Taxiing", International Conference on Electrical Machines (ICEM), 2014, pp. 2492-2498.
Galea et al., "Torque Density Improvements for High Performance Machines", IEEE International Electric Machines & Drives Conference (IEMDC), 2013, pp. 1066-1073.
Galea, "High Performance, Direct Drive Machines for Aerospace Applications", Department of Electrical and Electronic Engineering, Feb. 2013, 221 pages.
Gholamian et al., "Selecting of Slotted AFPM Motors with High Torque Density for Electric Vehicles", International Journal of Scientific & Engineerin Research, vol. 2, Issue 6, Jun. 2011, pp. 1985-1991.
Gieras, "Axial Flux Permanent Magnet Brushless Machines," Second Edition, Springer, 2008, 2 pages.
Gieras, "Axial Flux brushless PM machines", Second Edition, Springer, 2008, 1 page.
Yang, et al., "Optimal Design and Control of a Torque Motor for Machine Tools," J. Electromagnetic Analysis & Applications, 2009, pp. 220-228.
"GN Series", Printed Motor Works, Sep. 10, 2012, 3 pages.

* cited by examiner

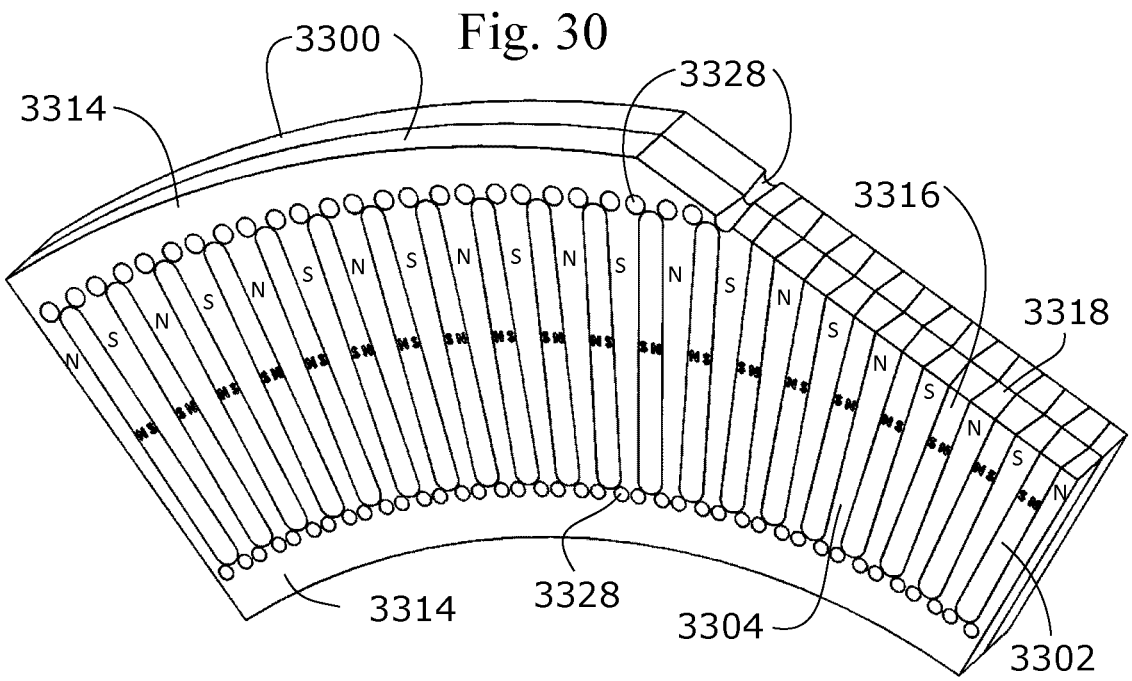
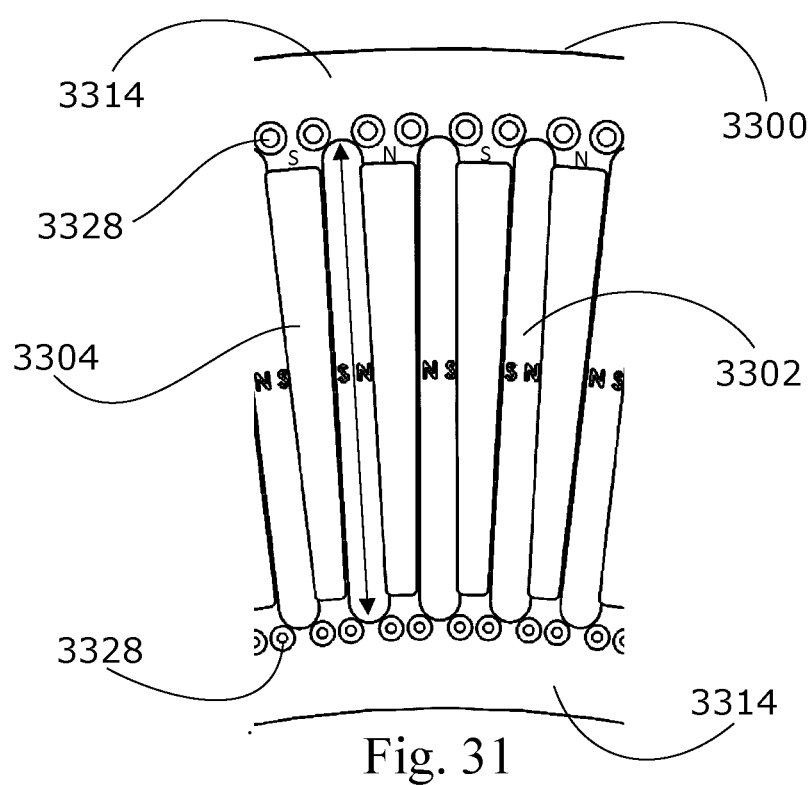

AXIAL GAP ELECTRIC MACHINE WITH PERMANENT MAGNETS ARRANGED BETWEEN POSTS

FIELD

Electric machines.

BACKGROUND

In the design of electric machines, it is known to select structural parameters such as slot number depending on the intended application and desired performance characteristics of the machine. However, not all values of the structural parameters are used in practice. There is room for improved performance of electric machines, particularly in robotics.

Electric machines typically use electrically conductive wire turns wrapped around soft magnetic stator posts (teeth) to generate flux. The manufacturing process for this type of motor construction can be time consuming and expensive. As well, such motors typically have a torque to mass ratio that makes them relatively heavy for mobile actuator applications such as in robotics where the weight of a downstream actuator must be supported and accelerated by an upstream actuator.

Common permanent magnet direct drive motors can be difficult to assembly because of high permanent magnet forces between the rotor and stator. These high magnetic forces typically require complex fixtures for assembly to avoid damage to parts and injury to personnel as the rotor and stator are brought together.

Large diameter, low profile bearings that are used in many motion control devices such as robot arm joints, must typically be physically retained in the housings to prevent separation of the bearing assembly. Many low profile bearings also tend to be relatively low tolerance compared to larger profile, smaller diameter bearings. Moreover, bearings typically require an adjustable preload that is typically provided by a threaded or other type of member. This is difficult to fit into a low profile assembly and is especially challenging with thin section bearings.

In a common axial flux actuator, the bearings are located at the inner diameter of the magnetic active section of the rotor. This setup is a common practice because placing a bearing at the outer diameter of the rotor induces more drag and the overall bearing profile increases as the bearing diameter increases. Bearings on the OD of the rotor will also tend to limit the rotational speed of the device.

To make a single inner bearing work with a single rotor/single stator, either the rotor and stator structures must be thickened to provide a stiffer structure to reduce deflection, or the air gap distance must be increased to accommodate the rotor and stator deflection. The first method results in a heavier device and larger envelope which reduces actuator acceleration and torque density. The latter method result in a reduction of torque due to the larger air gap distance.

SUMMARY

The inventor has proposed an electric machine with a novel range of structural parameters particularly suited for robotics, along with additional novel features of an electric machine.

In an embodiment there is provided an electric motor having a stator having an array of electromagnetic elements and a rotor mounted on bearings. The rotor has an array of rotor posts, each of the rotor posts having a length defining opposed ends and the array of rotor posts extending along the rotor in a direction perpendicular to the length of each of the rotor posts. The rotor has electromagnetic elements defining magnetic poles placed between the plurality of rotor posts. An airgap is formed between the rotor and the stator when the stator and the rotor are in an operational position. A plurality of rotor flux restrictors is formed on the rotor. Each of the plurality of rotor flux restrictors each lying adjacent to one of the opposed ends of the rotor posts.

In various embodiments, there may be included one or more of the following or other features. The bearings may further comprise a first bearing connecting the rotor and the stator and a second bearing connecting the rotor and the stator. The first bearing and second bearing are arranged to allow relative rotary motion of the rotor and the stator. The array of rotor posts and the plurality of rotor flux restrictors may lie on the rotor between the first bearing and the second bearing. The plurality of rotor flux restrictors may further comprise a plurality of holes within the rotor. The plurality of rotor flux restrictors may further comprise a plurality of blind holes. The plurality of rotor flux restrictors may further comprise a plurality of through holes. The electric motor may be an axial electric motor. The first bearing may further comprise an inner thrust bearing. The second bearing may further comprise an outer thrust bearing. The electromagnetic elements of the stator and the electromagnetic elements of the rotor may be arranged radially inward of the outer thrust bearing and radially outward of the inner thrust bearing. The inner thrust bearing and the outer thrust bearing may be arranged to maintain the airgap against a magnetic attraction of the electromagnetic elements of the rotor and the electromagnetic elements of the stator. The plurality of rotor flux restrictors may further comprise a plurality of outer flux restrictors lying radially outward from the rotor posts and radially inward from the outer thrust bearings. The plurality of rotor flux restrictors may further comprise a plurality of inner flux restrictors lying radially inward from the rotor posts and radially outward from the inner thrust bearing. The plurality of rotor flux restrictors may further comprise a plurality of inner flux restrictors lying radially inward from the rotor posts and radially outward from the inner thrust bearing. Each of the inner and outer flux restrictors may be radially aligned in an alternating pattern relative to the rotor posts, so that the inner and outer flux restrictors are adjacent to every second rotor post. The inner and outer flux restrictors may be adjacent to alternate rotor posts so that each rotor post is adjacent to only one of the inner flux restrictors or one of the outer flux restrictors. Each of the inner and outer flux restrictors may be radially aligned with the rotor posts, and the inner and outer flux restrictors may be adjacent to each rotor post. For each rotor posts, the rotor post may be adjacent to two inner flux restrictors and two outer flux restrictors. The plurality of inner flux restrictors and the plurality of outer flux restrictors may each further comprise a plurality of holes having the same geometry. The plurality of holes having the same geometry may further comprise a plurality of holes having a circular cross-section. The circular cross-section of each of the plurality of holes has an equal size. The stator may further comprise stator posts that form the electromagnetic elements of the stator, with slots between the stator posts, one or more electric conductors in each slot, each of the stator posts having a length defining opposed ends and the array of stator posts extending around the stator circularly in a direction perpendicular to the length of each of the posts. The stator may further comprise a plurality of stator flux restrictors being formed on the stator, each of the plurality of stator flux restrictors lying adjacent to one of the opposed ends of the stator posts. The electric motor may further comprise a linear electric motor. The first bearing may further comprise a first linear bearing. The second bearing may further comprise a second linear bearing. The electromagnetic elements of the stator and the electromagnetic elements of the rotor may be arranged axially between the first linear bearing and the second linear bearing. The first linear bearing and the second radially bearing may be arranged to maintain the airgap against a magnetic attraction of the electromagnetic elements of the rotor and the electromagnetic elements of the stator. The plurality of flux restrictors may further comprise a plurality of first flux restrictors lying between the rotor posts and the first linear bearings. The plurality of flux restrictors may further comprise a plurality of second flux restrictors lying between the rotor posts and the second linear bearing. Each of the first and second flux restrictors may be aligned with the length of the corresponding one of the rotor posts in an alternating pattern relative to the rotor posts, so that the inner and outer flux restrictors are adjacent to every second rotor post. Each of the first and second flux restrictors may be aligned with the length of the corresponding one of the rotor posts, and the inner and outer flux restrictors are adjacent to each rotor post. The plurality of first flux restrictors and the plurality of second flux restrictors may each further comprise a plurality of holes having the same geometry.

An electric machine is also disclosed in which a first carrier (rotor or stator) is supported for rotation relative to a second carrier (stator or rotor) by bearings and the bearings include bearing races that are homogenous extensions of homogenous plates that form the first carrier and second carrier. That is, the bearing races of the bearings are integrated with the respective carriers that are supported by the bearings. The integrated bearings races may be used for inner or outer bearings or both, in either an axial flux or radial flux machine.

These and other aspects of the device and method are set out in the claims.

BRIEF DESCRIPTION OF THE DRAWINGS

Reference will now be made to preferred embodiments of the invention, by way of example only, with reference to the following figures in which:

FIG. 30 is a cross-section through a segment of an axial flux concentrated flux rotor with tapered magnets and flux path restrictions;

FIG. 31 is a close-up section view of a portion of an axial flux concentrated flux rotor with extended length magnets;

DETAILED DESCRIPTION

Figure 1:
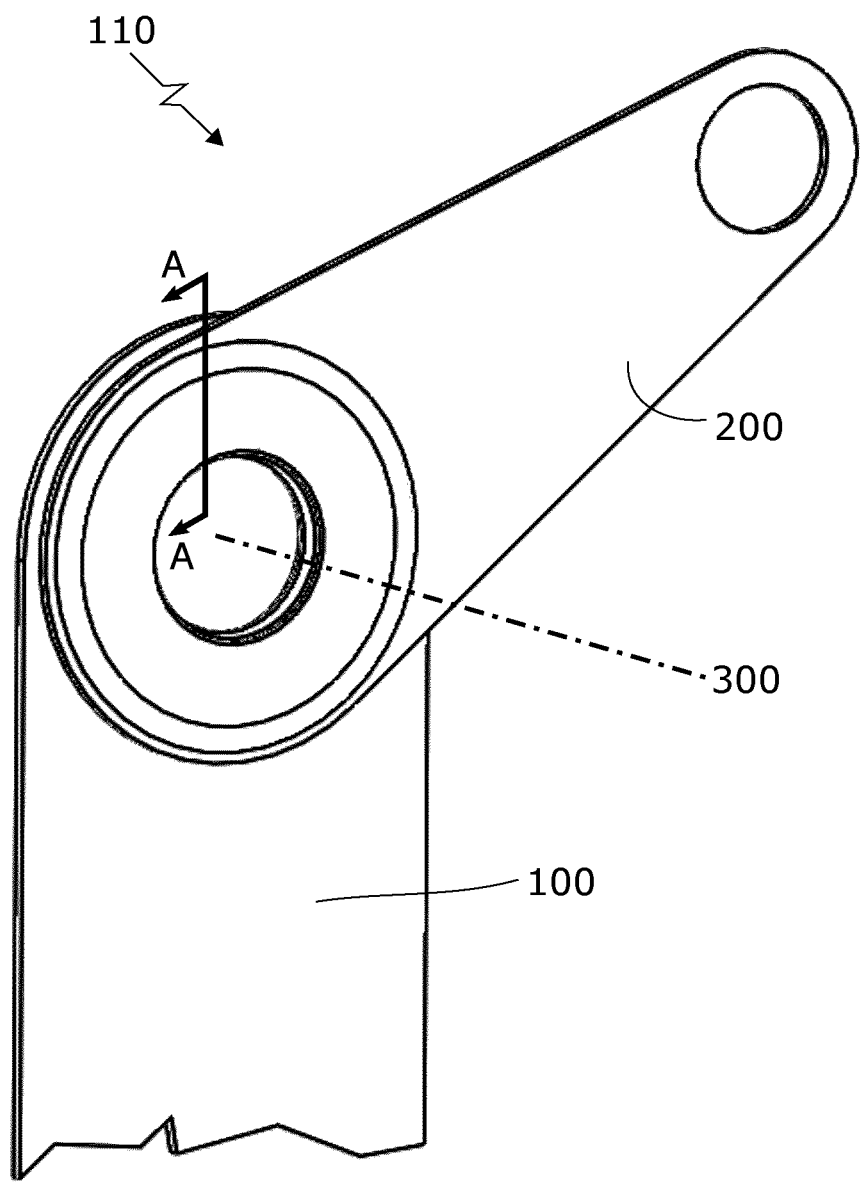
FIG. 1 is an isometric view of an exemplary actuator.

Several terms to be used throughout the text will first be defined.

A carrier, as used here in the context of electric machines, may comprise a stator or a rotor when referring to rotary machines.

A rotor as used herein may be circular. A rotor may also refer the armature or reaction rail of a linear motor. A stator may be circular. It may also refer to the armature or reaction rail of a linear motor.

Teeth may be referred to as posts.

In an electric machine, either a stator or rotor may have a commutated electromagnet array defined by coils wrapped around posts, while the other of the stator or rotor may have magnetic poles defined by permanent magnets or coils or both coils and permanent magnets. An electric machine may be configured as a motor or generator.

Permanent magnets may be used in combinations with electromagnets on the rotor and/or stator to add flux to the system.

PM means permanent magnet. EM means electromagnet. ID means inner diameter. OD means outer diameter.

Electromagnetic elements may comprise permanent magnets, posts, slots defined by magnetic posts, which may be soft magnetic posts, and electrical conductors. In any embodiment where one carrier has slots and posts, the other may have permanent magnets for the electromagnetic elements, and for any such embodiment, the term electromagnetic element may be replaced by the term permanent magnet. Magnetic poles in some cases, for example in a concentrated flux rotor embodiment, may be defined by permanent magnets in conjunction with adjacent posts in which a magnetic field is established by the permanent magnets.

Unless otherwise specified, flux refers to magnetic flux. Soft Magnetic Material is a material that is magnetically susceptible and that can be temporarily magnetised such as but not limited to iron or steel or a cobalt or nickel alloy.

A fractional slot motor is a motor with a fractional number of slots per pole per phase. If the number of slots is divided by the number of magnets, and divided again by the number of phases and the result is not an integer, then the motor is a fractional slot motor.

Thrust bearings include any bearing arranged to support a substantial axial thrust, including angular contact bearings and four-point contact bearings as well as pure thrust bearings. A radially locating bearing is a bearing that, in use, prevents relative displacement of the axes of the elements connected by the bearing.

A bearing can be radial and thrust locating (such as a cross roller bearing) or it can be just radial or just thrust locating.

A carrier may be supported for motion relative to another carrier by a frame or bearings, and the bearings may be sliding, roller, fluid, air or magnetic bearings.

An axial electric machine is an electric machine in which magnetic flux linkage occurs across an axial airgap, and the carriers are in the form of discs mounted coaxially side by side. A first carrier can be arranged to move relative to another carrier by either carrier being supported by a frame, housing or other element, while the other carrier moves relative the first carrier.

A radial electric machine is an electric machine where the airgap is oriented such that magnetic flux is radially oriented, and the carriers are mounted concentrically, one outside the other.

A linear actuator is comparable in construction to a section of an axial flux or radial flux rotary motor where the direction of motion is a straight line rather than a curved path.

A trapezoidal electric machine is an electric machine that is a combination of both an axial and radial flux machines, where the plane of the airgap lies at an angle partway between the planes formed by the airgaps in the axial and radial configurations.

The airgap diameter for a rotary machine is defined as the diameter perpendicular to the axis of rotation at the centre of the airgap surface. In radial flux motors, all of the airgap resides at the same diameter. If the airgap surface is a disc-shaped slice as in axial flux motors, the average airgap diameter is the average of the inner and outer diameter. For other airgap surfaces such as a diagonal or curved surfaces, the average airgap diameter can be found as the average airgap diameter of the cross-sectional airgap view.

For a radial flux motor, the airgap diameter refers to the average of the rotor inner diameter and stator outer diameter for an outer rotor radial flux motor or the average of the rotor airgap outer diameter and stator airgap inner diameter for an inner rotor radial flux motor. Analogues of the airgap diameter of a radial flux motor may be used for other types of rotary motors. For an axial flux machine, the airgap diameter is defined as the average of the PM inner diameter and PM outer diameter and EM inner diameter and EM outer diameter.

The back surface of the stator is defined as the surface on the opposite side of the stator to the surface which is at the magnetically active airgap. In a radial flux motor, this would correspond to either the inner surface of the stator for an outer rotor configuration, or the outer diameter surface of the stator for an inner rotor configuration. In an axial flux motor, the back surface of the stator is the axially outer surface of the stator.

For distributed windings, the number of slots will be N×the number of poles where N is a multiple of the number of phases. So for a 3 phase machine N could be 3, 6, 9, 12, etc. For concentrated windings, the number of slots can vary but must be a multiple of the number of phases. It does not depend on the number of poles, except that certain combinations of slots and poles will yield higher torque and better noise-reduction or cogging-reduction characteristics. The minimum number of slots for a given number of poles should not be below 50% to obtain adequate torque.

Conductor volume may be used to refer to the slot area per length of a single stator. The slot area is the area of a cross-section of a slot in the plane which is orthogonal to the teeth but not parallel to the plane of relative motion of the carriers. In an axial motor, this plane would be perpendicular to a radius passing through the slot. The slot area effectively defines the maximum conductor volume that can be incorporated into a stator design, and it is usually a goal of motor designers to have as high a fill factor as possible to utilize all the available space for conductors.

Since maximum conductor volume in a stator is defined in terms of slot area, any stator referred to as having a maximum conductor volume or slot area must have slots and teeth to define the slots. This parameter is defined for rotary motors as:

$$\text{Slot area per length} = \frac{N_s A_s}{\pi D_{AG}} = \text{slot density} \cdot A_s$$

where $A_S$ is the cross-sectional area of a single slot, or the average area of a single slot for stator designs that have varying slot areas.

As a relatively accurate approximation, $A_S$ may be calculated as the height of the tooth, $h_t$, multiplied by the average width of the slot, $w_s$, such that the equation above becomes:

$$\text{Slot area per length} = \frac{N_s h_t w_s}{\pi D_{AG}} = \text{slot density} \cdot h_t w_s$$

Slot depth or post height may also be used as a proxy for the conductor volume. The post height, also known as the tooth height or slot depth, is a proxy for the amount of cross-sectional area in a slot available for conductors to occupy. Although the slots may have a variety of shapes such as curved or tapered profiles, the slot height is based upon the closest rectangular approximation which best represents the total area of the slot which may be occupied by conductors. This dimension does not include features such as pole shoes which add to the height of the tooth without adding substantially to the slot area. For transverse flux motors, the post height is defined as the portion of the post which is directly adjacent to the conductor coil, perpendicular to the direction of the coil windings.

A concentrated winding comprises individually wound posts or any winding configuration that results in the alternating polarity of adjacent posts when energized. It is understood that not all posts will be the opposite polarity of both adjacent posts at all times. However, a concentrated winding configuration will result in the majority of the posts being the opposite polarity to one or both adjacent posts for the majority of the time when the motor is energized. A concentrated winding is a form of fractional slot winding where the ratio of slots per poles per phase is less than one.

The terms one-piece, unitary, homogenous, solid, isotropic and monolithic are used interchangeably when referencing a stator or rotor herein. Each of the terms excludes laminates and powdered materials that include significant electrical insulative materials. However, small insulating particles may be present that do not significantly interfere with the electrically conducting properties of the material, for example where the bulk isotropic resistivity of the material does not exceed 200 microohm-cm. A one-piece, unitary, homogenous, solid, isotropic or monolithic material may comprise iron, including ductile iron, metal alloys including steel, and may comprise metal alloys formed of electrically conducting atoms in solid solution, either single phase or multi-phase, or alloys formed of mixtures of metals with other materials that improve the strength or conductivity of the material, for example where the bulk isotropic resistivity of the material does not exceed 200 microohm-cm.

Embodiments of the present device use an integrated bearing race that is preferably machined into the stator and/or rotor where the bearing races and at least the axial surfaces of the stator and rotor posts can be machined in the same set-up. This can provide for very high tolerance manufacturing of the critical geometry relationship between the bearing race axial and radial positions relative to the stator and rotor posts. Consistency of these geometric relationships is important for consistent cogging and other performance characteristics of the device.

Embodiments of the present device can allow for streamlined manufacturing with a rotor configuration that allows the permanent magnets to be installed into the rotor individually after the stator and rotor have been assembled.

Embodiments of the device can provide high torque density, ease of manufacturability, ease of assembly and serviceability due to a very simple assembly with a minimal number of components, and excellent operational safety as a result of high torque-to-inertia which allows very fast emergency stopping.

As shown in FIG. 1, a non-limiting exemplary embodiment of an axial flux motor 110 is housed in an upper arm member 100 and a lower arm member 200. The upper and lower arm members 100, 200 rotate around a rotational axis 300.

Figure 2:
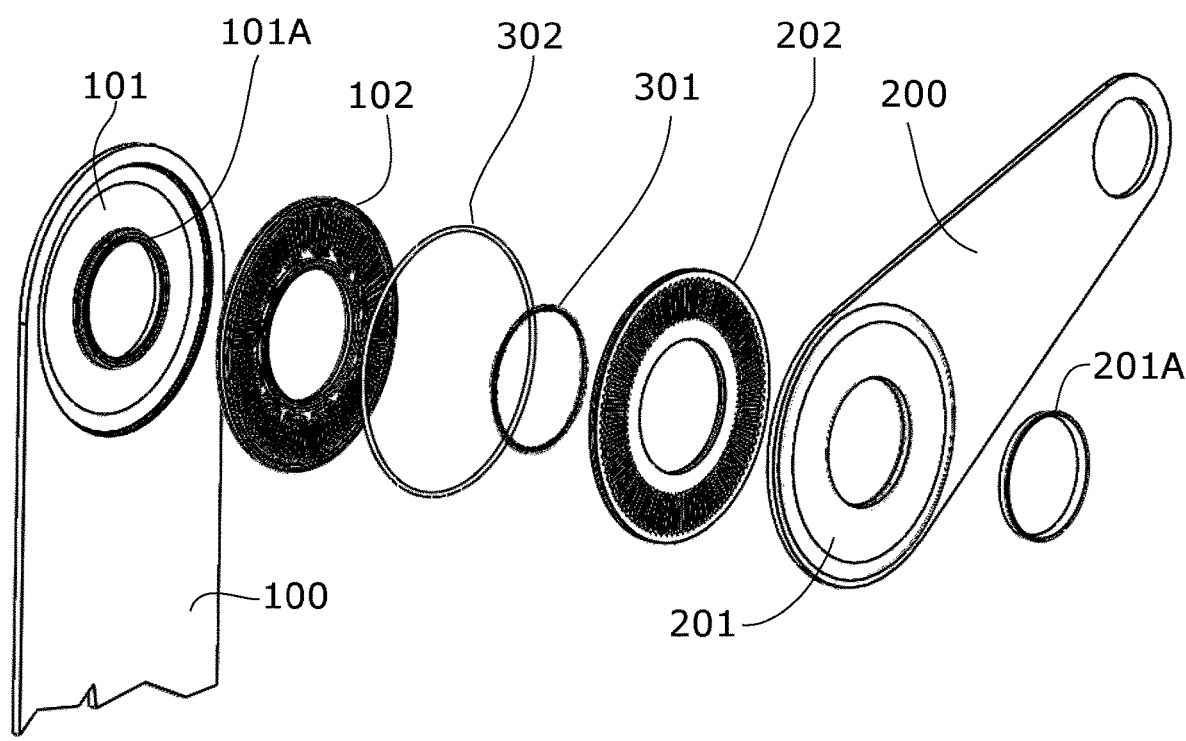
FIG. 2 is an exploded view of the exemplary actuator of FIG. 1.

A non-limiting exemplary embodiment of the device in a robotic arm assembly is shown in FIG. 2. The upper arm member 100 includes a support housing 101. The lower arm member 200 includes an arm housing 201. The support housing 101 and the arm housing 201 are preferably made of a light weight material such as, but not limited to, aluminum, magnesium or carbon fiber composite.

Figure 3:
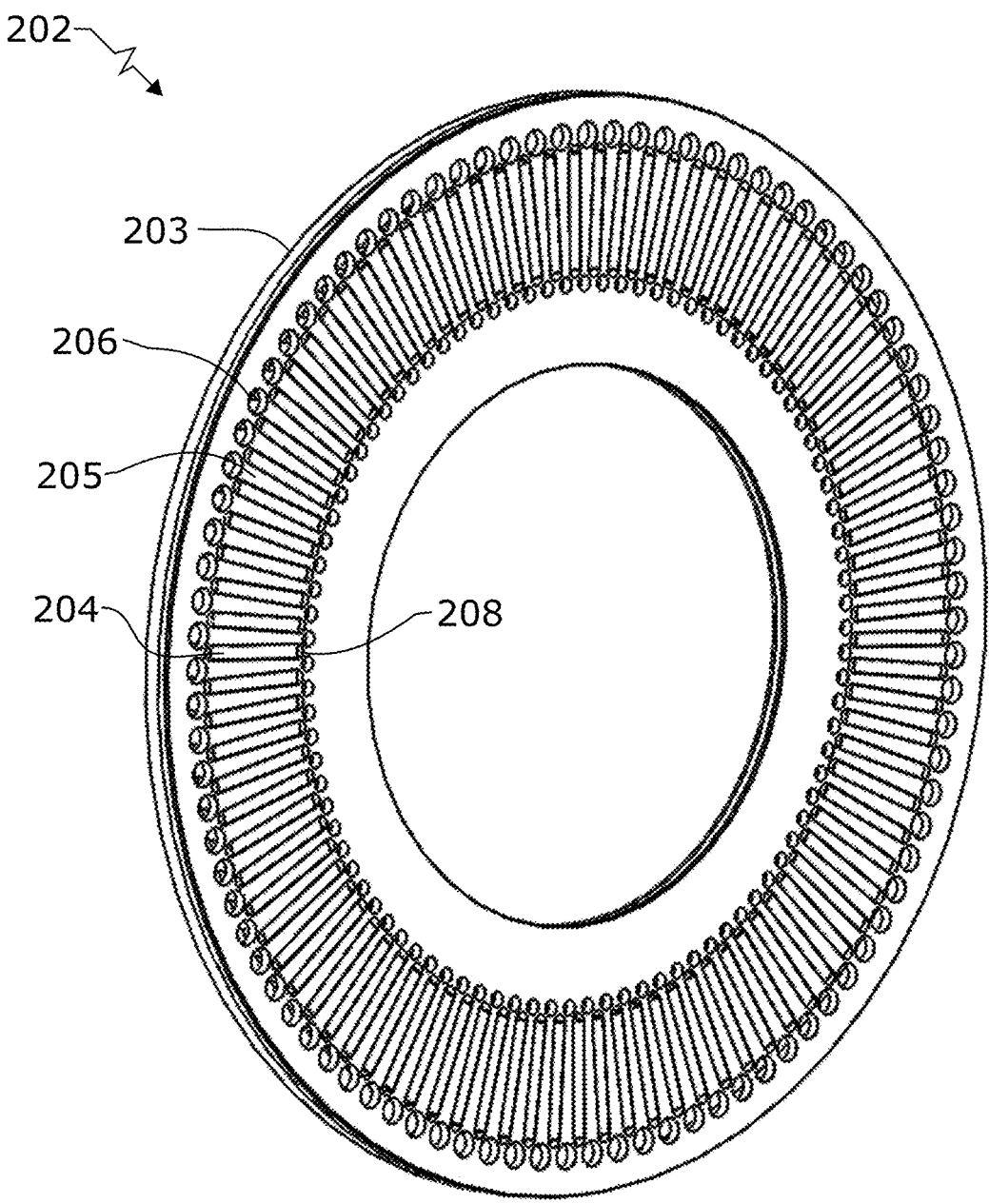
FIG. 3 is an isometric view of a rotor of the exemplary actuator of FIG. 1.

As shown in FIG. 2 to FIG. 5 the stator 102 is attached to the upper arm 100 such as with bolts and/or adhesive and/or thermal fit or by being formed integrally with the arm. In FIG. 2, the stator 102 is connected to the upper arm 100 using a press fit with a ring 101A. An outer bearing 302 and an inner bearing 301 allow relative rotation of the stator 102 and rotor 202 and provide precise relative axial location of the stator 102 and rotor 202 to maintain an airgap between stator posts 105 (FIG. 4) and rotor posts 205 (FIG. 3). As shown in FIG. 3, the rotor may have flux restriction holes 206 and permanent magnets 204. The permanent magnets are seated in slots 208.

The placement of the inner bearing 301 inside the ID of the airgap and the outer bearing 302 outside the OD of the airgap distributes the attractive forces between the stator 102 and rotor 202 between two bearings 301, 302 for longer service life and/or lighter bearings. The use of ID and OD bearings also reduces the mechanical stress on the stator 102 and rotor 202 to allow a thinner cross section and lighter weight, for example as is possible with the high pole count of embodiments of the device.

Figure 4:
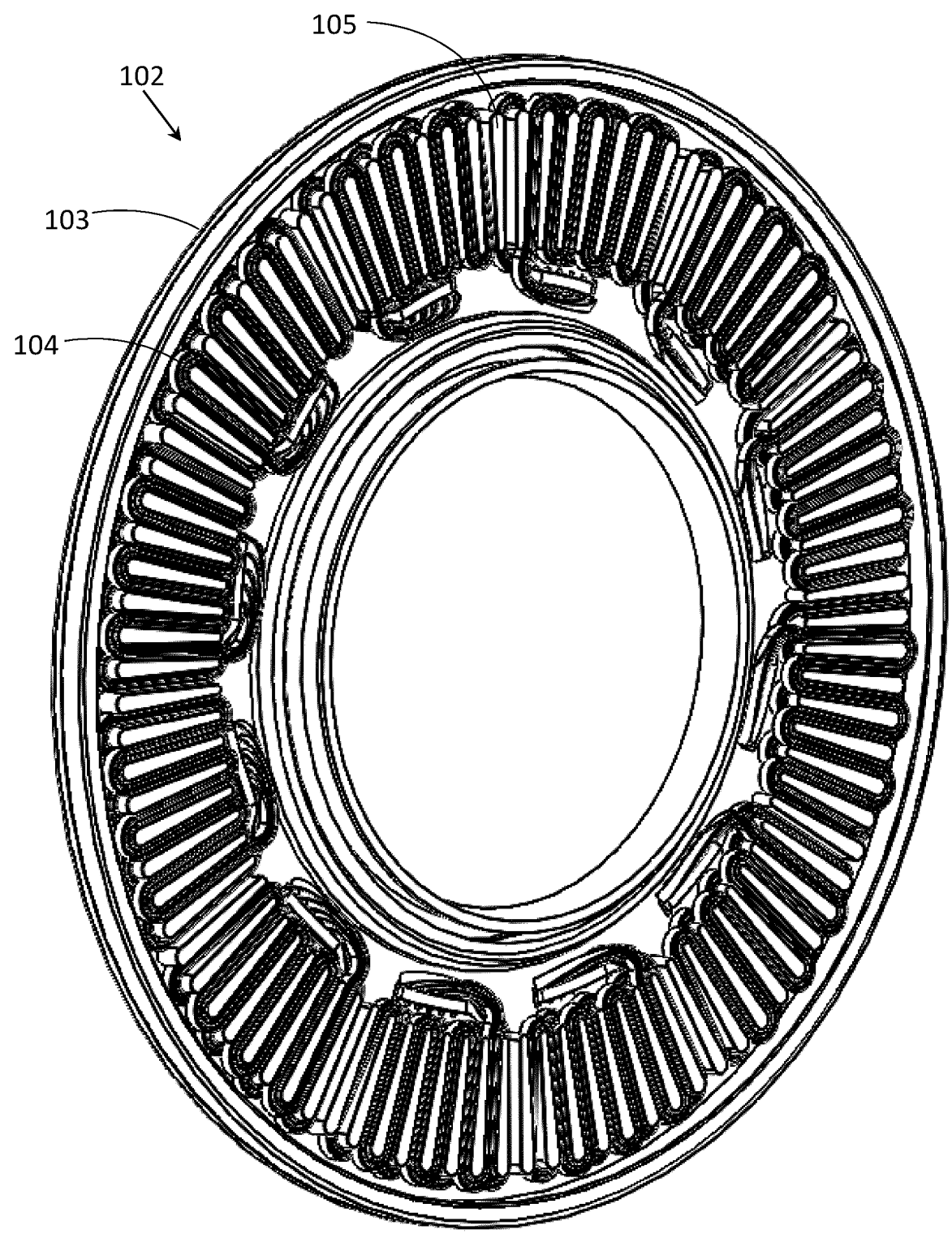
FIG. 4 is an isometric view of a stator of the exemplary actuator of FIG. 1.

As shown in FIGS. 3 and 4, the rotor 202 includes a rotor plate 203 (FIG. 3) and the stator 102 includes a stator plate 103 (FIG. 4). The stator plate 103, as shown in FIG. 4, and the rotor plate 203, as shown in FIG. 3, can be made of ductile iron. The permanent magnets 204 can be Neodymium—N52H. Many other materials can be used for the various components. These materials are given by way of example.

The rotor 202 is housed in the lower arm 200 and attached such as with bolts and/or adhesive and/or thermal fit or by being formed integrally with the arm. As shown in FIG. 2, the rotor 202 is connected to the lower arm 200 using a press fit with a ring 201A. The axial magnetic attraction between the stator 102 and rotor 202 which results from the permanent magnet flux in the rotor 202 provides axial preload on the bearings 301 and 302. It has been shown by analysis and experimentation that with high strength magnets such as but not limited to neodymium N52 magnets, that this axial force is adequate to keep the bearings 301, 302 preloaded in the stator 102 and rotor 202 and to provide adequate axial force to allow the lower arm 200 to support useful loads in all directions. This load may be a combination of the arm weight and acceleration forces and payload in any direction.

Figure 6:
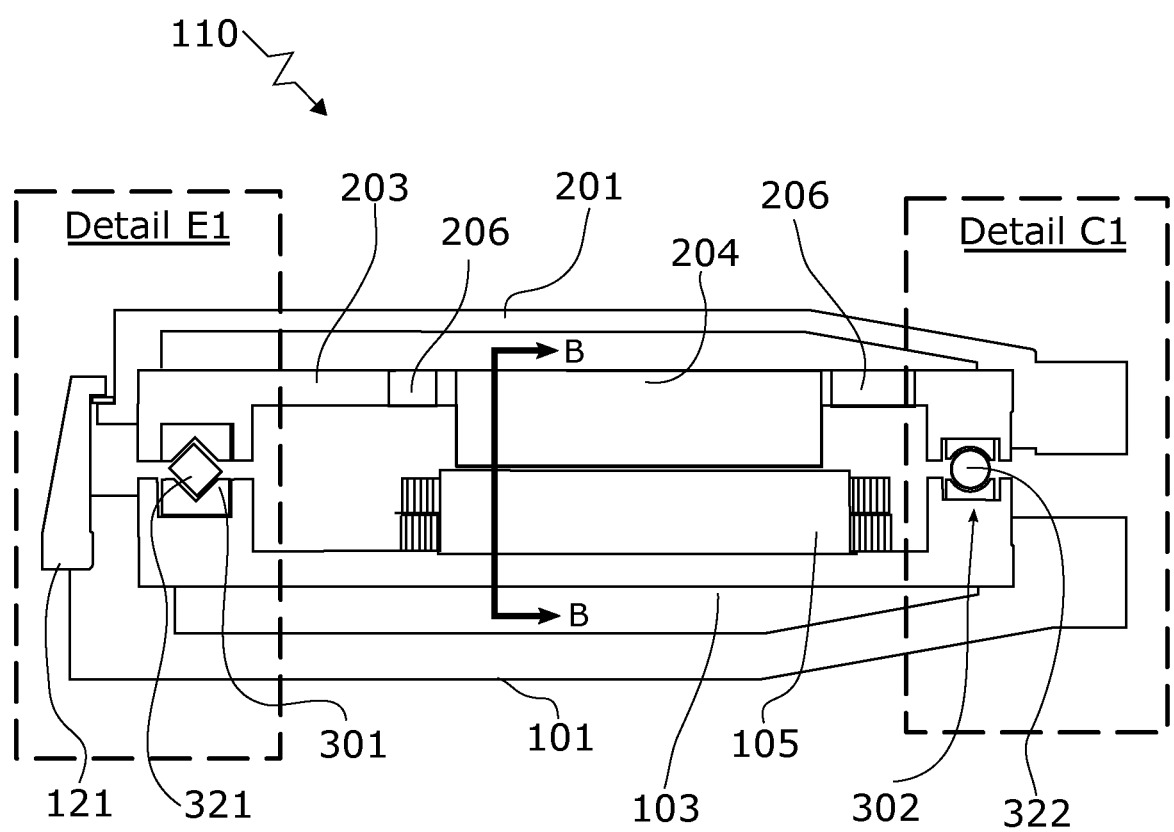
FIG. 6 is a view of the body of the exemplary actuator along the section A-A in FIG. 1.

Referring to FIG. 6, the axial flux motor 110 may have the design shown. An outer bearing 302 and an inner bearing 301 allow relative rotation of the stator and rotor and provide precise relative axial location of the stator and rotor to maintain the desired airgap between the stator posts 105 and the rotor posts that hold magnets 204 and that provide a flux path for the magnetic fields provided by the magnets. The rotor may have flux restriction holes 206 and magnets 204. The use of a bearing inside the ID of the airgap and a second bearing outside the OD of the airgap distributes the attractive forces between the stator and rotor between two bearings for longer service life and/or lighter bearings. The use of ID and OD bearings can reduce the mechanical stress on the stator and rotor to allow a thinner cross section and lighter weight, for example as is possible with the high pole count of embodiments of the device.

In the non-limiting exemplary embodiment shown in FIG. 3 and FIG. 4, there are 96 stator posts (corresponding to 96 slots) and 92 rotor posts with three phase wiring and each phase on the stator being divided into 4 equally array sections of eight posts each. The number of rotor posts in this example is 92 resulting in four equally arrayed angular positions where the rotor and stator posts are aligned. This, in-turn, results in a peak axial attraction force between the stator and rotor in four positions.

Note that many other combinations of stator post numbers and rotor post numbers may be used. Other numbers of phases may also be used. The examples here have been found to provide beneficial performance but do not limit the various construction principles to these exemplary geometries. For example features of embodiments of the device such as, but not limited to, the magnetically preloaded bearings or the wiring constructions can be used with rotors and stators with much lower or much higher numbers of poles.

Furthermore, it is beneficial for embodiments of the device that use embodiments of the wiring configuration shown that the number of posts on the stator be a multiple of three sections such as 3, 6, 9, 12, 14, 16 etc with each section having an even number of posts such as 2, 4, 6, 8, 10, 12 etc on the stator.

Figure 5:
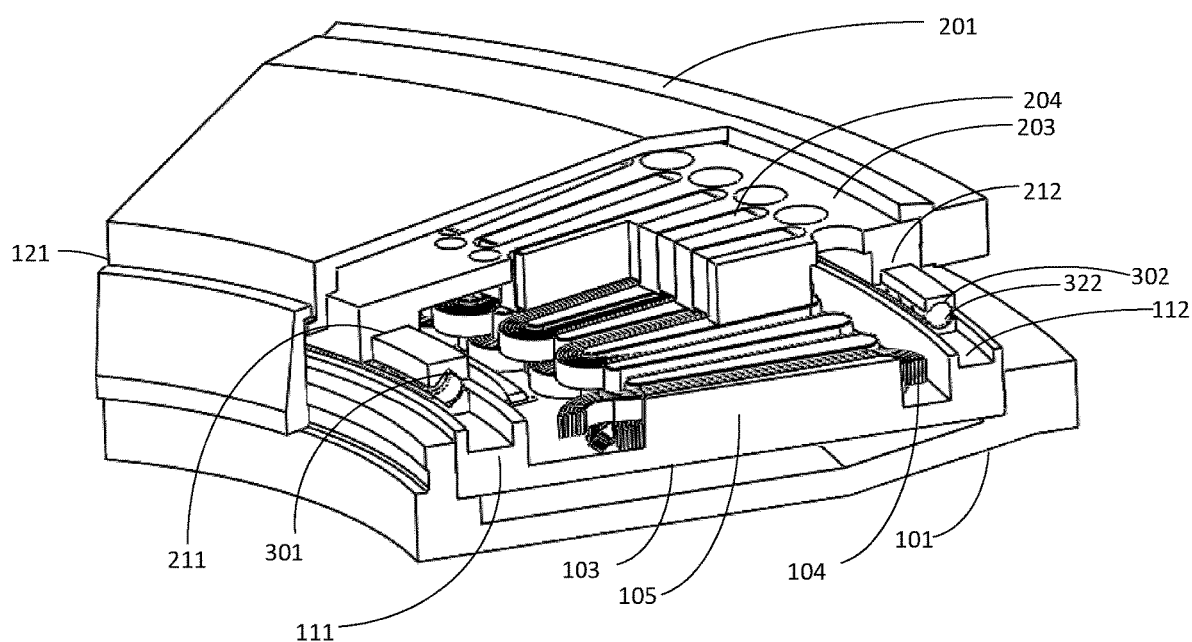
FIG. 5 is an isometric view of a section of the exemplary actuator of FIG. 1.

It is common with many typical three phase motors to have wires from two or three phases in a single slot. Embodiments of the present device use a wiring configuration where two or more adjacent slots in a row contain conductors from only one phase. Many different winding methods may be used with this device but the advantages of a winding configuration 104 as shown in FIGS. 4 and 5 includes the ability to use axially aligned (circumferentially layered in each slot) non-overlapping flat wire (overlapping the wire—as is typically done in three phase distributed winding machines, is problematic with flat wire). To take advantage of the simplicity of assembly of this winding configuration and method, it can be beneficial to have as few sections per phase as possible (such as one section per phase EG: 32 slots per phase for a 96 slot stator, or two sections per phase EG: 16 slots per phase for a 96 slot stator). The number of rotor posts for this winding configuration is preferably equal to the number of stator slots plus or minus the number of sections per phase EG 94 or 98 rotor posts for a 96 stator slots having two equally arrayed sections per phase.

Figure 13:
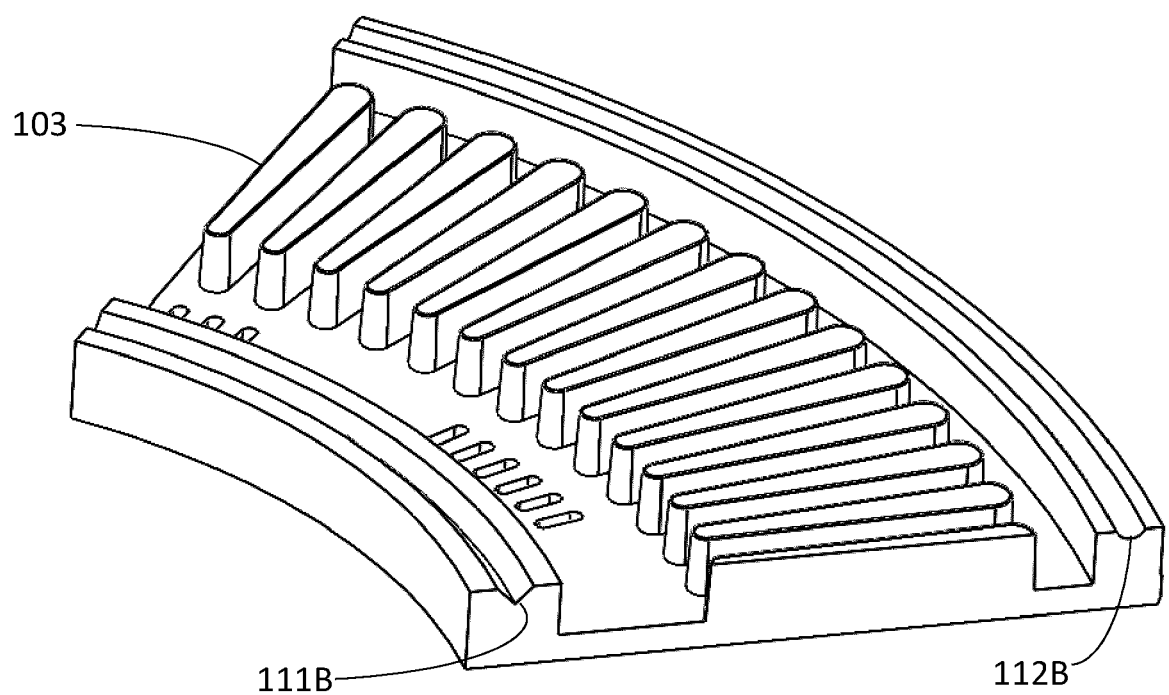
FIG. 13 is an isometric view of a section of an exemplary stator plate with integrated bearing races.
Figure 14:
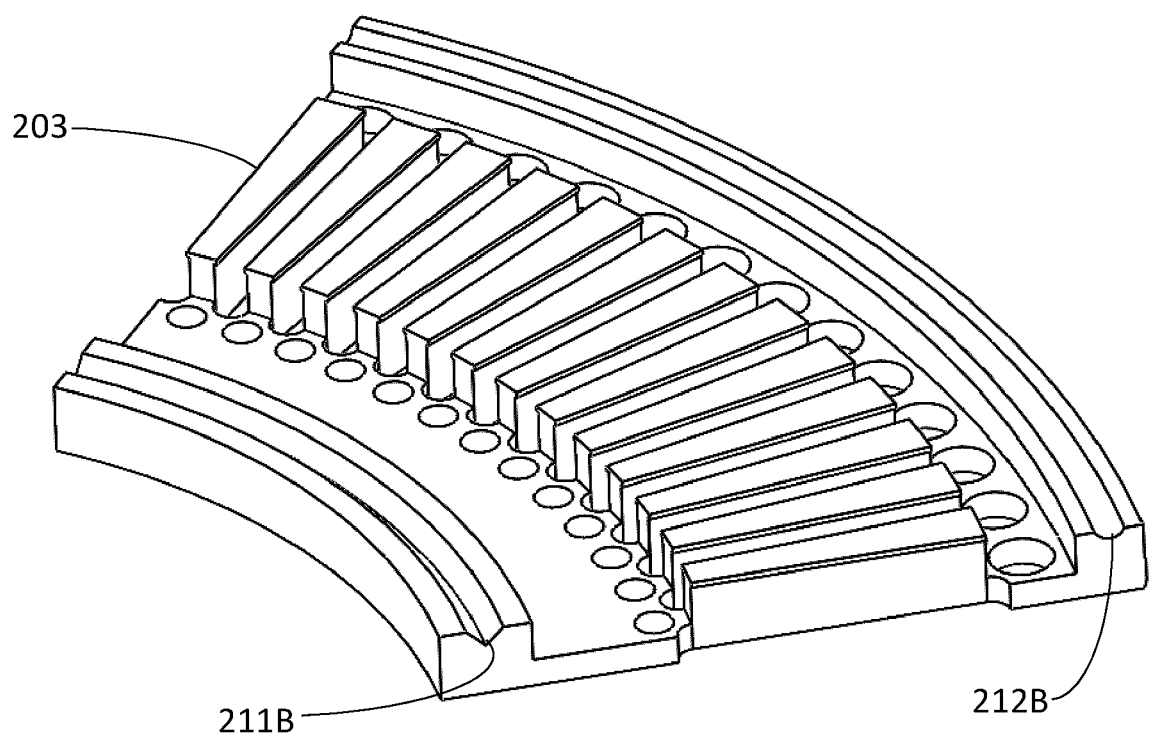
FIG. 14 is an isometric view of a section of an exemplary rotor plate with integrated bearing races.
Figure 15:
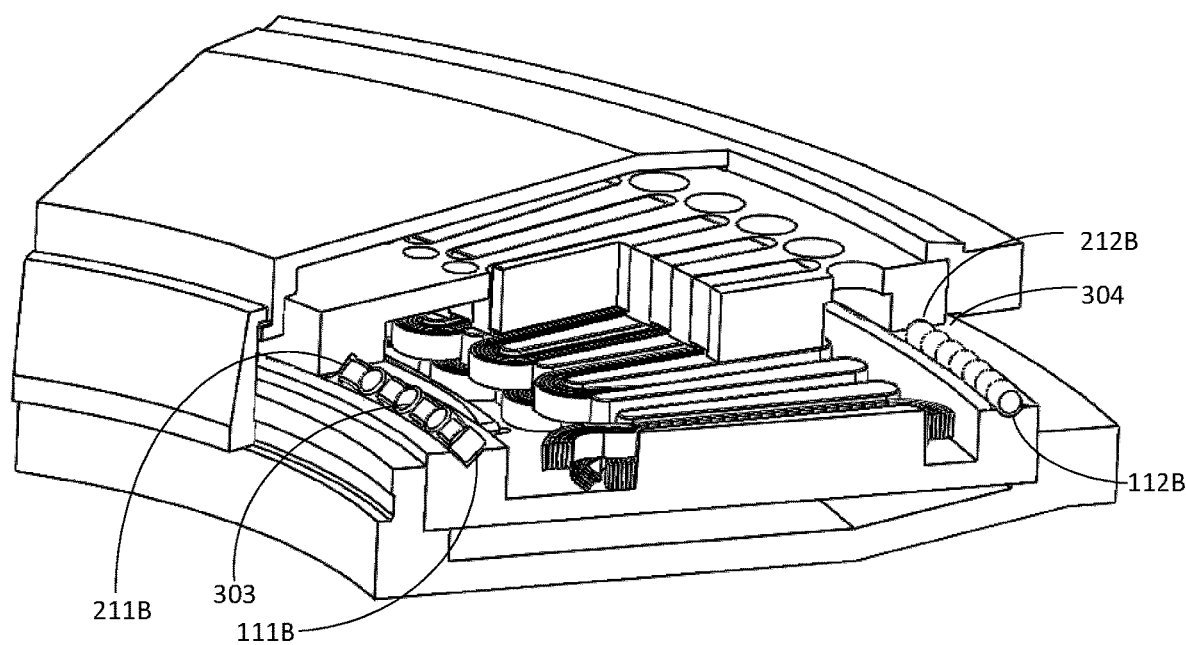
FIG. 15 is an isometric view of a section of exemplary actuator with integrated bearing races.

A monolithic material from post to post on the stator and/or rotor can used to provide a housing structure. The rotor and/or stator have the structural rigidity to eliminate the need for an additional housing on one or both members. Integrating the stator and rotor as a homogenous plate may reduce weight, as well as manufacturing cost and complexity. An integrated bearing race that is formed as part of each homogenous plate may allow the structural load path from the stator posts to the bearing race in contact with the rolling elements to be formed from a single piece of magnetic metal such as shown in FIGS. 13 to 15. ID and OD bearings are used to reduce rotor and stator material stress with axially thin components and to maintain a small airgap. An uninterrupted soft magnetic homogeneous material may be used such as, but not limited to iron or steel alloy between two or more of: a stator or rotor post and a bearing, a stator or rotor post and an adjacent post, a stator or rotor post and an OD bearing or bearing seat, a stator or rotor post and an ID bearing or bearing seat, and a stator or rotor post and a structural member in the load path between the post and a bearing.

For example, the homogenous material for the stator and/or rotor could include ductile iron or other type of iron construction. The homogenous material for the stator and/or rotor could also include from one of iron, ductile iron and steel alloy and may also include an electrical conductivity inhibitor, such as silicone.

The use of ductile iron for the stator and/or rotor allows a combination of characteristics that may be uniquely suited to the unusual requirements of embodiments of the device. Some of the features of ductile iron that may be beneficial in some embodiments include poor electrical conductivity due to the high carbon content which results in reduced eddy current losses, excellent machinability for low cost manufacturing, excellent castibility for net or near-net shape casting of stator and/or rotor, high fatigue strength for long service life, self lubricating properties which may allow an integrated bearing to operate with minimal or no additional lubricant, excellent wear properties between certain seal materials in the dry condition to provide bearing and actuator sealing with no need for lubricant in some applications, and good damping qualities to reduce noise and vibration from cogging and other high frequency effects As mentioned above, embodiments of the device include a set of bearing elements at or near the inner diameter (ID) and a set of bearing elements at or near the outer diameter (OD). This combination of bearings provide axial and radial support between the rotor and stator when combined with the claimed geometry range may allow the rotor and stator to be light weight. The ID and OD bearings also maintain a fixed air gap distance.

It has been shown that, even though it is detrimental to torque, due to the drag from the bearing on the OD of the rotor, placing a bearing set on the OD of the rotor in an axial flux machine enables a more precisely controlled, and therefore smaller air gap distance between the rotor and stator with the benefit of generating more torque with the device. Air gap distance between the rotor and stator can be limited by machining tolerance and deflection of the rotor during operation due to permanent magnet (PM) attraction. The rotor in an axial machine will deflect due to magnetic flux in the air gap, so the air gap needs to be larger than the operational deflection of the rotor to avoid contact between the stator and rotor. Comparing the deflection between an actuator with only an ID bearing with an actuator with ID and OD bearings, the rotor and stator in an ID-only actuator deflect significantly more than the rotor in the ID/OD bearing actuator. The reduction in deflection in the ID/OD actuator may allow a smaller air gap distance to be maintained which result in greater torque for a given input power. It has been shown by analysis and experimentation that the torque gained by air gap distance reduction may be larger than the drag induced by the OD bearing in some embodiments. It has also been shown that the increase in torque-to-weight that results from the use of an OD bearing, due to the reduction of structural material needed to maintain the airgap, may be more significant than the weight of the additional bearing and material needed to support the additional bearing.

In a non-limiting exemplary embodiment of the present device, the outer diameter of the stator is 200 mm and the axial air gap is approximately 0.010".

Figure 7:
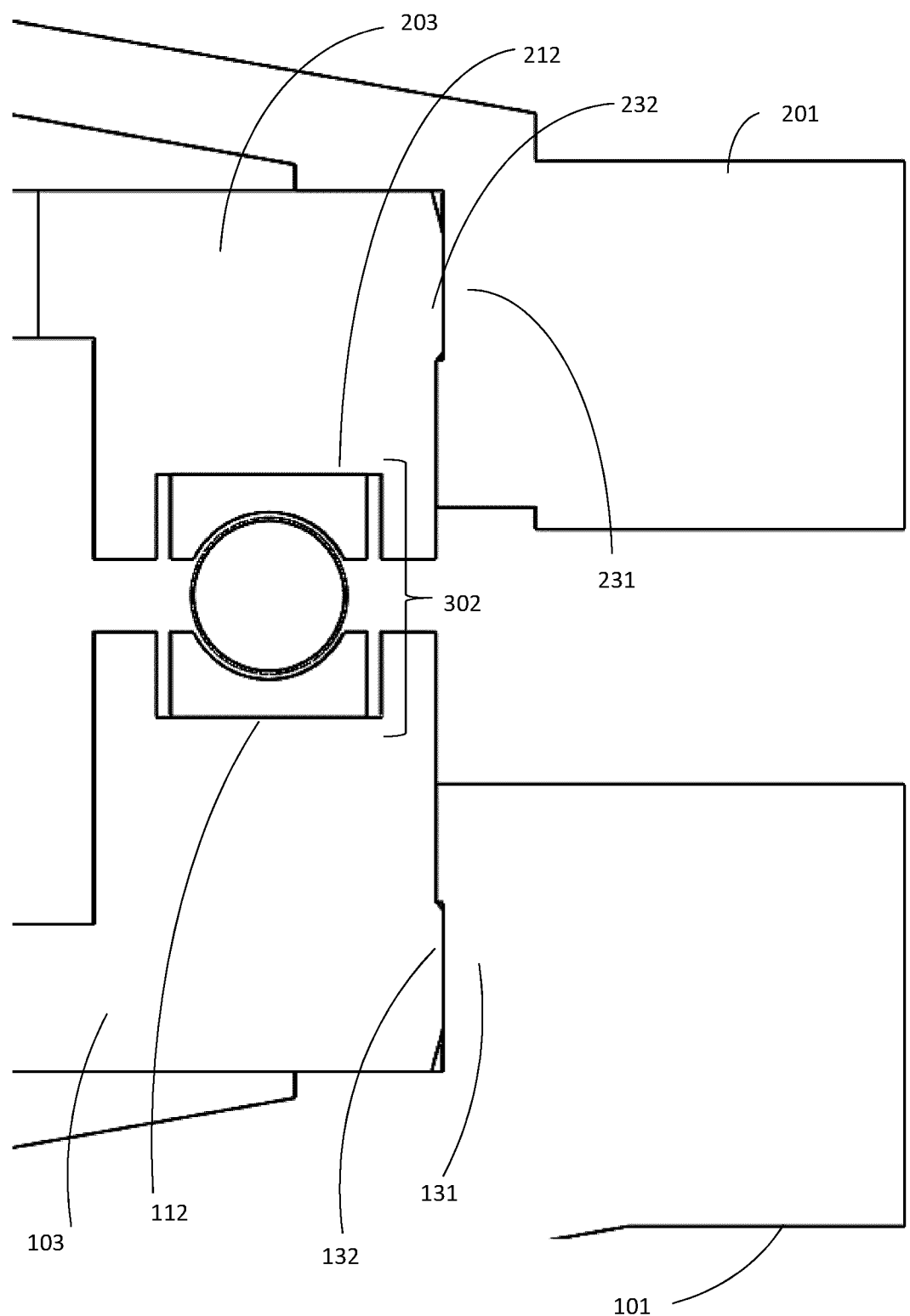
FIG. 7 is an enlarged detail view of an outer bearing and thermal interference fit showing the detail C1 in FIG. 6.
Figure 8:
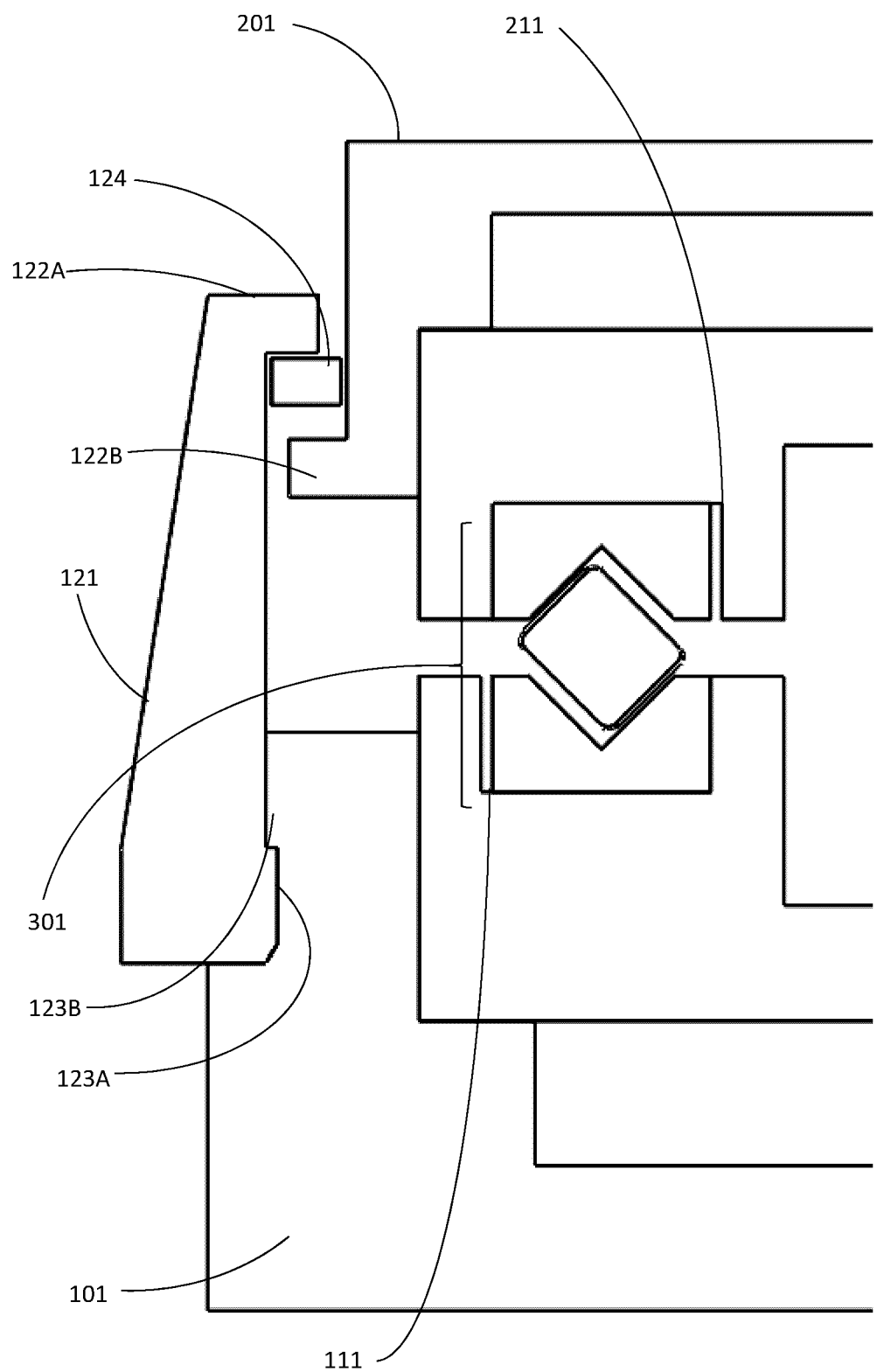
FIG. 8 is an enlarged detail view of an inner bearing and safety ring showing the detail E1 in FIG. 6.
Figure 9:
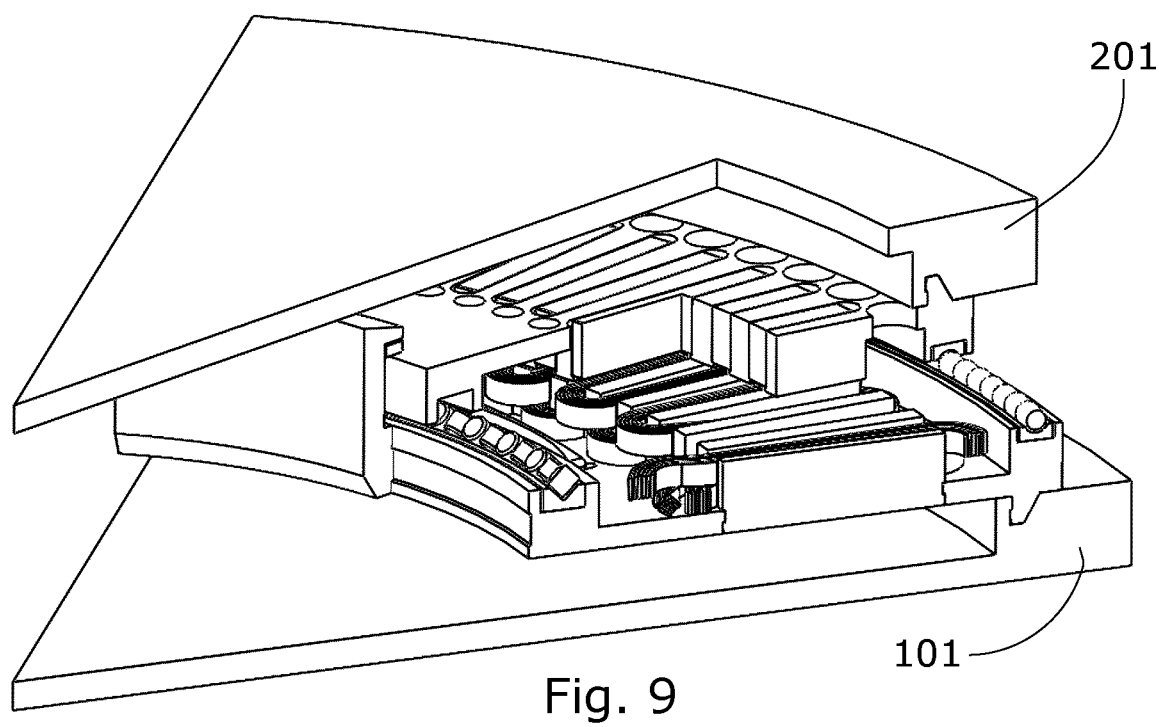
FIG. 9 is an isometric view of a section of an exemplary actuator having an alternative thermal interference fit.
Figure 10:
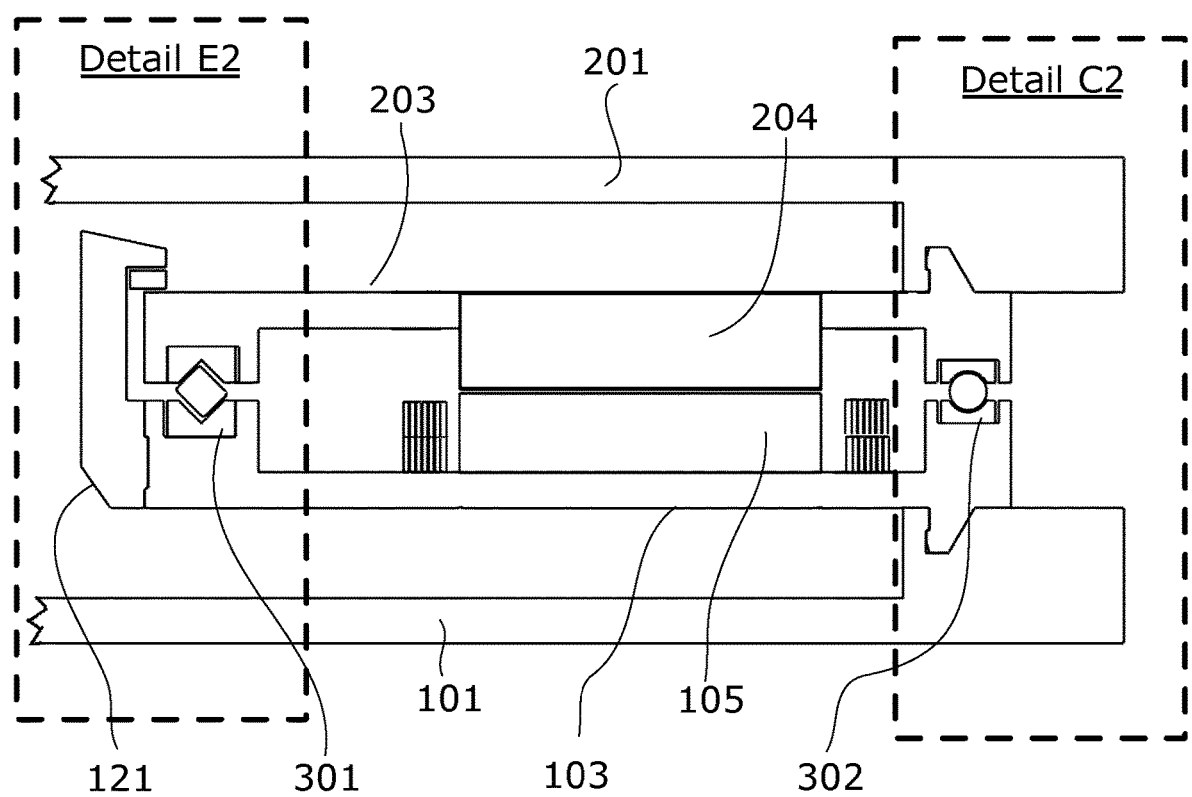
FIG. 10 is an section view of the exemplary actuator in FIG. 9.
Figure 11:
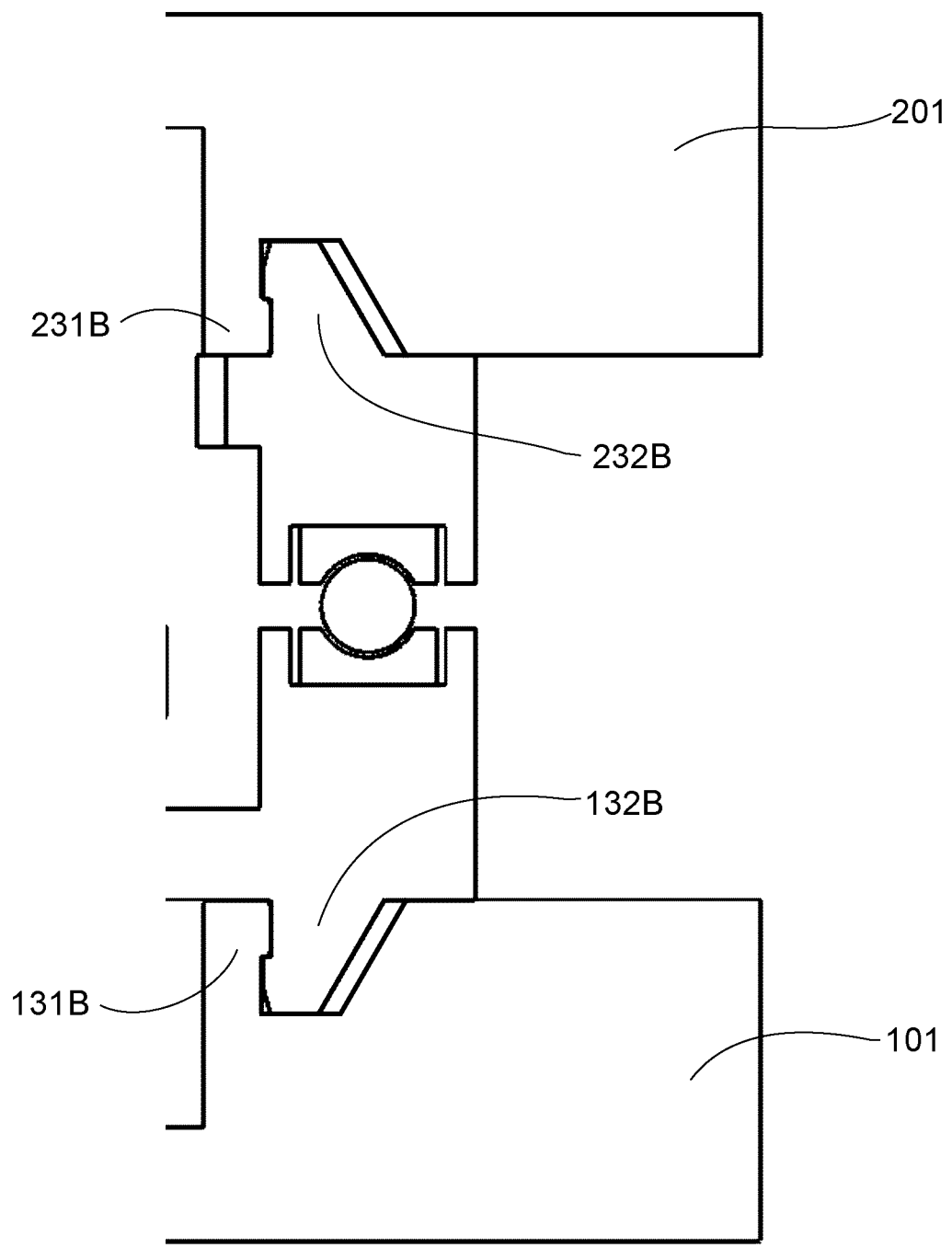
FIG. 11 is an enlarged detail view of an outer bearing and an thermal interference fit showing the detail C2 in FIG. 10.
Figure 12:
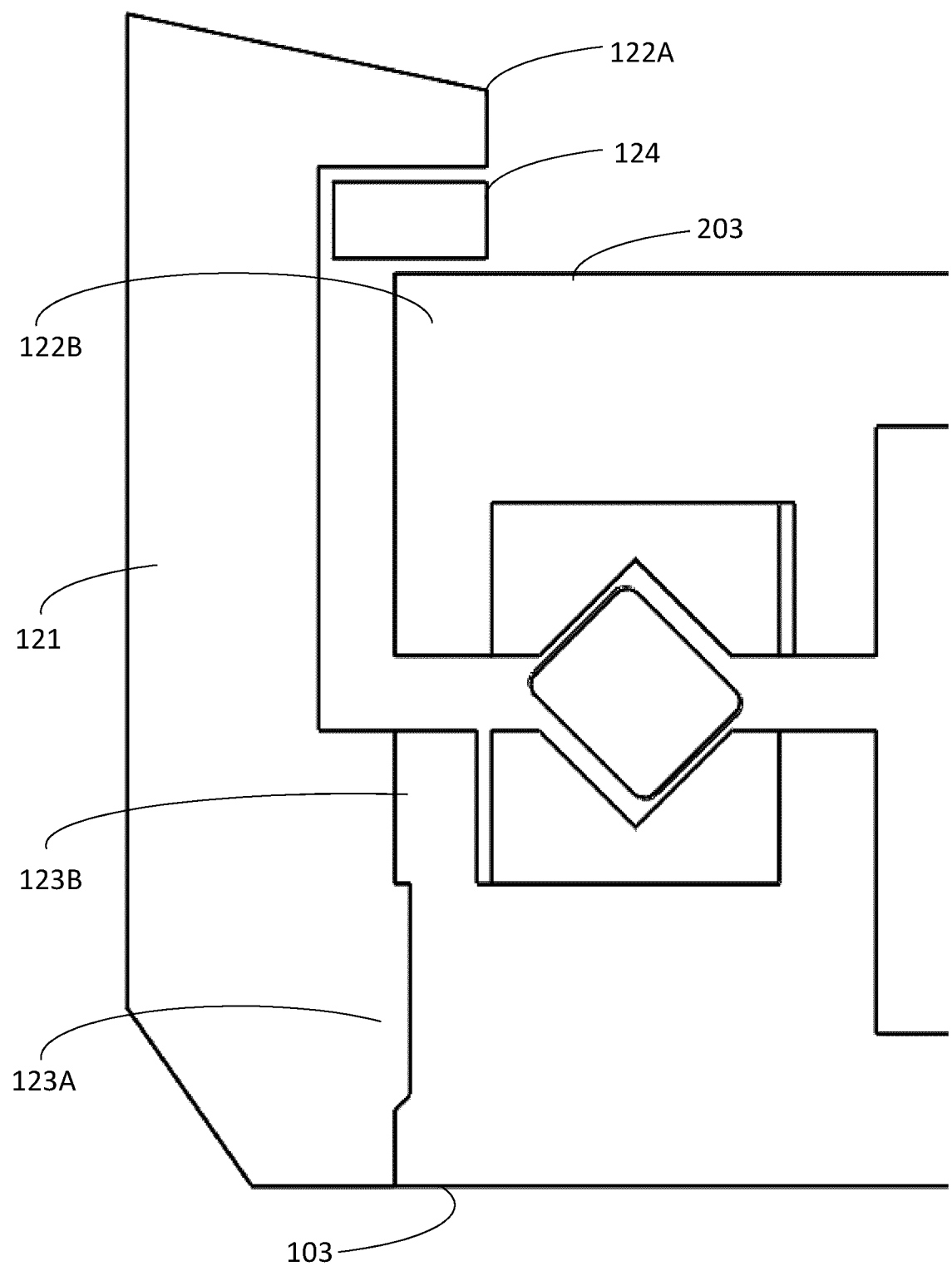
FIG. 12 is an enlarged detail view of an inner bearing and safety ring showing the detail E2 in FIG. 10.
Figure 16:
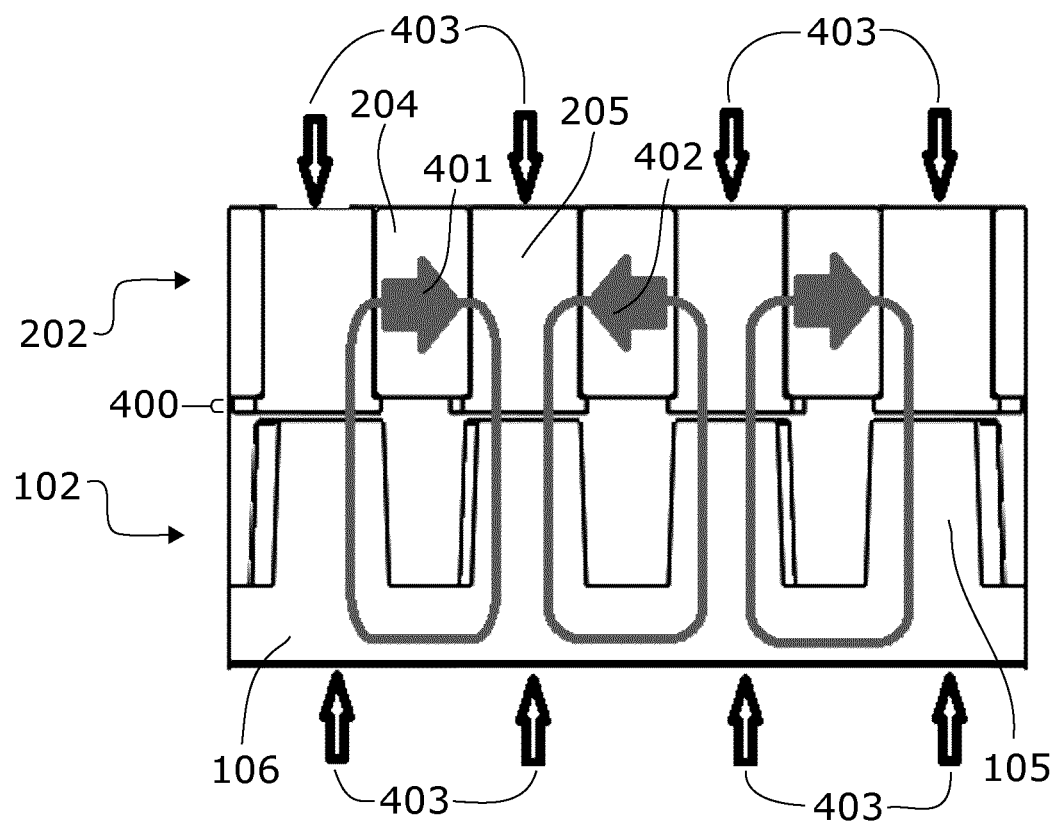
FIG. 16 is a section view of a rotor and stator including representations of magnetic flux and forces along the section B-B in FIG. 6.
Figure 17:
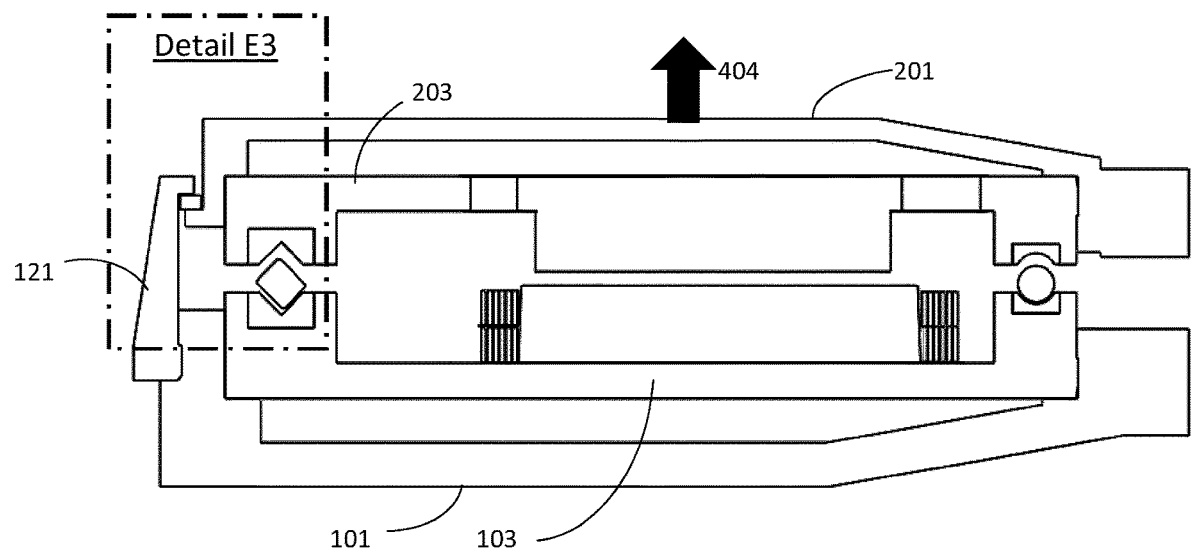
FIG. 17 is a view of the body of an exemplary actuator with a safety ring.
Figure 18:
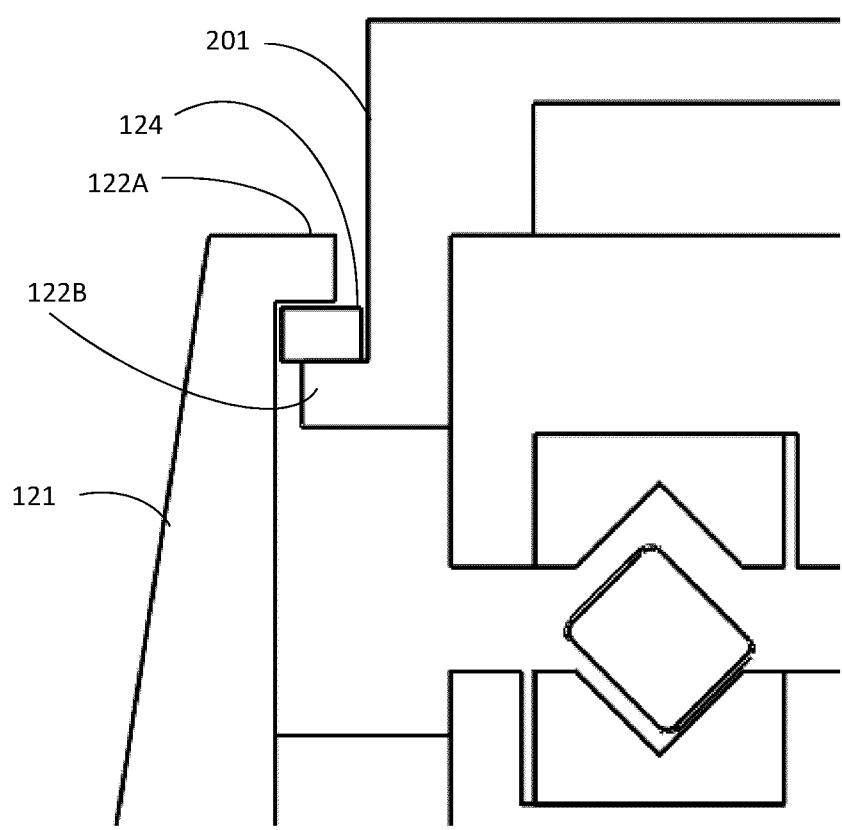
FIG. 18 is a detail view of a safety ring with a plain bearing.
Figure 19:
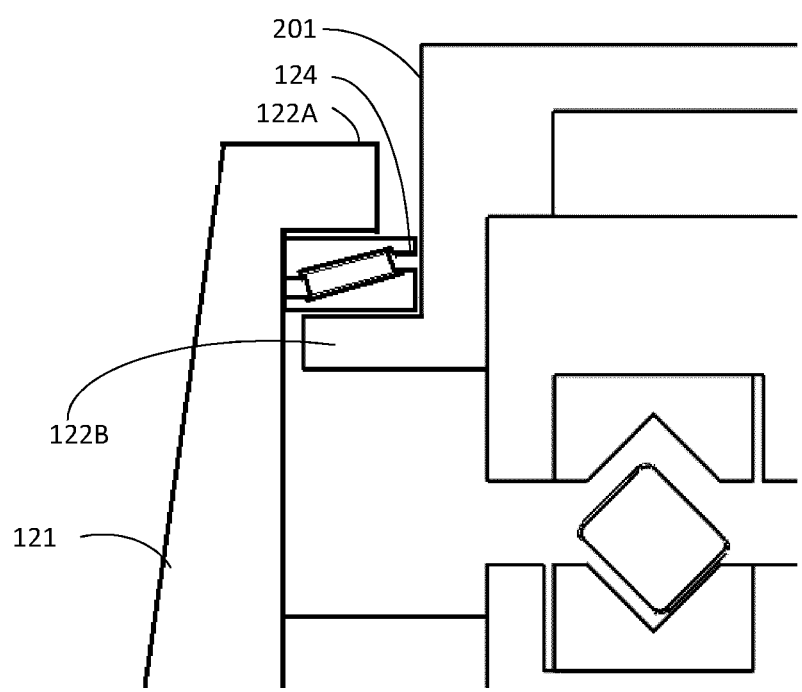
FIG. 19 is a detail view of a safety ring with a thrust bearing.

A non-limiting exemplary embodiment of the device has one stator and one rotor as shown in FIGS. 7 to 9. The single stator/single rotor setup enables the rotor to preload the ID and OD bearings by constantly attracting the stator in the axial direction. As illustrated in FIG. 16, permanent magnets 204 generate magnetic flux represented by the arrow 401. Meanwhile, an adjacent magnet also generates the same polarity magnetic flux 402 into the pole 205. Both flux 401 and 402 travel through the rotor pole 205, pass through the airgap 400, into stator post 105, and generate magnetic attractive forces 403 on both the stator 102 and the rotor 202. The magnetic forces 403 are so strong that they are able to hold the stator and the rotor together during passive and active operation under usable operating conditions for many applications. The posts are connected to a back iron 106.

For a 10" OD actuator of the present device, attractive forces have been demonstrated in the range of ~2000 lbs. This force is high enough to make assembly and disassembly of the device extremely difficult for small devices, and prohibitively difficult and unsafe for larger versions of the device.

Assembly and disassembly safety concerns may be reduced with embodiments of the device, and the cost and complexity of assembly fixtures may be reduced.

Figure 20:
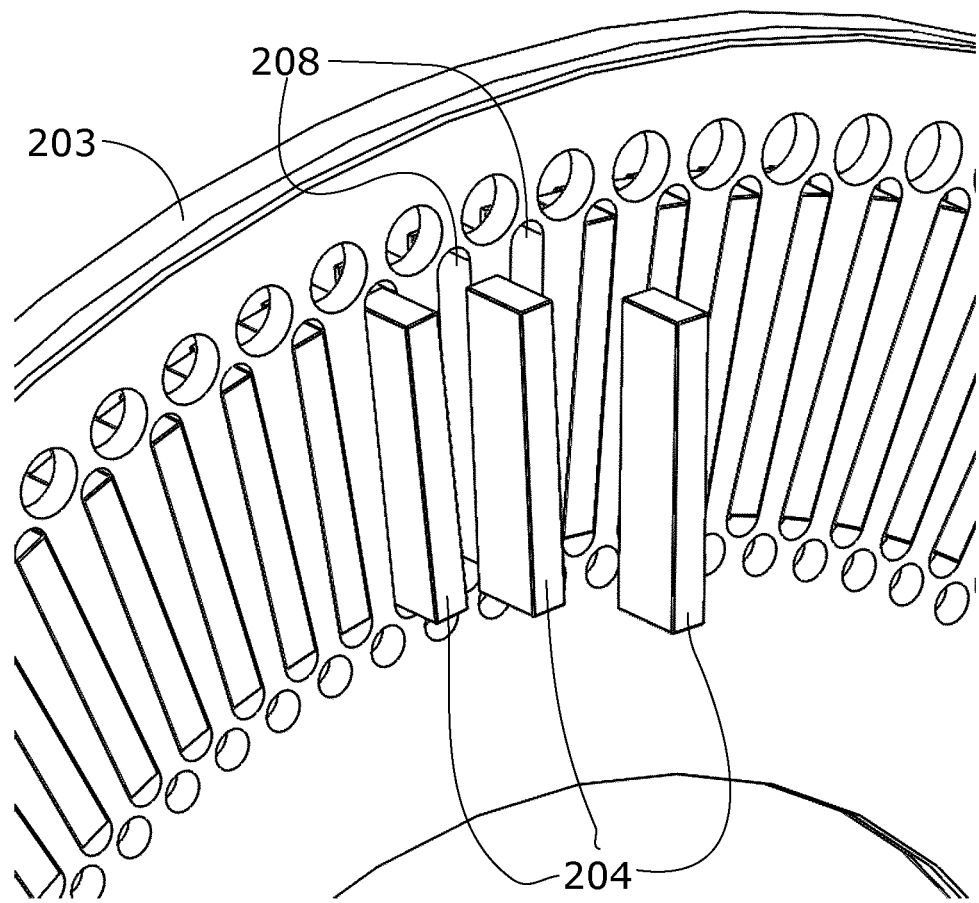
FIG. 20 is a close up view of a rotor during installation and removal of the magnets.

The rotor plate shown in FIG. 3 has no back iron immediately axially outward from the permanent magnets (corresponding to radially outward from the permanent magnets in a radial flux embodiment of the device etc.). As a result, magnet slots 208 are open on the back face of the rotor so magnets can be assembled into the slots after the stator and rotor are assembled. FIG. 20 shows that the magnets 204 can be accessed from the back of the rotor which allows each of those magnets to be removed or installed individually without removing the rotor from the stator.

The magnets 204 may be installed into the slots as follows. Align the magnet to the slot with the same polarity magnetic flux contacting the rotor post as the adjacent magnet contacting the same post. Every second magnet will be in the same circumferential polarity alignment. Every first magnet will be the opposite of every second magnet so the posts are alternating polarity. Slide the magnet into the slot until it is secured against the tabs (if parallel sided) or, if tapered magnets are used, until the tapered magnet seats into the tapered slot. Repeat the above steps until all the magnets are installed. Apply bonding agent (eg, wax, epoxy, glue) to fill the clearance gap. This step may not be necessary in all cases, such as with a precision tapered magnet in a precision tapered slot.

To remove the rotor and access the stator coils and ball bearings, the rotor can be easily demagnetized by removing the magnets individually.

As shown in FIG. 16, each of the permanent magnets 204 in the rotor generates the same polarity flux as its immediately adjacent permanent magnet which means every magnet will be repelling the adjacent magnets on both sides of it. This would cause the magnets to repel each other, except it has been shown that certain geometries are able to prevent these repelling forces from causing the magnets to dislodge themselves form the slots. The smaller the airgap, for example, the stronger the force, in many cases, which will cause the magnets to lodge themselves into, instead of out of, the slots. The use of tapered magnets is also beneficial in this sense, because a tapered magnet, with the large dimension of the taper toward the back face of the rotor, will generally be more apt to pull itself axially toward the rotor posts and therefore toward the airgap.

Figure 21:
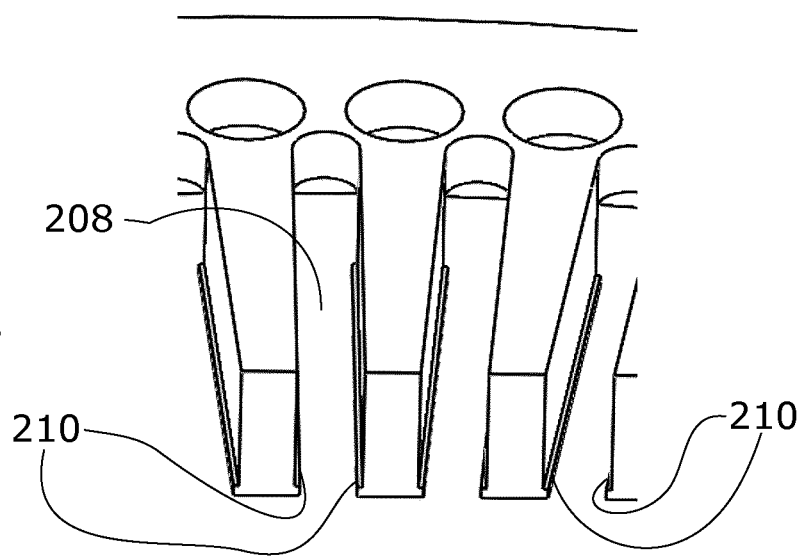
FIG. 21 is a partial cross section of a rotor plate section.

As shown in FIG. 21, a physical stop is used to stop the magnet from moving into the airgap. In this embodiment, the stops are tabs 210 on each side of the slot generate attractive forces as the magnet slides into the slot. Their combined force pull the magnet into the slot. Since the repelling forces partially or completely cancelled out, the combined force from the poles and tabs becomes the resultant force acting on the magnet. The magnets sit on the tabs and the magnetic attractive forces secure the magnets to the poles. When configured correctly, as described in an earlier disclosure, the net force on the magnets can be tailored to use the magnetic forces to magnetically retain the magnets in the slots. Adhesive or mechanical mechanism is not required in this case except to prevent side-to-side movement of a magnet in a slot.

Figure 22A:
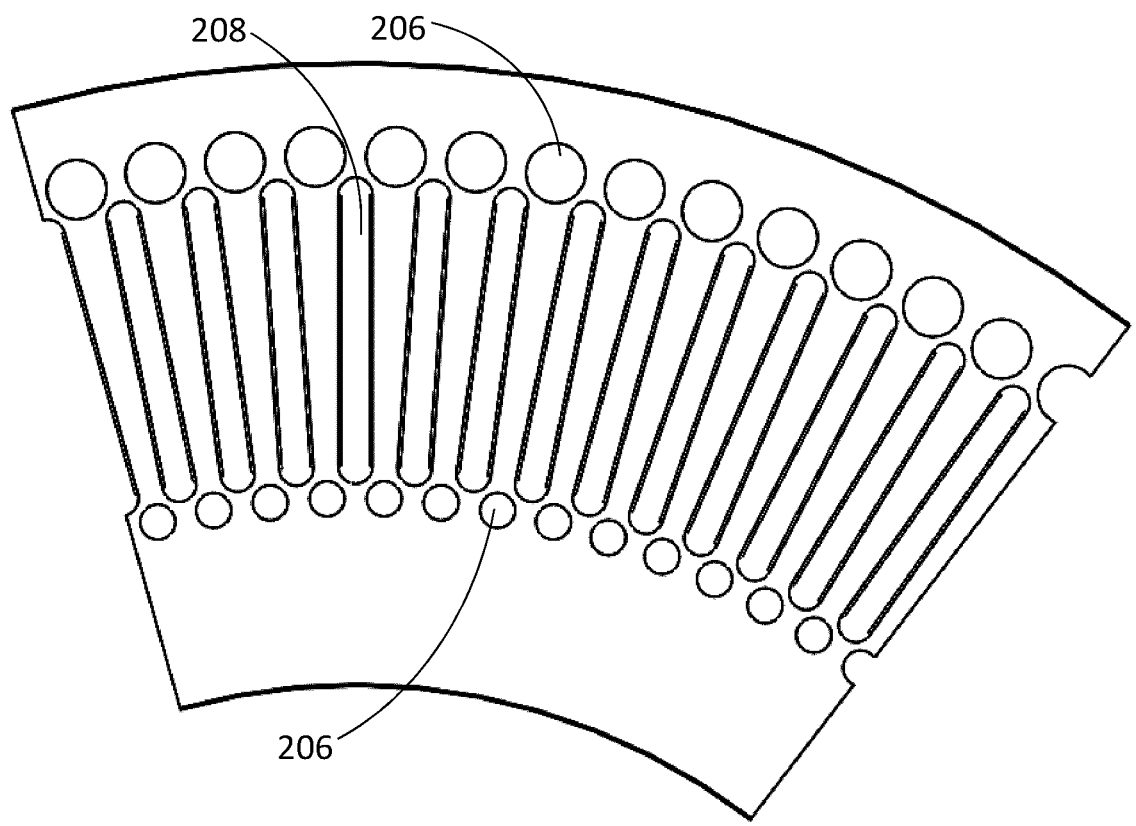
FIG. 22A is a partial view of a rotor plate section having flux restricting holes.

A non-limiting exemplary embodiment of the actuator is shown in FIG. 22A with flux restriction holes 206 placed between magnet slots 208, and along the outside and inside radius of the magnet slots 208 on the rotor to reduce flux leakage between the opposite polarity faces of a magnet and between adjacent rotor poles. Magnetic simulation was done to verify if those holes reduce flux leakage and it has been shown that the flux leakage between rotor poles can be substantially reduced while still maintaining the necessary structural strength and stiffness to achieve a small and consistent airgap.

Figure 22B:
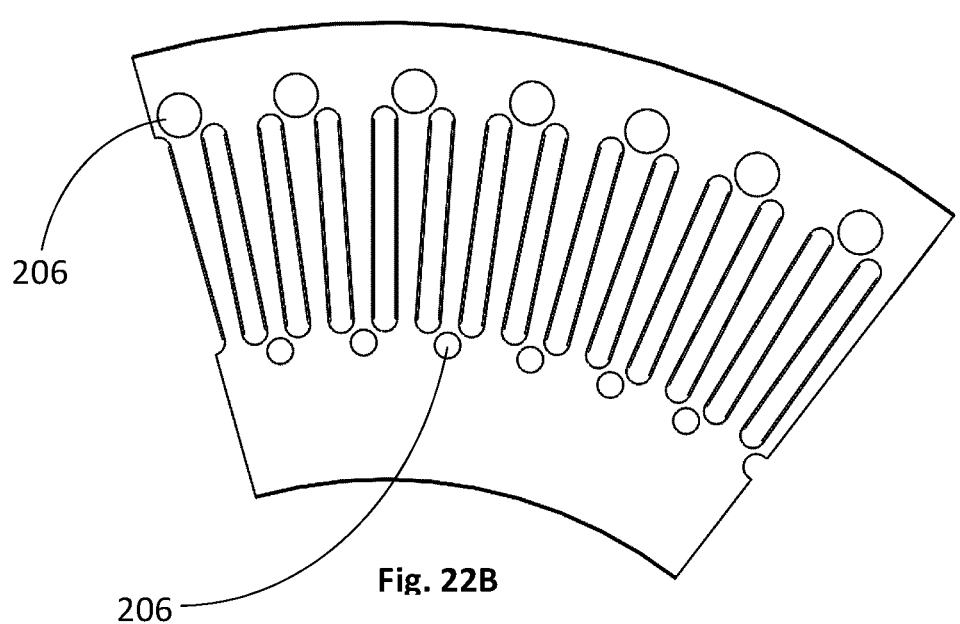
FIG. 22B is a partial view of a rotor plate section having another arrangement of flux restriction holes.

The flux restriction holes can, alternatively, be located between every second post on the OD and between every second post on the ID as shown in FIG. 22B. As shown in FIG. 22B, the inner and outer flux restriction holes are staggered so that each post is adjacent to only one of the inner or outer flux restriction holes. This provides an unrestricted flux linkage between only the N posts around the OD and only the S posts around the ID as well as increased structural integrity for every first post around the OD and every second post around the ID. These holes can be thru-holes or blind holes, as long as they provide the necessary structural strength and stiffness as well as the desired flux path reluctance.

Figure 23:
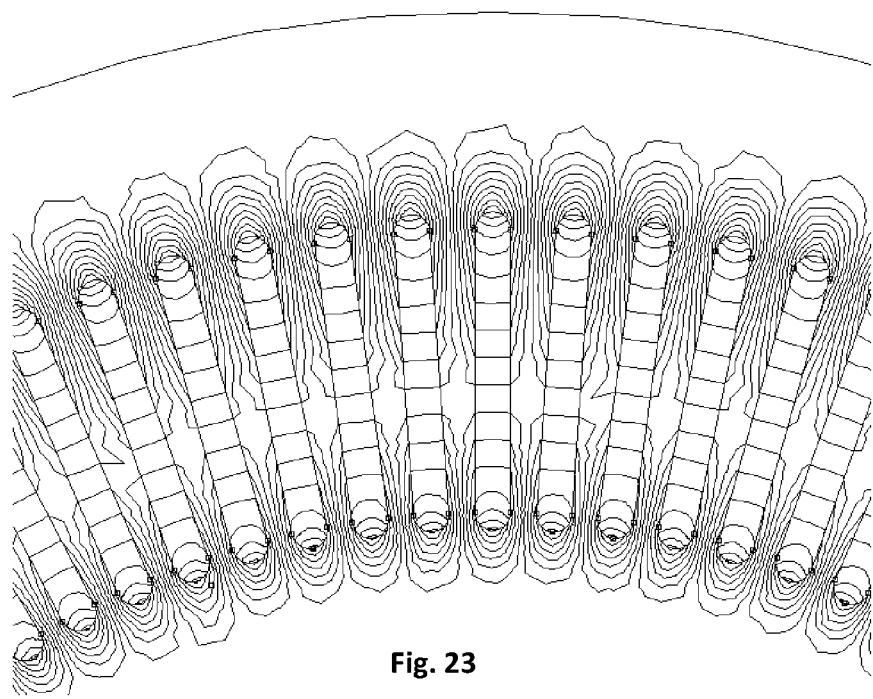
FIG. 23 is a FEMM simulation result on a rotor plate without flux restricting holes.
Figure 24:
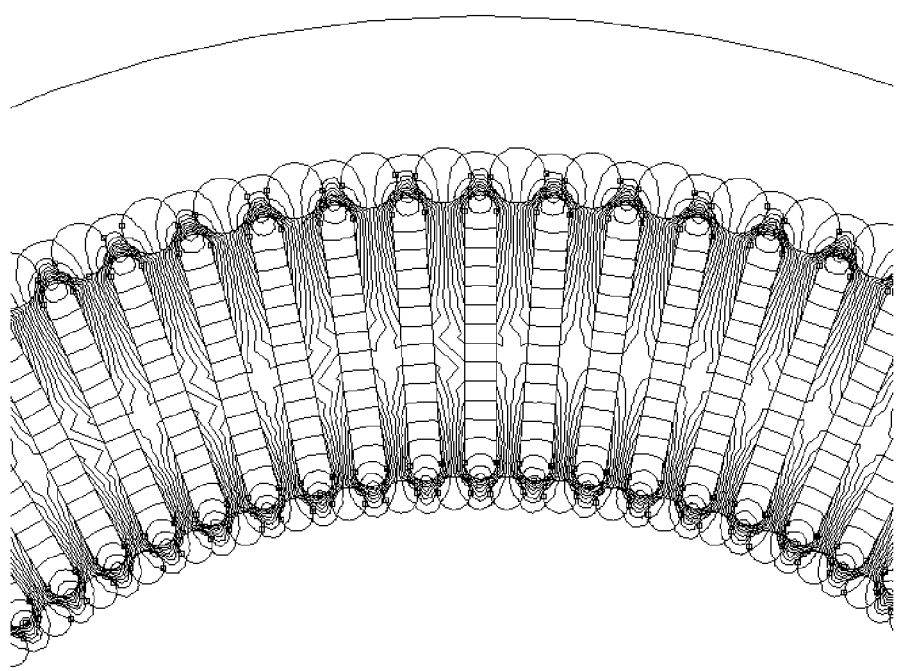
FIG. 24 is a FEMM simulation result on rotor plate with flux restricting holes.

FIG. 23 shows the flux path from the magnetic simulations without flux restriction holes and FIG. 24 shows the flux path from the magnetic simulations with flux restriction holes. From the figures, it is shown that flux restriction holes reduce flux leakage between adjacent rotor poles. For example, when flux restriction holes are used, the flux density increased at the air gap surfaces of the rotor poles and more flux is directed to pass through the stator. As a result, electromagnetic force increases when the coils are engaged and torque generated by the stator and rotor increases.

MagNet simulations on the rotor plate with and without flux restriction holes also led to the same conclusions. More flux is directed from the posts into the airgap.

Figure 25:
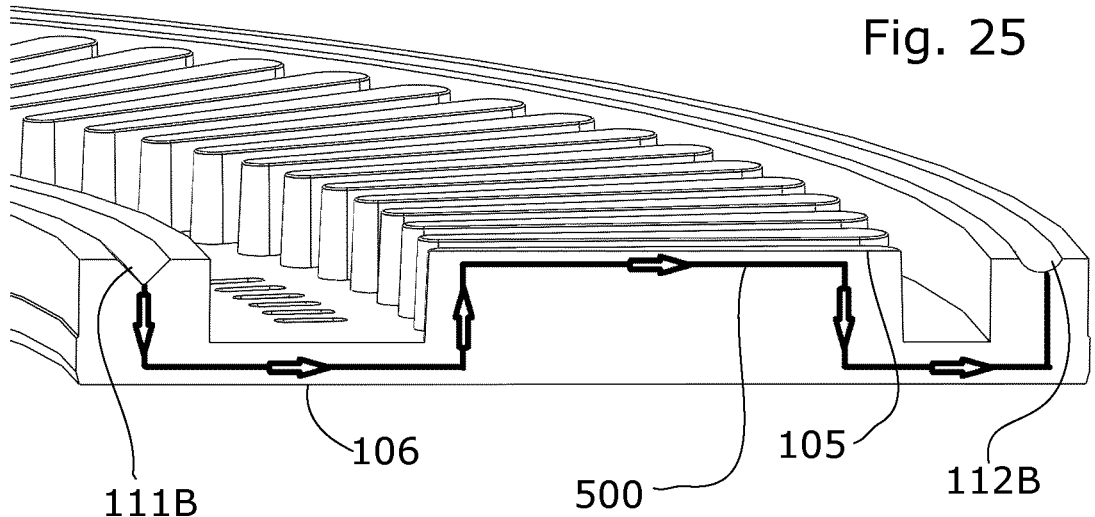
FIG. 25 is a cross section of a stator plate section with uninterrupted path between ID bearing and OD bearing.

In an embodiment shown in FIG. 25, the stator is formed of unitary material (instead of a common laminated structure) and comprises a stator post 105, a stator back iron 106, inner bearing race 111B, and outer bearing race 112B. Looking at the cross section of the stator in FIG. 25, there is no interruption along the stator material path 500 between the tip of a stator post and the inner bearing race, the tip of said stator post and the outer bearing race.

The stator plate, which is held inside the integrated housing, is machined from a solid piece of material. A typical stator is often made using laminated steel layers. In an exemplary embodiment, as shown in FIG. 25, material path between the inner bearing race 111B, stator post 105 and outer bearing race 112B is uninterrupted and comprises a homogeneous material such as, but not limited to, ductile iron or magnetic steel such as M19. The stator core can be cast or machined from a solid piece of steel. The benefit of this construction may include lower cost and complexity due to a single part rather than an assembly of many small laminated parts, and much higher strength, stiffness and creep resistance because there is no adhesives in the load path as there would be in typical laminated stator constructions. This allows the use of much thinner stator cross sections which is beneficial for reduced weight.

The uninterrupted radial flux path corresponds to an uninterrupted axial path in a radial flux device. The flux path 500 in FIG. 25 terminates at the ID and OD at an integrated bearing race. The uninterrupted path may also terminate at a bearing race seat if a separate bearing race is used. It may also terminate at an intermediate component or layer between the stator and the bearing race seat. The uninterrupted radial path need not extend purely radially, but connects inner and outer diameters of the carrier (here, a stator). That is, the path follows a three dimensional path from ID to OD that is not interrupted. Thus, holes may be drilled in the cross section shown in FIG. 25, but there would still be an uninterrupted monolithic material path from ID to OD.

Figure 26:
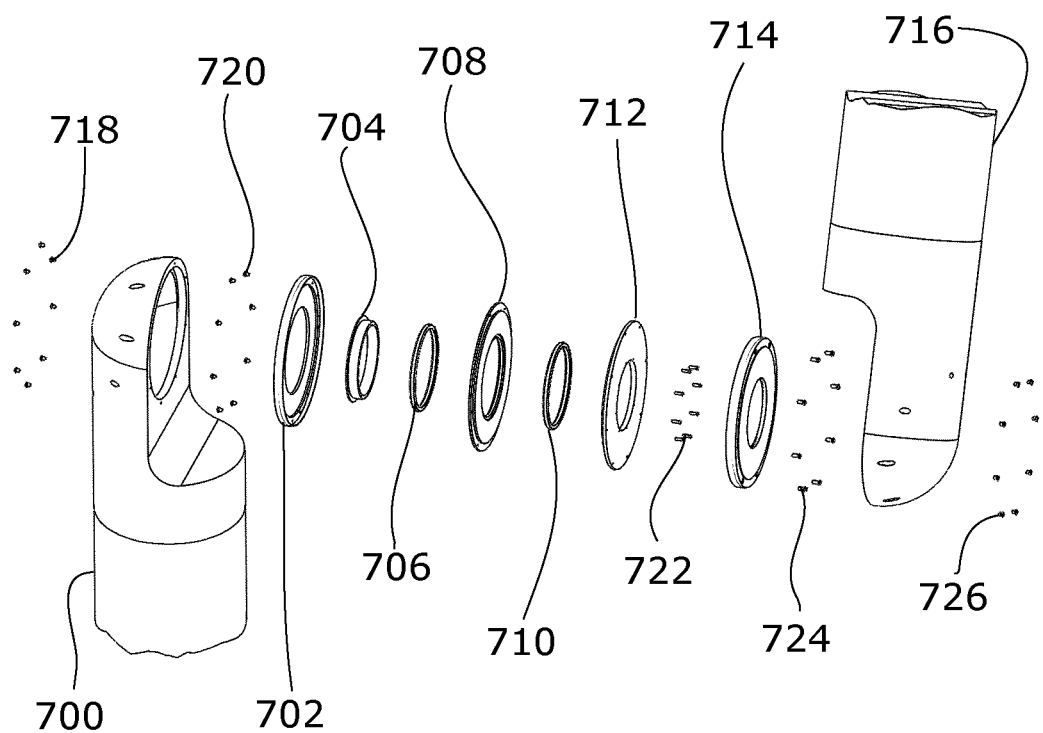
FIG. 26 is an exploded view of an exemplary actuator.

Referring to FIG. 26, an exploded view of exemplary rotor and stator is shown that is connected to a pair of robot arms using bolts. A first arm 700 is connected to a rotor housing 702 using bolts 718. The rotor housing 702 is connected to a rotor 708 using bolts 720. A first bearing element 706 connects between the rotor 708 and a stator 712 and is connected by a press fit ring 704. A second bearing element 710 also connects between the rotor 708 and the stator 712 using bolts 722. The stator 712 is connected to a stator housing 714 using bolts 724. A second arm 716 is connected to the stator housing 714 using bolts 726.

Figure 27:
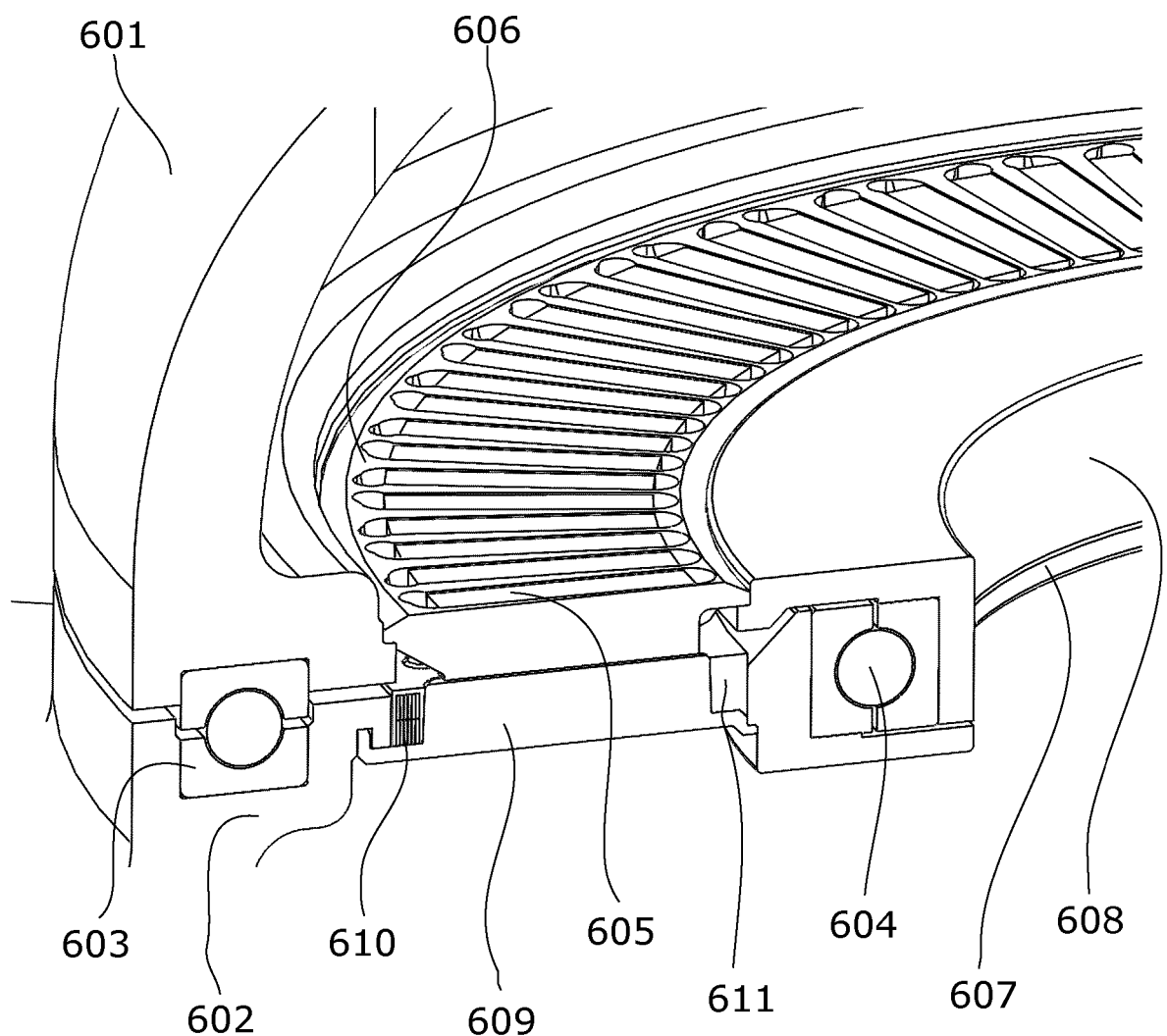
FIG. 27 is a cross section of an embodiment showing an exemplary actuator connected to an upper and lower housing.
Figure 28:
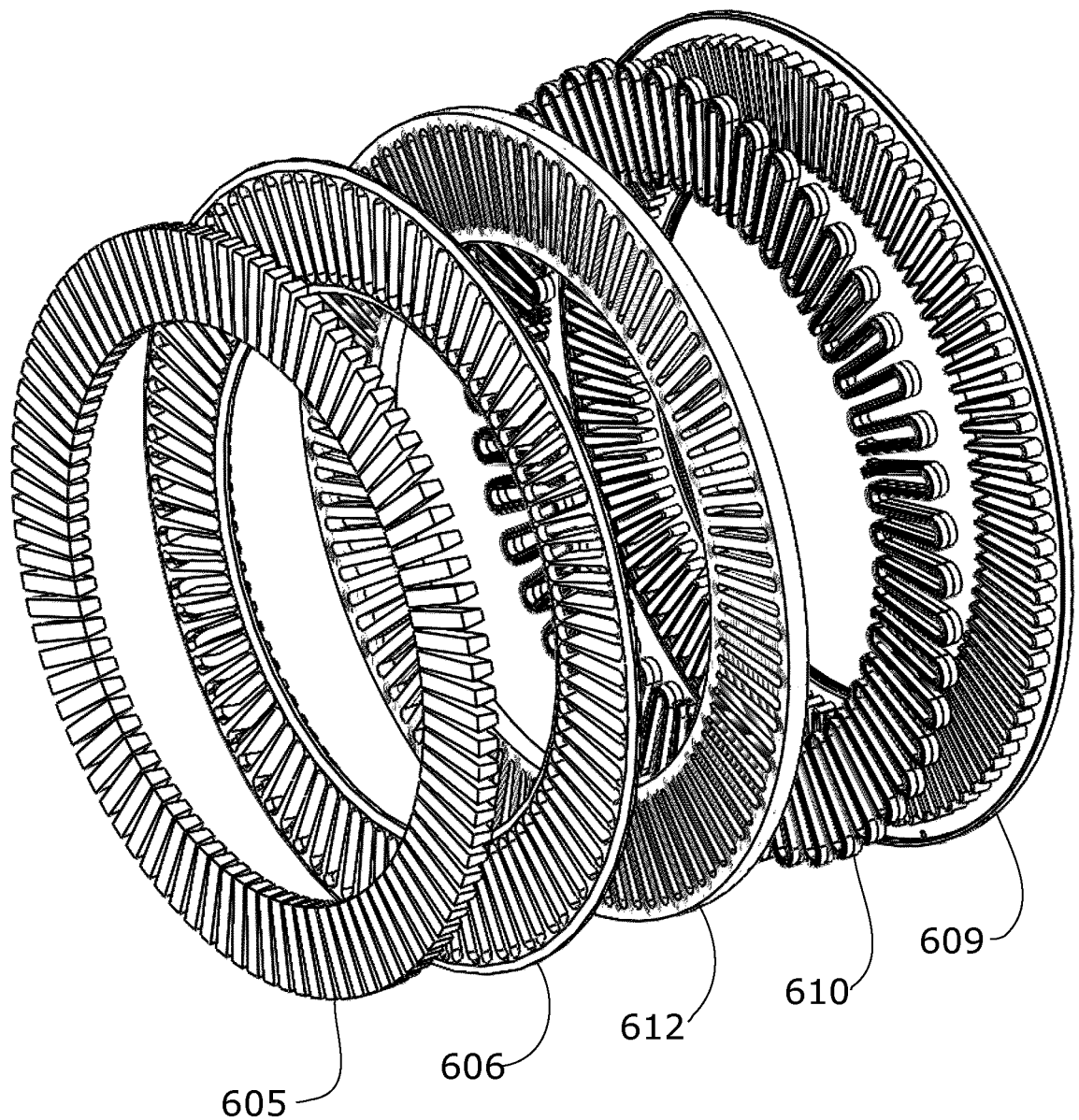
FIG. 28 is an exploded isometric view of the exemplary actuator in FIG. 27.
Figure 29:
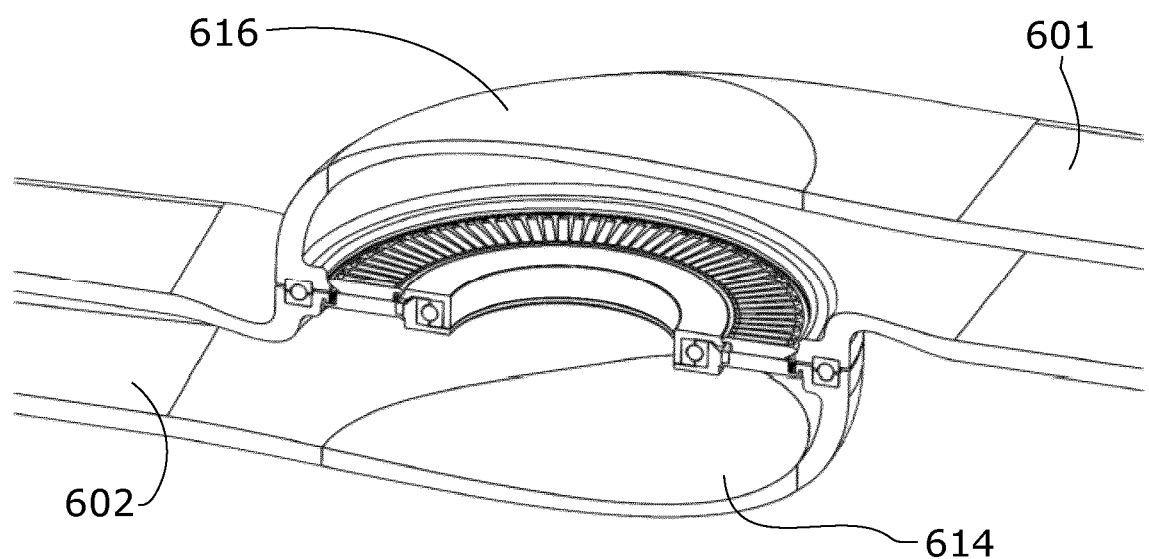
FIG. 29 is an isometric cut away view of the exemplary actuator in FIG. 27.

Referring to FIGS. 27 to 29, a rotor 606 is made from a ferrous material, such as Ductile Iron, and holds an equi-spaced array of magnets 605 that are polarised in a circumferential direction. The polarity of the magnets 605 is alternated in order to generate alternating north and south poles in the radial webs of the rotor 606. The stator 609 is made from a ferrous material, such as Ductile Iron, and includes an equi-spaced array of axial posts around which a set of stator windings 610 are wrapped. Applying commutated power to the stator windings 610 polarises the posts of the stator 609 such that circumferential attraction and repulsion forces are generated between the posts of the stator 609 and the radial webs of the rotor 606, thereby generating torque. The stator windings 610 are encapsulated by the stator potting compound 611, which serves to prevent movement of the wires and helps to transfer heat from the wires to the stator 609. As shown in FIG. 28, a stator cap 612 may be placed over the stator 609 and hold the wires 610 in place.

The magnets 605 also cause attraction between the stator 609 and the rotor 606. The bearings 603 and 604 counteract the attraction force between the stator 609 and the rotor 606 via the housings 601, 602, 607 & 608 and act to accurately control the gap between them. The axial attraction force between the stator 609 and the rotor 606 is adequate, in most applications, to prevent the upper housing 601 from separating from the lower housing 602, thereby eliminating the need for additional retention between them. Diametral fits at the interfaces between the housings 601, 602, 607 & 608 and the rotor 606 and the stator 609 carry radial loads between the two assemblies via the inner 4-point contact bearing 604. External moments applied to the assembly are carried primarily through the outer thrust bearing 603.

The flow of current through the stator windings 610 tends to increase the temperature of the stator 609 relative to the other components. Conduction of the generated heat to the adjacent housings helps to reduce the increase to its temperature. The example shown includes light alloy housings which have a higher coefficient of thermal expansion than the stator 609. To maintain an interference fit at the interface between the outer diameter of the stator 609 and the inner diameter of the lower housing 602 as the temperature increases the primary diametral location occurs at the inner diameter of the locating hook of the stator 609.

In FIG. 29, removeable caps 614 and 616 sit in the arms which allow the stator and rotor to be inserted, and for the magnets to be inserted last.

It is also possible to provide force to retain the magnetics in the rotor slots using a combination of mechanical and magnetic force. Tapered magnets can provide a structure in which a significant percentage of magnetic flux goes through the airgap while retaining the magnets in the rotor slots.

Magnets which taper tangentially such that they are thinner toward the air gap, can provide high performance in a concentrated flux rotor configuration. Referring to FIGS. 30 to 35, there is shown a rotor 3300 in an axial flux configuration with magnets 3302 having tapered ends 3316 and rotor posts 3304 with tapered ends 3318. The magnets and rotor posts taper in opposite directions to form an interlocking arrangement. Permanent magnets taper in the direction of the stator 3330 while rotor posts 3304 taper away from the stator. In this embodiment two substantially mirrored rotors 3300 can be assembled between a pair of stators, with tapered posts of each rotor meeting back to back and tapered magnets of each rotor meeting back to back. Tapering the magnets 3302 in this way, allows for greater rotor post width at the air gap. It also allows for greater magnet width at the wide end of the magnet taper to provide more flux to the rotor post 3304 away from the air gap, where if the sides were parallel the posts 3304 would tend to be less saturated. In this way, the active permanent magnet 3302 and soft magnetic materials are used more effectively to provide more flux at the airgap. The two rotors parts can be secured together for example by an adhesive, but in some preferred variations a mechanical feature such as bolts (not shown) or a securing ring (not shown) may be used.

The interlocking arrangement of tapered posts 3304 and magnets 3302 operate as stops that prevent the permanent magnets from dislodging, which reduces the need for magnetic force to retain the magnets in the rotor, and therefore reduces the need for magnetic flux to leak through the end iron 3314.

In some embodiments an array of flux path restrictions 3328 can be formed in the end iron 3314, for example, as holes in the end iron 3314 at the base of each rotor posts 3304 where they connect with the end iron 3314. These flux path restrictions 3328 reduce the available flux path between rotors posts 3304 and end iron 3314.

FIG. 30 shows an axial flux configuration of a tapered slot rotor, but the tapered slot rotor can be equivalently constructed in a radial flux configuration. Tapered magnets may narrow towards or away from the opposing carrier.

A second effect of tapering the magnets in this way is to bias a high percentage of the flux from a permanent magnet toward the air gap. This is beneficial in at least two ways. A first is that the tapered permanent magnet will be drawn toward the air gap where they will close the airgap between the permanent and the rotor slot wall for lower reluctance flux linkage and where they will be mechanically prevented from further movement and therefore securely retained by the tapered rotor posts. Secondly, the narrower rotor posts at the back surface results in a greater distance from post to post along the center plane of the rotor. This reduces the amount of leakage through the air from post to post along the center plane of the rotor. By assembling two substantially mirrored rotor halves with tapered posts and tapered magnets back-to-back a large percentage of the flux from the permanent magnets can be forced to link across the air gap.

In this way, very high flux density can be achieved in the air gap while magnetically and mechanically retaining the magnets. A cost effective way to manufacture a tapered rotor post rotor is to use two symmetrical rotors 3300 back to back. This construction does not allow for the use of a back iron to stiffen the rotor, so a soft magnetic end iron 3314 is used instead. The end iron 3314 has sections that are preferably as thin as possible to create a high reluctance flux path between rotor posts through the end iron, and as thick as necessary to provide the mechanical strength and rigidity to maintain a small and consistent air gap.

Figure 32:
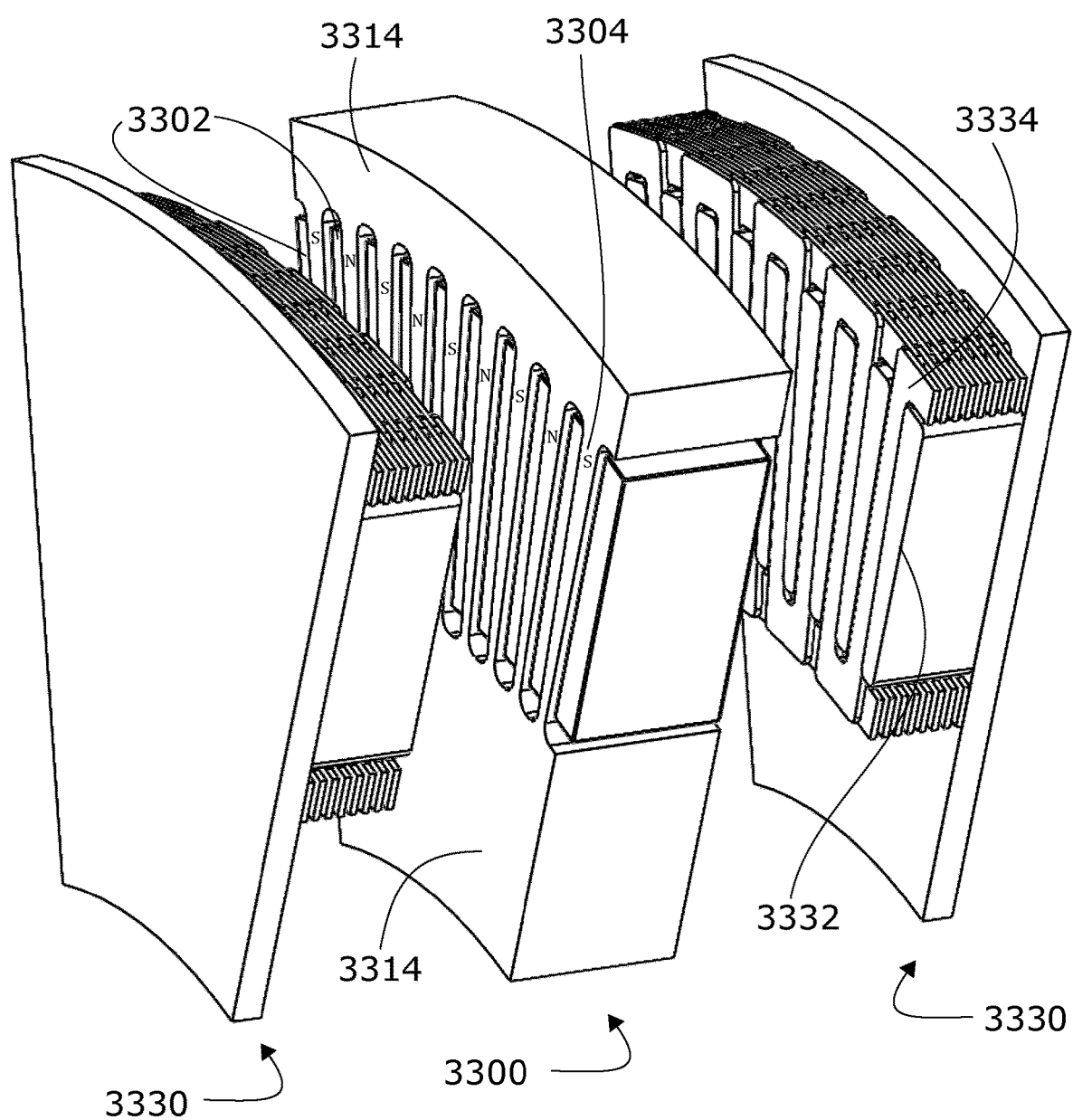
FIG. 32 is a simplified exploded section view of an embodiment of an axial flux stator-rotor-stator configuration of a concentrated flux rotor with end iron.

To compensate for the loss of flux from post to adjacent post through the end iron connection, an embodiment uses permanent magnets 3302 that are longer than the soft magnetic stator posts 3332 at the air gap. This is shown in FIG. 31 where the permanent magnet 3302 are longer than rotor posts 3304 which would have the same or nearly the same length as the stator posts 3332. As shown in FIG. 32, a winding configuration 3334 extends around the stator post 3332. By increasing the permanent magnet depth compared to the stator radial length, the permanent magnets 3302 will be adequate to saturate the end iron 3314 while still maintaining high flux density in the rotor posts at the airgap. As shown in FIG. 31, there are two flux restrictors 3328 adjacent to each end of each rotor post 3304. The rotor posts 3304 have a larger width at the axial outer end of the rotor. The flux restrictors 3328 are larger adjacent to the outer end of the rotor posts and smaller at the inner end of the rotor posts.

The flux restriction holes described for example in the embodiments disclosed in FIG. 3, FIG. 14, FIG. 22A, FIG. 22B, and FIGS. 34-38 are designed to meet an acceptable trade-off between power and structural strength. The cross-sectional area above the magnets provides the strength to maintain the airgap and the flux restrictors prevent flux from excessively extending between the magnets. The flux restrictors can be placed with holes adjacent to every second post, rather than adjacent to every post, which will provide for a stronger structure but does not have a significant impact on the flux. The flux restrictors could be blind or through-holes, so long as there is a cross-sectional area reduction in the flux path and the structural load path. In a preferred embodiment, the flux restrictors will lie on either end of the posts, between the array of posts and each set of bearings. The flux restrictors will preferably lie parallel with the length of each post. The flux restrictors can be designed so that there is a greater cross-sectional area in a structural load path than in a magnetic flux path. The flux restrictors could also be used in a radial flux machine in an equivalent manner as those described for the axial and linear flux machines described herein. An embodiment of the machines described herein with flux restrictors may have a solid material made for example with ductile iron which is strong enough to support magnetic forces, but thin enough to be lightweight. The flux restrictors may be placed adjacent to every post on the rotor or stator or adjacent to every second post on the rotor or stator. The flux restrictors will generally be placed on both ends of each post, or each second post. The flux restrictors may be placed adjacent to every post on one end of each post and adjacent to every second post on the other end of each post. The flux restrictors may be placed in an alternating pattern so that each post is adjacent to only one flux restrictor, and for each adjacent post, the corresponding flux restrictor is adjacent to an opposite end of the adjacent posts. The flux restrictors may have different sizes while maintaining the same geometry. The cross-sectional flux path may be consistent between every second post, but the cross-sectional flux path may be selected so that it alternates between adjacent posts so that each post has a different cross-section flux path than the post directly adjacent to it. Where the flux restrictors are placed in an alternating pattern so that each second post is adjacent to flux restrictors, then the cross-section of each post that is adjacent to the flux restrictors may be smaller than the cross-section of each post that is not adjacent to the flux restrictors. In such an embodiment, every second post will have a larger cross-section than each of the adjacent posts that are adjacent to the flux restrictors. Although flux restrictors will generally be more effective to reduce cogging when placed on the rotor, rather than the stator, the flux restrictors can be placed on both rotor and stator, or only on the rotor. As shown in FIG. 31, there may be multiple flux restrictors adjacent to each end of the posts.

Manufacturing methods for the rotor can include casting or forming or powdered metal construction, additive manufacturing, machining etc. Manufacturing of the magnets can be done by forming or additive or subtractive manufacturing. Magnets can also be magnetised after insertion into slots. It may be possible with present or future processes to press powdered hard magnetic material into the rotor slots and then magnetizing the PM material after pressing, or a slurry of PM magnet material in an epoxy or other polymer can be used to fill the slots and then magnetized after hardening. Magnetizing of the hard magnetic material can be done by applying very high flux density to two or more posts at a time.

Back irons, side irons and end irons serve as retaining elements and form a rigid connection with the rotor posts. Features of one embodiment may be combined with features of other embodiments.

Referring to FIG. 32, there is shown a stator-rotor-stator configuration with an end iron 3314. The end iron 3314 and rotor posts 3304 can be formed from a single piece of isometric soft metallic material, with a single array of permanent magnets 3302 fitting between rotor posts 3304. End iron 3314 is formed at both ends of the rotors 3300. In this embodiment, flux path restrictions 3328 can be included as shown in FIG. 33.

Figure 33:
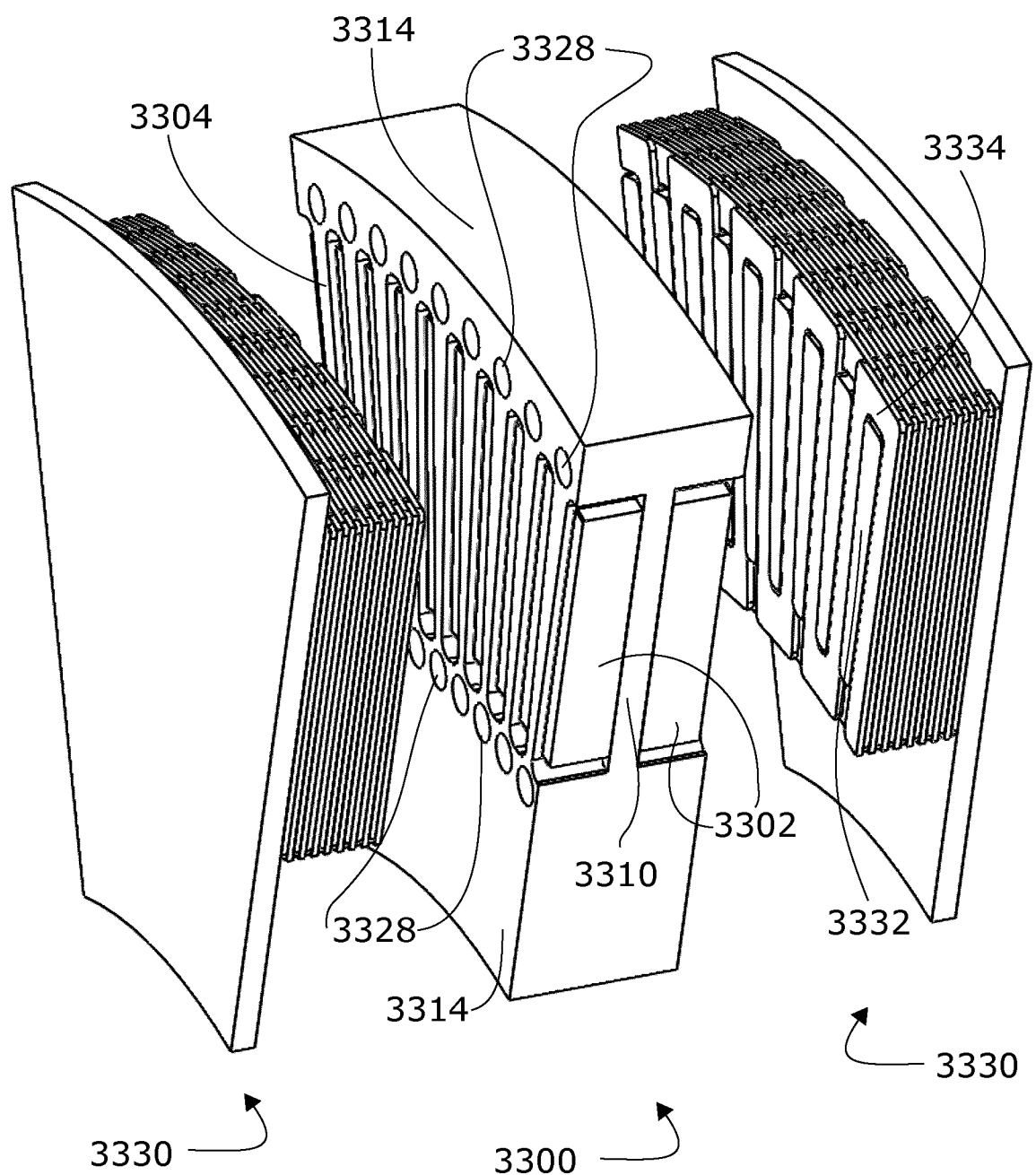
FIG. 33 is a simplified exploded section view of an embodiment of an axial flux stator-rotor-stator configuration of a concentrated flux rotor with back iron, end iron and flux path restrictions.

FIG. 33 shows an embodiment of a stator-rotor-stator configuration with a back iron 3310, end iron 3314 and flux path restrictions 3328. In this embodiment the two array of permanent magnets 3302 are separated by back iron 3310. Flux path restrictions 3328 are formed as bores at the ends of the permanent magnets 3302 to reduce the flux leakage in the end iron 3314.

Figure 34:
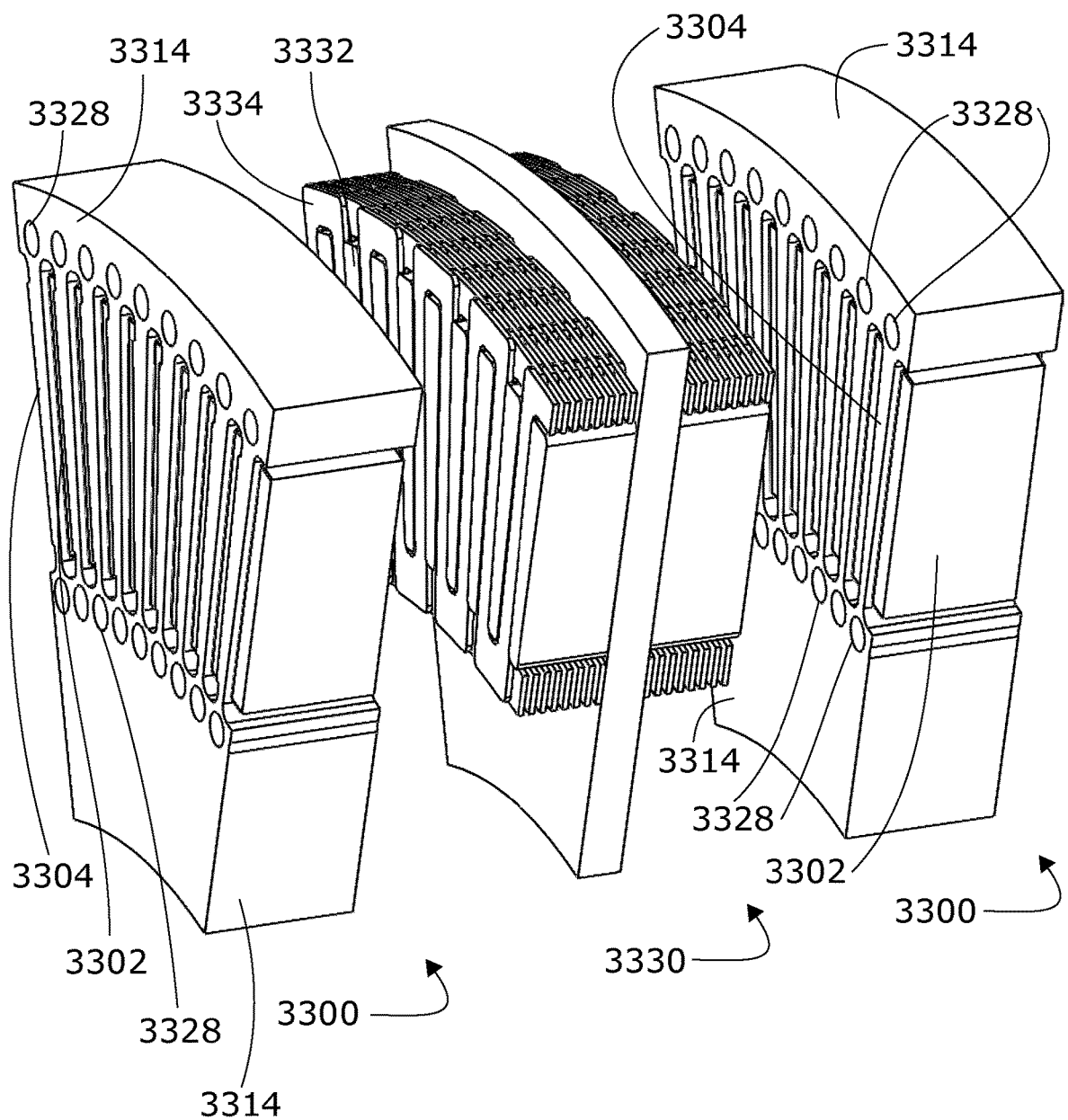
FIG. 34 is a simplified exploded section view of an embodiment of an axial flux rotor-stator-rotor configuration of a concentrated flux rotor with end irons and flux path restrictions.

FIG. 34 shows an embodiment of a rotor-stator-rotor configuration. Two concentrated flux rotors 3300 engage a central stator 3330. The rotors 3300 each include end iron 3314 and flux path restriction 3328. In many applications end iron only or back iron only will be sufficient to provide adequate rigidity to the concentrated flux rotor 3300.

Figure 35:
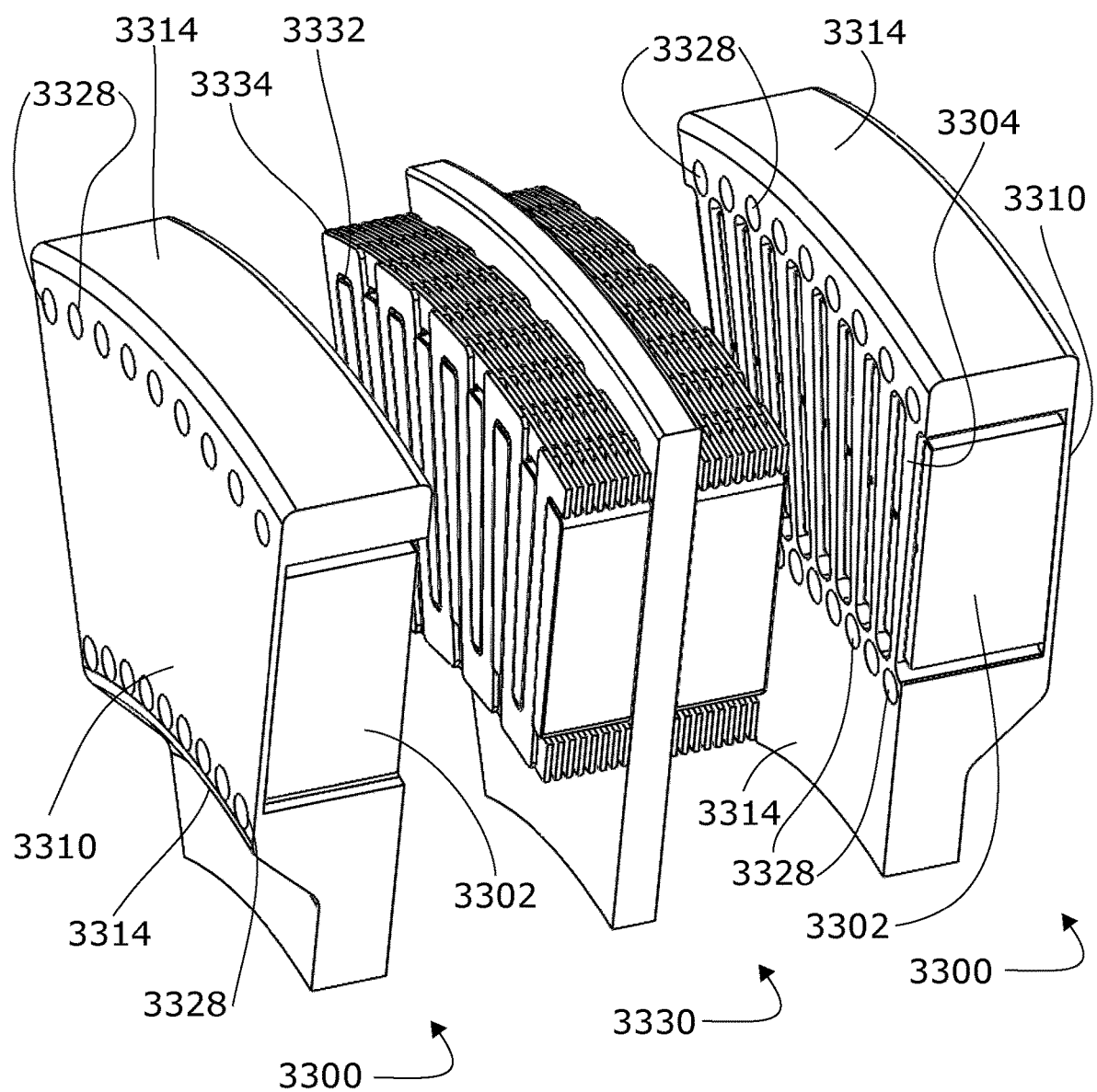
FIG. 35 is a simplified exploded section view of an embodiment of an axial flux rotor-stator-rotor configuration of a concentrated flux rotor with end irons, flux path restrictions and back irons.
Figure 36:
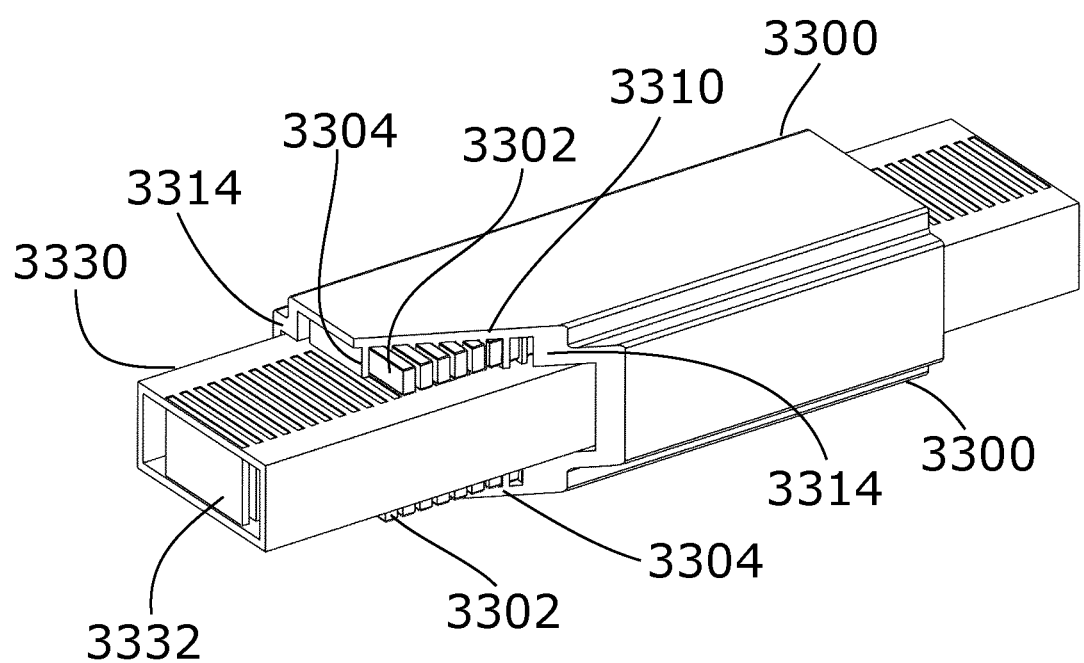
FIG. 36 is a simplified perspective view of a linear flux machine with back irons and flux restrictors.
Figure 37:
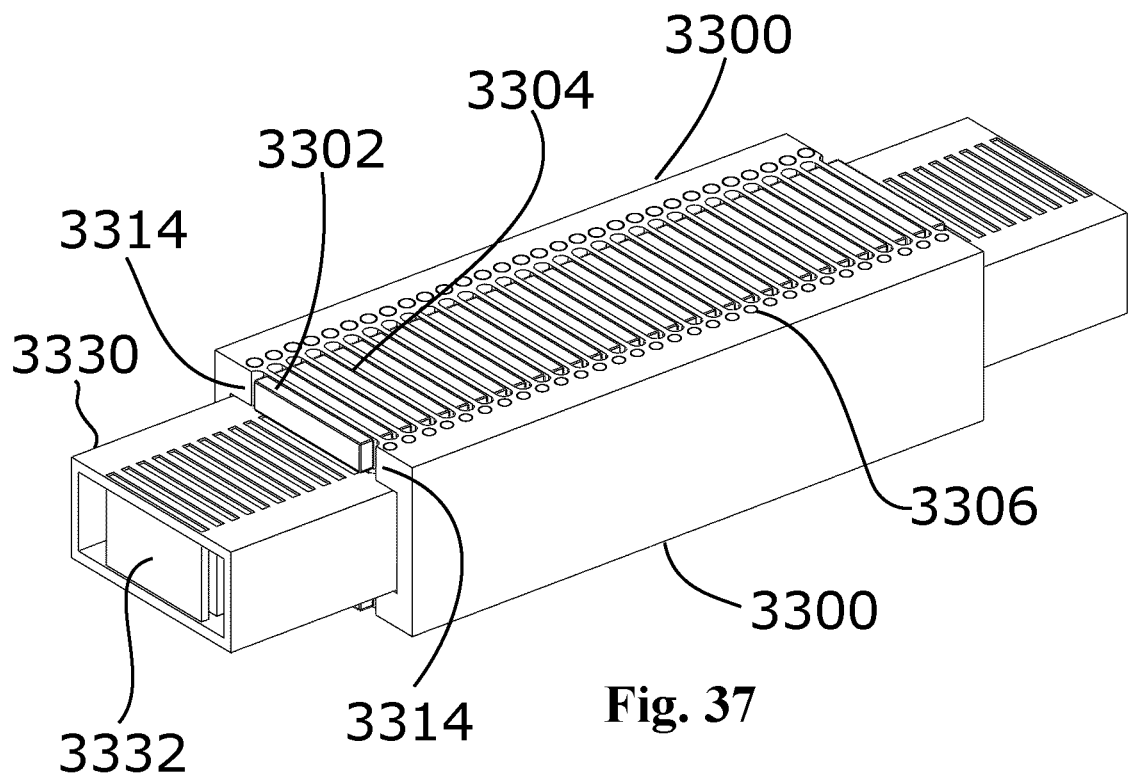
FIG. 37 is a simplified perspective view of a linear flux machine without back irons and with flux restrictors.
Figure 38:
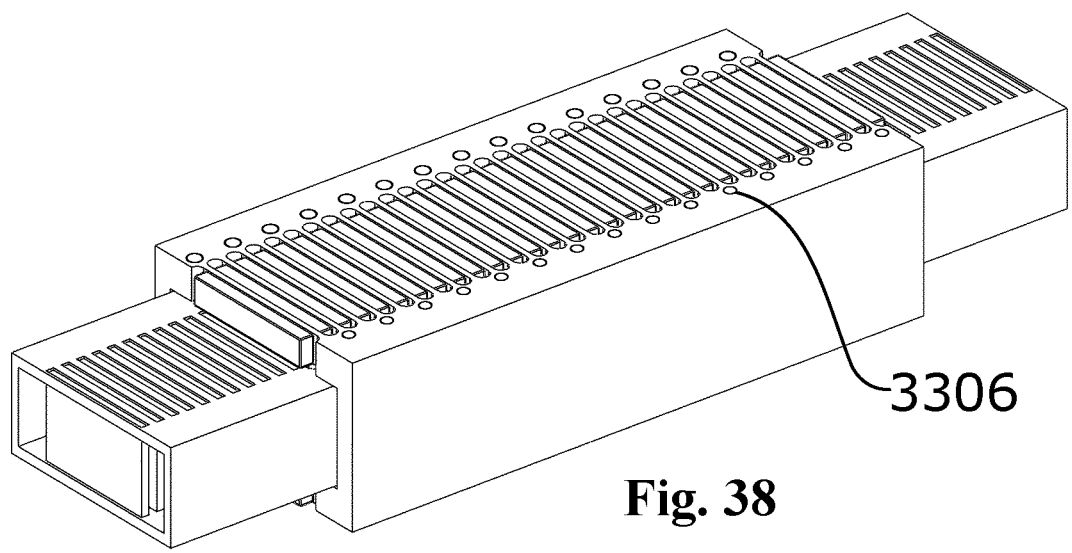
FIG. 38 is a simplified perspective view of a linear flux machine with an alternating pattern of flux restrictors.

FIG. 35 shows an embodiment of a rotor-stator-rotor configuration. The embodiment is essentially the same as that shown in FIG. 34 with the addition of a think back iron 3310 on each rotor 3300.

An embodiment of an electric machine will now be described the configuration of which may utilize the design elements disclosed in this patent document, for example the inner and outer bearing configuration.

Any of the disclosed structures may be used with an electric machine that has electromagnetic elements including posts and slots between the posts, where the posts are wound to create poles, at least on either of a stator or rotor, where the pole density is within a range of pole density defined by the equations specified in this patent document and the post height is within a range of post height defined by the equations specified in this patent document. These equations each define a bounded area. The bounded areas are dependent on the size of the electric machine, where the size is defined by the radius of the machine. The bounded areas together define a bounded surface in a space defined by pole density, post height and size of machine. This bounded region is disclosed in copending WO2017024409 published Feb. 16, 2017, and repeated here.

Based on modelling studies and FEMM analysis, it is believed that the following conclusions follow: at least beyond a specific pole density and for a specified conductor volume or post height for a given diameter of motor: 1) an electric machine having pole density and conductor volume or post height as disclosed has increased heat production (and thus lower efficiency) for a given torque or force as compared with an otherwise equivalent machine having lower pole density and/or higher conductor volume but has corresponding effective heat dissipation; and 2) the increased pole density and lower conductor volume or post height also has the effect of decreasing mass as compared with an otherwise equivalent machine having lower pole density and/or higher conductor volume, with an overall increased torque to mass ratio (torque density).

For example, each electric machine embodiment disclosed is shown as having a pole density and post height that is within the definition of pole density and post height that is believed to provide a benefit in terms of $K_R$.

With a pole density in the range of 0.5 and higher, for example, and considering that it is not unusual for a slot to be about as wide as a tooth, tooth width can be in the order of 1 mm for a 25 mm wide machine. Narrower teeth can be used. An advantage of thinner teeth is that solid materials such as, but not limited to steel or iron or a magnetic metal alloy, may can be used with minimal eddy currents due to the teeth being closer to the thickness of normal motor laminations. A common motor lamination for this size of motor can be in the range of 0.015" to 0.025". The proposed pole density and tooth geometry (many short posts) also helps avoid eddy currents in the first carrier (stator). For example, for an electric machine with 144 slots, eddy current loss was found to be only 7% of the total resistive losses in the windings at 200 rpm and 70 A/mm$^2$. Use of solid (non-laminated) materials may provide advantages in strength, stiffness and reliability.

Embodiments of the disclosed machines may use fractional windings. Some embodiments may use distributed windings; others may use concentrated windings. Distributed windings are heavier due to more copper in the end turns and lower power (requiring a bigger motor). They also require thicker backiron because the flux has to travel at least three posts, rather than to the next post as with a fractional winding. Distributed windings produce more heat because of the longer conductors (the result of longer distance the end turns have to connect between).

An embodiment of an electric machine with the proposed pole density may have any suitable number of posts. A minimum number of posts may be 100 posts. A high number of posts allows fewer windings per post. In a non-limiting exemplary embodiment, the windings on each posts are only one layer thick (measured circumferentially, outward from the post). This reduces the number of airgaps and/or potting compound gaps and/or wire insulation layers that heat from the conductors conduct through for the conductors to dissipate heat conductively to the stator posts. This has benefits for heat capacity (for momentary high current events) and for continuous operation cooling. When direct cooling of the coils by means of gas or liquid coolant in direct contact with the conductors, a low number of circumferential layers, and for example a single circumferential layer of wire on a post, combined with high pole density, results in a very high surface area of the conductors (relative to the volume of the conductors) exposed to the cooling fluid. This is beneficial for cooling the conductors and is one of many exemplary ways to take advantage of the low conductor volume as disclosed. A single row (or low number of rows) of coils per posts also reduces manufacturing complexity allowing for lower cost production. In another embodiment, the windings of each post are two layers thick.

For a 175 mm or more average airgap electric machine, the number of slots may be 60 or more, or 100 or more for an axial flux electric machine, for example 108 slots in an exemplary 175 mm diameter embodiment. In addition, for such an electric machine, the average radial length-to-circumferential width of the posts may be above 4:1, such as about 8:1 but may go to 10:1 and higher. For the exemplary 108 slot embodiment, the ratio is about 8:1. With such a configuration, the heat dissipation is improved. A lower aspect ratio would be a lot of material for very little torque, so the aspect ratio helps achieve torque useful for high KR and robotics while at the same time taking advantage of the heat dissipation effects.

In some embodiments there is a reduced rigidity requirement by coating the airgap with a low friction surface that maintains the airgap. In an embodiment of a linear motor a low friction surface is applied in the airgap which maintains a 0.008" airgap. Coatings, such as DLC (diamond-like coating), can be deposited at 0.0025" on both the rotor and the stator and the gap will be maintained.

Ranges of pole pitch (or density) and conductor volume have been found which give a significant benefit either in terms of KR, or in terms of a weighting function combining torque, torque-to-weight, and Km (as described further). The amount of benefit in terms of the weighting function is dependent on the amount of cooling and other factors, but the equations define novel structures of electric machines that provide benefits as indicated. Equations are given which define bounded regions determined by the ranges of pole density and conductor volume which yield these benefits.

In an embodiment, advantages are obtained by operating within a region of a phase space defined by machine size, pole density and post height. A series of graphs shown in FIG. 39A to FIG. 39F, show torque density (z axis) v slot density (x axis) and post height (y axis) for an exemplary series of linear motor section geometries, created and analysed using FEMM software using an automated solver generated in OCTAVE™ (which is a program for solving numerical computations). Slot density was used in this example because it is the same as pole density.

The following rules and assumptions were applied to all of the motors in the series. Each section consisted of 144 electromagnets and 146 permanent magnets. The rotor comprised sections of NdFeB 52 magnets and M-19 silicon steel. Every permanent magnet was placed tangentially to the rotor and oriented so that its magnetic field direction was aligned tangentially to the rotor and are opposite to its adjacent permanent magnets. M-19 silicon steel sections were placed between permanent magnets. The stator was made from M-19 silicon steel. The electromagnets used concentrated winding coils in a 3-phase configuration. A 75% fill factor of the coils was assumed, consisting of 75% of the slot area. The two variables that were investigated were the post height and slot density. The remainder of the geometry variables were scaled according to the following relationships: 1.25 inches constant model thickness across all simulations, Rotor permanent magnet width is set at 50% of permanent magnet pitch, Rotor permanent magnet height is set at 2.3 times of permanent magnet width, Stator slot width is 50% of stator electromagnet pitch (equal width of posts and slots), Stator back iron height is set at 50% of stator post width, Airgap axial height of 0.005 inches.

The bounded region which represents the unique geometry disclosed is modeled for the preferred embodiment, namely the embodiment which will yield the highest torque-to-weight and KR. Certain design choices have been made in this embodiment such as the selection of grade N52 NdFeB magnets in the rotor, a rotor pole to stator post ratio of 146:144, and a flux concentrating rotor with back iron. It is believed that this configuration may provide one of the highest practical torque-to-weight configurations for sizes of actuators in the disclosed diameters while still retaining a reasonable level of manufacturability and structural stability. Many other configurations are possible such as different rotor types (surface permanent magnet, buried permanent magnet, etc), different magnet materials and grades including but not limited to ceramic, samarium cobalt, and high-temperature NdFeB, different rotor pole to stator post ratios, different stator winding configurations, different stator materials, etc. In many cases, different design choices for these parameters will not have as great a KR benefit as compared to the preferred embodiment by either resulting in reduced torque or increased weight for the same pole pitch and post height as the preferred embodiment. However, for the majority of designs, there is a benefit to KR by using the pole pitch and post height of inside the disclosed region over geometry outside the disclosed region when all other design variables and geometrical relationships are held constant. This principle holds true for both concentrated and distributed winding designs, for linear motors, axial flux rotary motors, radial flux rotary motors, trapezoidal/toroidal rotary motors, and transverse flux linear and rotary motors.

For each of those motor section geometries, magnetic simulation and heat simulation were performed. For every magnetic simulation, the program yielded values for mass, horizontal force, and power consumption. Geometrical extrapolations of the coil cross sections were used to find the mass and power consumption of the end windings in order to more accurately predict the mass and power consumption of the entire system. For calculating stall torque and torque at low speed, the square root of resistive losses is the dominant part of the power consumption, with a multiplier based on the slot geometry to account for the resistive losses of the end windings. These values were used to calculate the mass force density (force per unit mass) and the area-normalized force (force per unit area of the airgap) of each simulation. For every heat simulation, the program yielded values for coil temperature, rotor temperature and stator temperature. A set cooling rate was applied to the stator inner surface using water as the coolant and a convection coefficient of 700 W/m²K. The temperature of the water was set at 15° C. and it had a flow rate between 6-20 mm/s. Steady state conditions were assumed.

For constant current density simulations, a fixed current density was applied to the conductor and the resulting force, mass, power consumption, and maximum stator temperature were calculated by the program.

For constant temperature, force per area, or force density simulations, the current density was adjusted at each geometry point until the parameter of interest reached the target value, and the other parameters were recorded at that point. The target error for constant temperature, force per area, and force density simulations are 1 degrees, 0.002 N/mm², and 1 N/kg respectively. This data can be directly applied to any size of rotary motor by multiplying the area-normalized force by the circumferential area of the airgap in the rotary motor, and multiplying the force by the diameter to yield the resulting torque. There will be some small deviations due to the radius of curvature of the motor, and the errors associated with approximating a curved structure with a linear one, however our simulations have shown the rotary simulated torque typically to be within 10% of that predicted by the linear model.

Figure 39A:
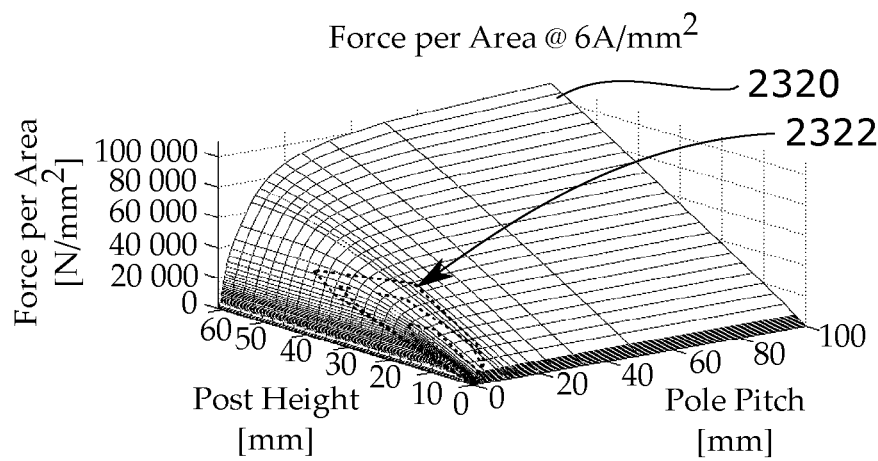
FIG. 39A shows a graph of torque at constant current density for a simulated series of motors differing in slot pitch and post height.

The force per area at a constant current density 2320 is plotted in FIG. 39A as a function of slot pitch and post height. The same current applied to all motors in the virtual series results in dramatically lower force per area in the disclosed ranges 2322 (indicated schematically by the dashed lines). The dashed lines correspond to the middle boundary from each size (25 mm, 50 m, 100 mm and 200 mm as discussed in relation to the equations below) projected onto the 3D surface. The middle boundaries correspond to the sets of equations A2, B2, C2 and D2. In this graph, the force per area at constant current density 2320 is shown for a series of motors that were analyzed in FEMM using a script in OCTAVE to find the highest torque rotary position for a given 3 phase input power. These motors are identical in every way apart from the conductor volume and slot density, which are varied as shown.

Figure 39B:
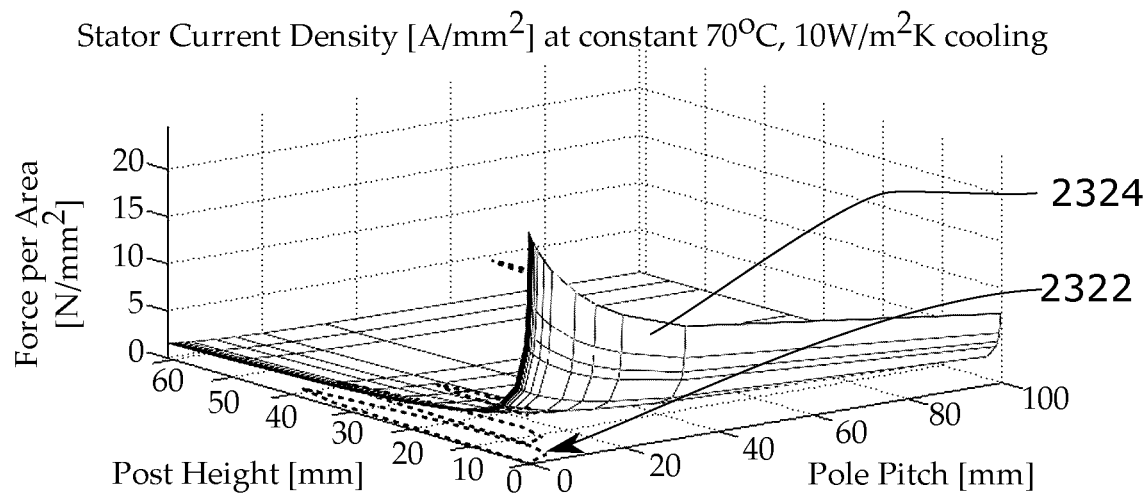
FIG. 39B shows the highest stator current density possible at a given temperature for a simulated series of motors differing in slot pitch and post height.

The highest current density possible at a given temperature 2324 is plotted in FIG. 39B as a function of slot pitch and post height. The exponentially higher heat dissipation characteristic in the disclosed ranges 2322 allows much higher current density at a given temperature. Low conductor volume tends to reduce the actuator weight, but low conductor volume also tends to reduce the actuator torque. When the conductor volume and slot density is in the disclosed ranges, however, there is a dramatic reduction in the heat flow resistance from the conductors to the back of the stator or to any other surface where cooling can be applied, thus allowing very high current densities to be applied to the conductors without overheating the actuator.

In FIG. 39B, the same series of motors is used as in FIG. 39A, but instead of constant current density applied to each motor, the current density was varied until the steady state temperature of the conductors was ~70° C. A reasonable representation of a typical water cooling effect was applied to the outer axial surface of the stators at a convection coefficient of 700 W/m²K. The temperature of the water was set at 15° C. Ambient temperature was set at 15° C. No air convective cooling was applied to the rotor for simplicity because the water cooled surface was highly dominant in terms of cooling and because the rotor was not producing heat of its own. Steady state conditions were assumed. For each point on the 3D graph, the current density of the motor was increased from zero until the temperature of the coils reached ~70 deg C.

Figure 39C:
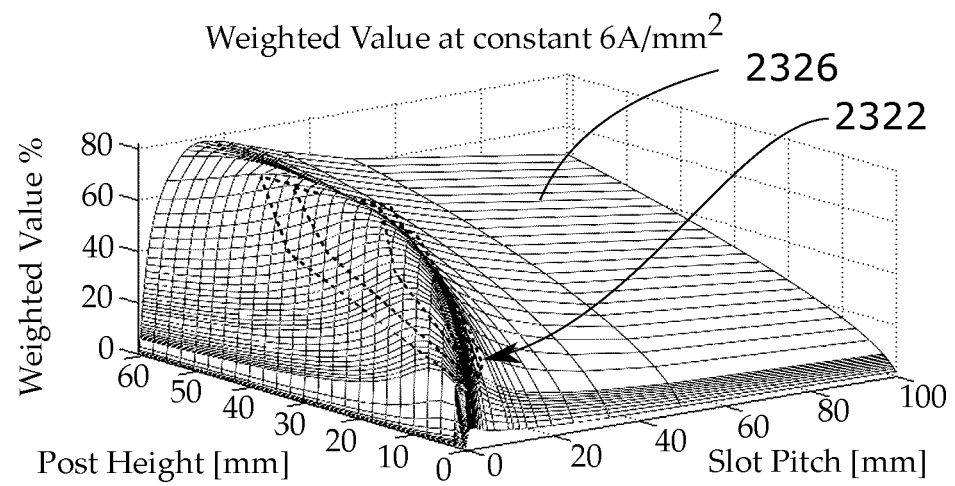
FIG. 39C shows constant temperature torque as a function of slot pitch and post height for a series of electric machines.
Figure 39D:
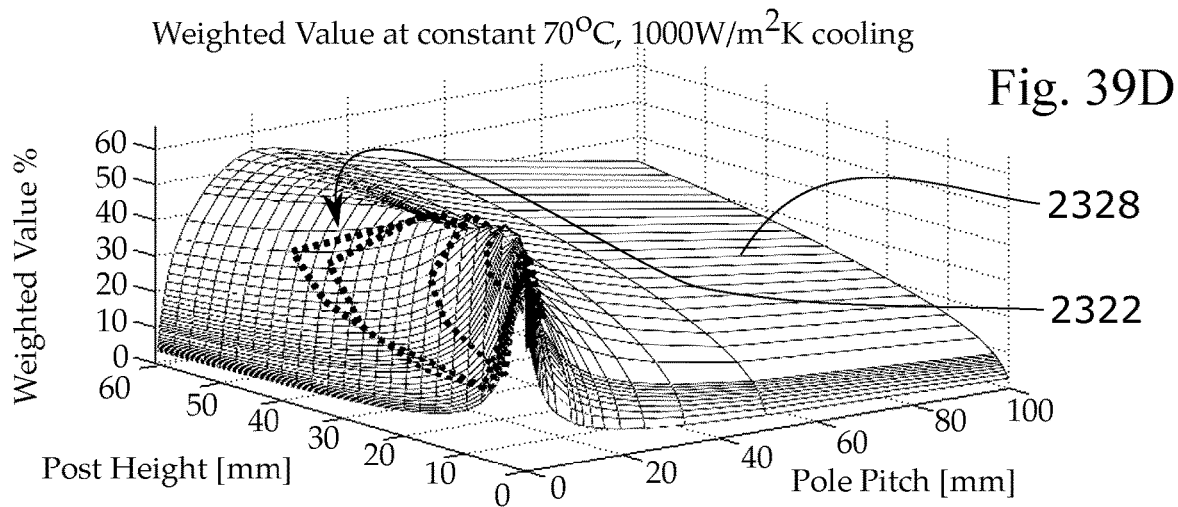
FIG. 39D shows the value of a weighting function for at the highest stator current density possible at a given temperature for a simulated series of motors differing in slot pitch and post height.
Figure 39E:
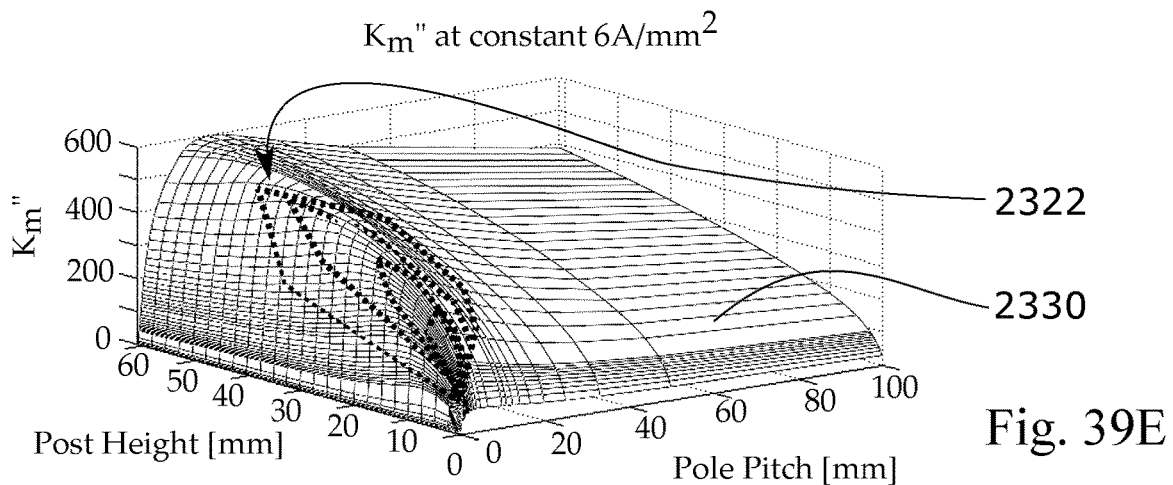
FIG. 39E shows Km" for a simulated series of motors differing in slot pitch and post height, for a fixed current density.

FIG. 39C is the same as FIG. 39D except that it has constant current at 6 A/mm2 as apposed to constant temperature of 70 deg C. Thus demonstrating how the heat dissipation benefit of short posts give unexpected benefit disclosed range, FIG. 39C was developed using the following weighting convention, Torque—weighting of 1, Torque-to-weight—weighting of 3, Power consumption—weighting of 2. Torque-to-weight was the most highly weighted because the weight of the arm is determined by the weight of the actuator and because the weight of the arm will typically be significantly higher than the weight of the payload. Torque was weighted at 1 to include it as an important consideration but recognizing that the payload may be quite a bit lower than the weight of the arm. Power consumption was given a moderate weighting because it is an important consideration, but power consumption is known to benefit from lower arm weight, as is accomplished by a higher weighting on torque-to-weight, so a higher weighting on power consumption was deemed to be potentially counter-productive.

By applying a constant current density to the series of motors, and combining the results with the above weighting, the surface 2328 in FIG. 39D shows a trend toward lower overall performance toward and continuing through the disclosed ranges 2322 of slot (or pole) density and conductor volume. FIG. 39D shows a benefit in the disclosed range when the constant temperature current density is applied from FIG. 39B.

An industry standard metric for motor capability is the KM which is basically torque-to-power consumption. KM assumes sufficient cooling for a given electrical power. It only considers the amount of power required to produce a certain level of torque. The $K''_m$ surface 2330 as a function of slot pitch and post height is plotted in FIG. 39E.

Figure 39F:
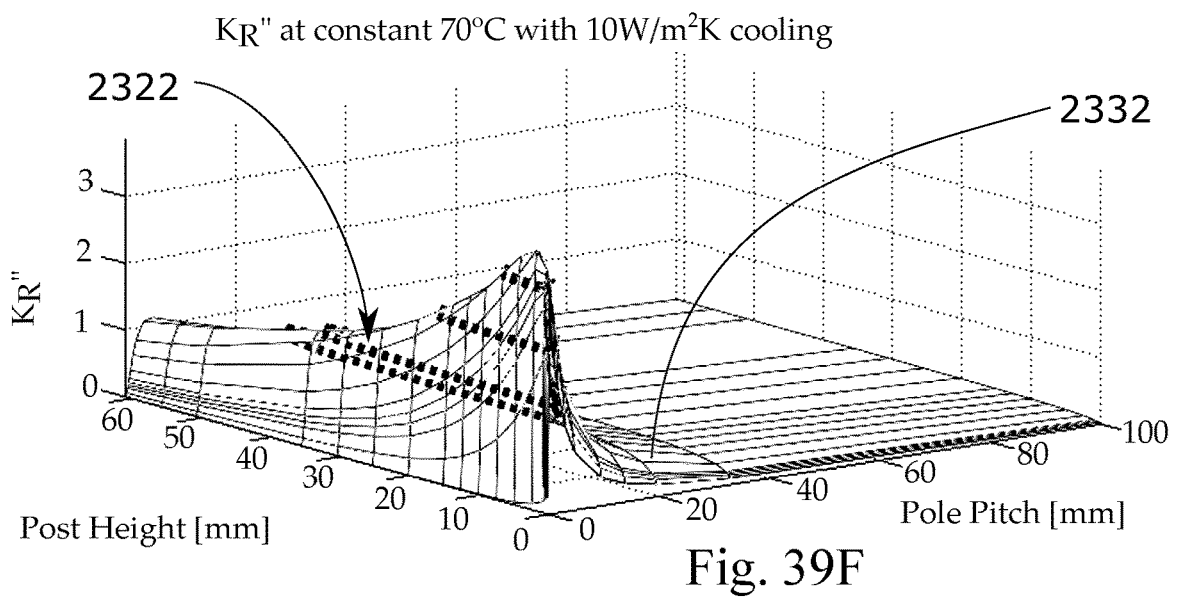
FIG. 39F shows KR" for a simulated series of motors differing in slot pitch and post height, for a fixed current density.

The torque to weight to power consumption shows the most unexpected and dramatic benefit in the disclosed ranges 2322 as seen from the graph of the $K''_R$ surface 2332 as a function of slot pitch and post height in FIG. 39F. High $K_R$ may not be of great benefit in stationary applications, but in applications such as robotics, $K_R$ indicates that power consumption benefits can be achieved by reducing the weight of the entire system.

A method of producing a graph showing how $K''_R$ varies with pole density and post height is as follows. Consider a motor section with geometry A having low conductor volume (low post height) and low pole density. The motor section with geometry A is simulated; a set cooling rate is applied to the stator inner surface using water as the coolant and a convection coefficient of 700 W/m²K. The temperature of the water is set at 15° C. and it has a flow rate between 6-20 mm/s. Steady state conditions are assumed. The current passing through the conductor of geometry A is then increased until the maximum temperature of the conductors reaches 70° C. The torque density of geometry A at this point is then recorded and plotted in the graph for the corresponding values of post height and pole density. The process is repeated for other geometries, obtained, by example, through varying the post height and pole density and scaling the remaining parameters as described above. For instance, a geometry B may be is obtained from geometry A by increasing the post height, with all other parameters scaled as described above. A geometry C may have the same post height as geometry A but greater pole density. A geometry D may have increased post height and increased pole density as compared to geometry A. Plotting the torque densities results in a surface in a graph.

It is found that the torque density increases as pole density increases and post height decreases. No such increase in torque density is shown to occur with geometries having either a low post height or a high pole density; the benefit in torque density is only observed for geometries combining these two factors. Yet, in this region, efficiency is decreasing. While the graph was produced based on the assumptions indicated, it is believed that, based on the disclosed cooling effect and reduction of flux losses of increasing pole density and decreasing conductor volume or post height, that the same geometry will have a benefit at other values of the parameters that were used in the simulations. Changes in motor design elements which do not affect post height or pole density are not expected to result in a loss of the benefits. For instance, an electric machine comprising a rotor with tangentially oriented permanent magnets and an analogous electric machine comprising a rotor with surface-mounted permanent magnets may possess somewhat different $K''_R$ surfaces; nonetheless, the principles described above will still apply and a benefit would still be predicted within the region of geometries of low post height and high pole density described previously. As currently understood, the principles apply only to electric machines with posts, such as axial flux and radial flux machines.

In the disclosed equations and graphs, the parameter $K''_R$ is size-independent and has been converted from a conventional $K_R$ to use force instead of torque, and to be independent of both circumferential length and axial length. Therefore, the conventional $K_R$ of any size motor can be found from the $K''_R$ value. And for two motors of identical size (diameter at the airgap and axial length) but different geometry (i.e. pole density and/or post height), the multiplying factor will be the same, so the motor with higher $K''_R$ will have a higher conventional $K_R$.

$K''_R$ as a function of pole density and post height greatly resembles the surface of a graph showing conventional KR. However, this particular surface, corresponding to the torque density, may change considerably when different temperatures are used as the constraint in the analysis. $K''_R$, by contrast, does not change substantially (provided the current doesn't get sufficiently high for the motors in the series start to saturate; then the 3D curve shape will change.) It is the $K''_R$, therefore, that is used to define the specific range of pole density and post height which result in the previously-discussed benefits.

The ranges of benefit disclosed depend on the resultant motor diameter at the airgap. Smaller motors are more constrained because the physical size of the motor prevents lower slot densities from being used. We have defined 4 discrete motor diameter ranges corresponding to 200 mm and above, 100 mm and above, 50 mm and above, and 25 mm and above. For each diameter range, we describe three levels of $K''_R$. The first corresponds to where a small benefit to $K''_R$ begins, the second to a moderate $K''_R$ benefit, and the third to a high $K''_R$ benefit for that specific diameter range. Higher $K''_R$ values generally correspond to lower overall torque values for that motor size range.

These motor sizes disclosed (25 mm and up to 200 mm diameter and above) represent small to large motors. The airgap of 0.005 inches used in the simulation is believed to be the smallest reasonable airgap size for this range of motors. Smaller airgaps are not practical for this motor range due to manufacturing tolerances, bearing precision, component deflection, and thermal expansion.

The coefficients in the equations above were chosen in a manner to bound the region of interest and make the resulting relation nearly continuous.

A 50:50 ratio of post:slot width was chosen for these simulations, as analysis had shown that highest benefits are obtained when the ratio is between 40:60 and 60:40. A 50:50 ratio represents a typical best-case scenario; at fixed post height, using a 10:90 slot:post width ratio will have a significantly degraded performance by comparison. Analysis shows that at constant post height, an embodiment exhibits the maximum of torque and torque density at a 50% slot width, and the maximum of Km and Kr at 40% slot width. However, the maximum values of Km and Kr are within 5% of the values given at a 50:50 geometry; consequently a 50:50 ratio was viewed as a reasonable choice of scaling parameter for the simulations. Other ratios of post:slot width would give a portion of the benefits disclosed.

Equations and graphs are discussed below which show the ranges of pole density and conductor volume which give a significant benefit either in terms of KR, or in terms of a weighting function combining torque, torque-to-weight, and Km, for different embodiments. As with the previously-described equations, the region of benefit in terms of the weighting function is dependent on the amount of cooling.

Size of an electric machine means the airgap diameter of an axial flux machine or radial flux machine as defined herein or the length in the direction of translation of the carriers of a linear machine.

The first bounded region corresponds to regions where a significant $K_R$ benefit is found with respect to the rest of the geometries in the domain. For a given device size, $K_R$ has a higher value in the disclosed range of geometry than anywhere outside of the range, indicating potential benefits to overall system efficiency for certain applications using devices of these geometries. The graph of $K''_R$ is used to define the boundary by placing a horizontal plane through at a specified $K''_R$ value. Four values of $K''_R$ are used to define areas of benefit for four different actuator size ranges corresponding to sizes of 200 mm and larger, 100 mm and larger, 50 mm and larger, and 25 mm and larger.

In the following tables, pole pitch is represented by the variable S, in mm. Post height is also represented in millimetres.

Figure 49:
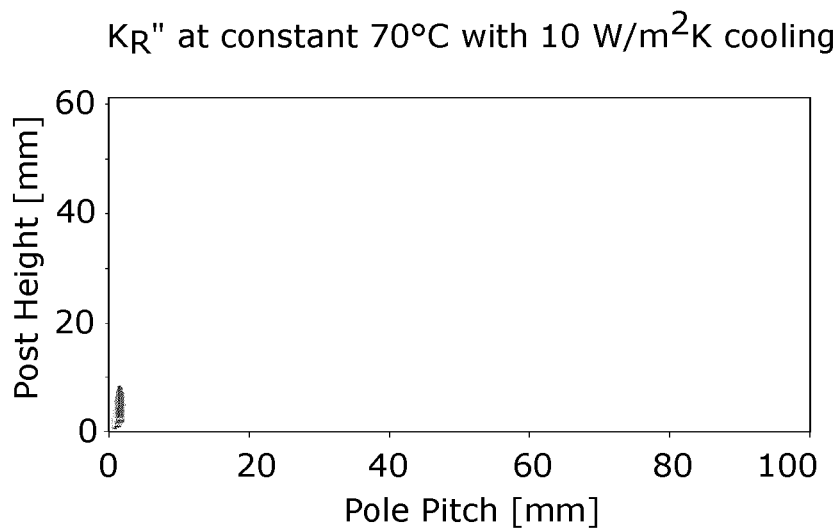
FIG. 49 shows the region of benefit for KR", with respect to the rest of the geometries in the domain, for a machine with 25 mm size and a boundary line for KR">3.3.

In a machine with 25 mm size, the boundary line for $K''_R > 3.3$ is defined by the values shown in Table 1 and the corresponding graph is FIG. 49.

TABLE 1

Set A1

| | | | Points | |
|---|---|---|---|---|
| | | | Pole Pitch | Post Height |
| Post Height> | | | | |
| −1.070 * S + 2.002 | for | 0.572 < S < 1.189 | 0.572 | 1.390 |
| 1.175 * S + −0.667 | for | 1.189 < S < 2.269 | 1.189 | 0.730 |
| 13.502 * S − 28.637 | for | 2.269 < S < 2.500 | 2.269 | 1.999 |
| Post Height< | | | 2.500 | 5.118 |
| −5.898 * S + 19.863 | for | 1.970 < S < 2.500 | 1.970 | 8.244 |
| 0.229 * S + 7.794 | for | 1.349 < S < 1.970 | 1.349 | 8.102 |
| 7.607 * S − 2.160 | for | 0.723 < S < 1.349 | 0.723 | 3.340 |
| 11.430 * S − 4.924 | for | 0.572 < S < 0.723 | 0.572 | 1.614 |
| | | | 0.572 | 1.390 |

Figure 50:
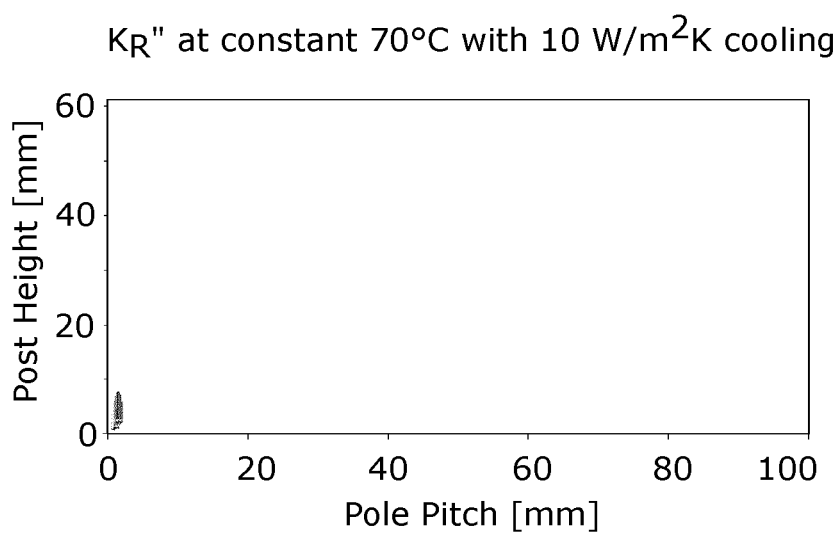
FIG. 50 shows the region of benefit for KR", with respect to the rest of the geometries in the domain, for a machine with 25 mm size and a boundary line for KR">3.4.

In a machine with 25 mm size, the boundary line for $K''_R > 3.4$ is defined by the values shown in Table 2 and the corresponding graph is FIG. 50.

TABLE 2

Set A2

| | | | Points | |
|---|---|---|---|---|
| | | | Pole Pitch | Post Height |
| Post Height> | | | | |
| −1.340 * S + 2.305 | for | 0.619 < S < 1.120 | 0.619 | 1.475 |
| 1.100 * S − 0.429 | for | 1.120 < S < 2.074 | 1.120 | 0.803 |
| 3.830 * S − 6.082 | for | 2.074 < S < 2.269 | 2.074 | 1.852 |
| Post Height< | | | 2.269 | 2.598 |
| −69.510 * S + 160.318 | for | 2.222 < S < 2.269 | 2.222 | 5.865 |
| −3.430 * S + 13.492 | for | 1.667 < S < 2.222 | 1.667 | 7.770 |
| 2.830 * S + 3.056 | for | 1.133 < S < 1.667 | 1.133 | 6.260 |
| 8.650 * S − 3.545 | for | 0.619 < S < 1.133 | 0.619 | 1.812 |
| | | | 0.619 | 1.475 |

Figure 51:
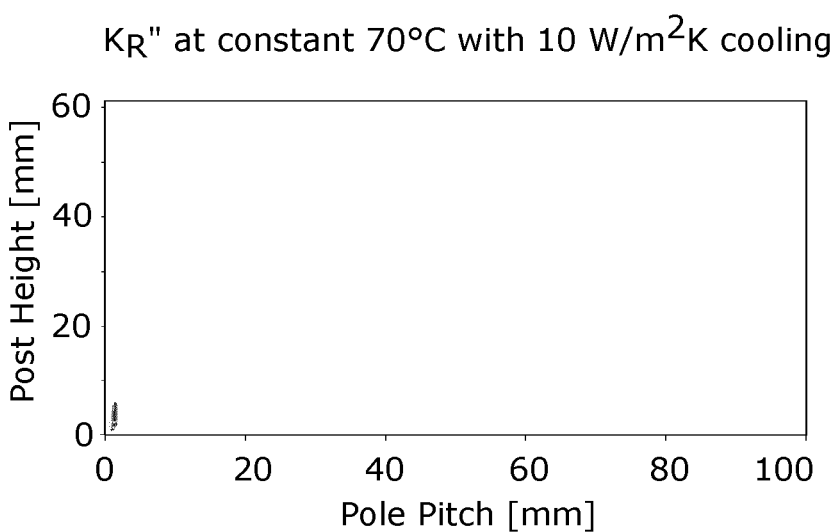
FIG. 51 shows the region of benefit for KR", with respect to the rest of the geometries in the domain, for a machine with 25 mm size and a boundary line for KR">3.6.
Figure 52:
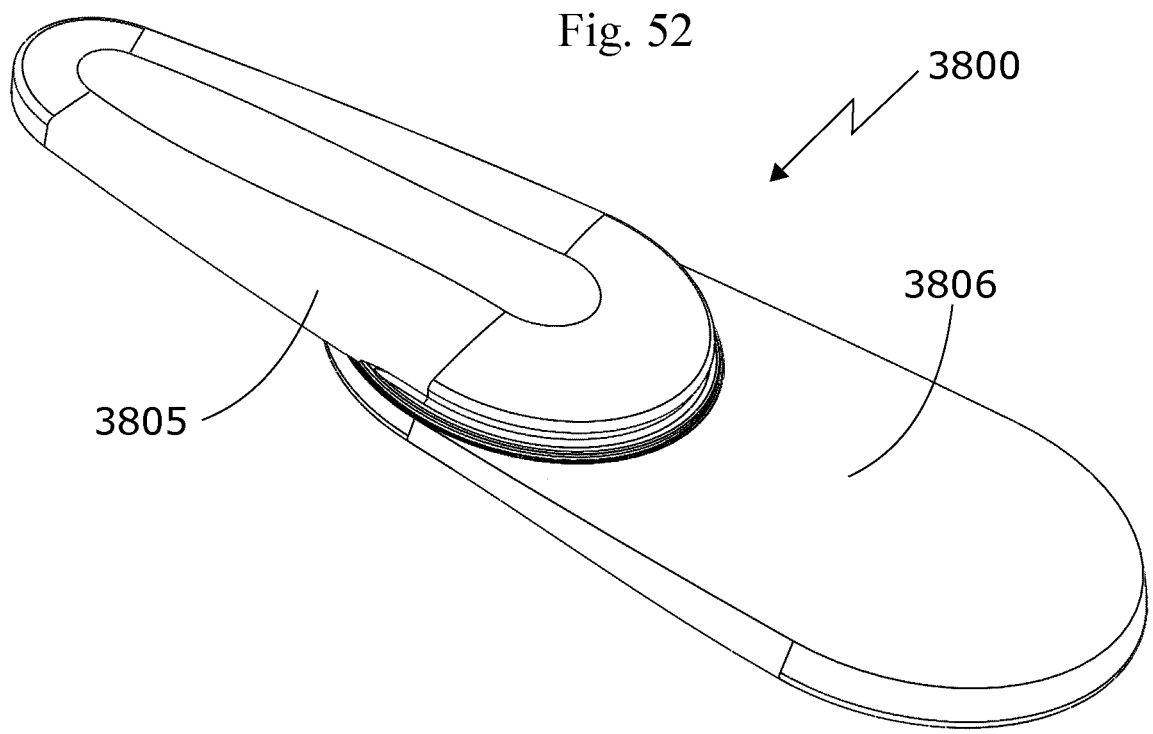
FIG. 52 shows the joint of a robot arm using a frameless motor/actuator.
Figure 53:
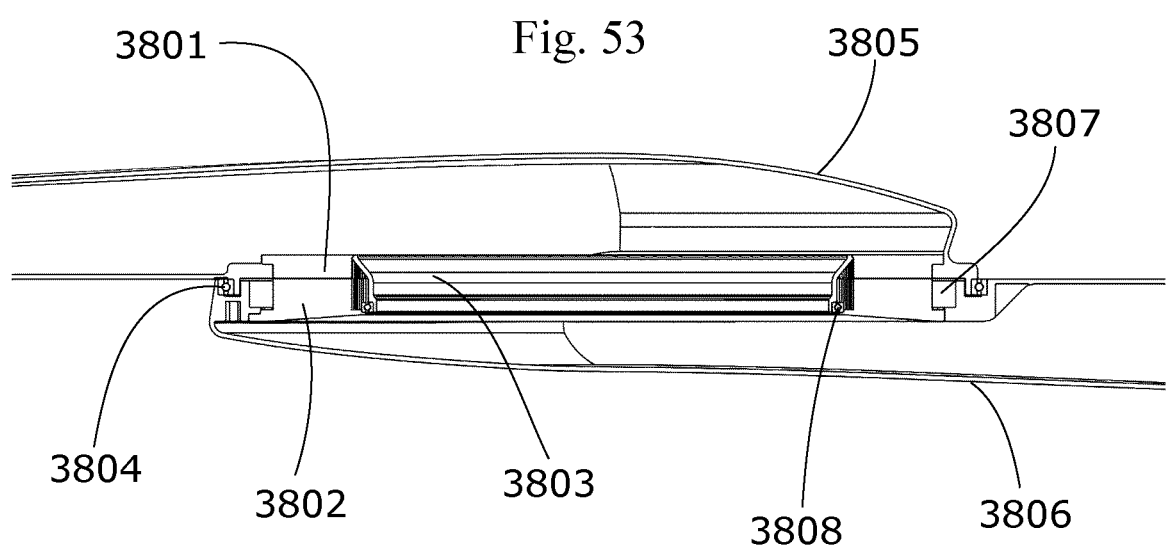
FIG. 53 displays a cross-sectional view of the frameless motor/actuator and robot arm.
Figure 54:
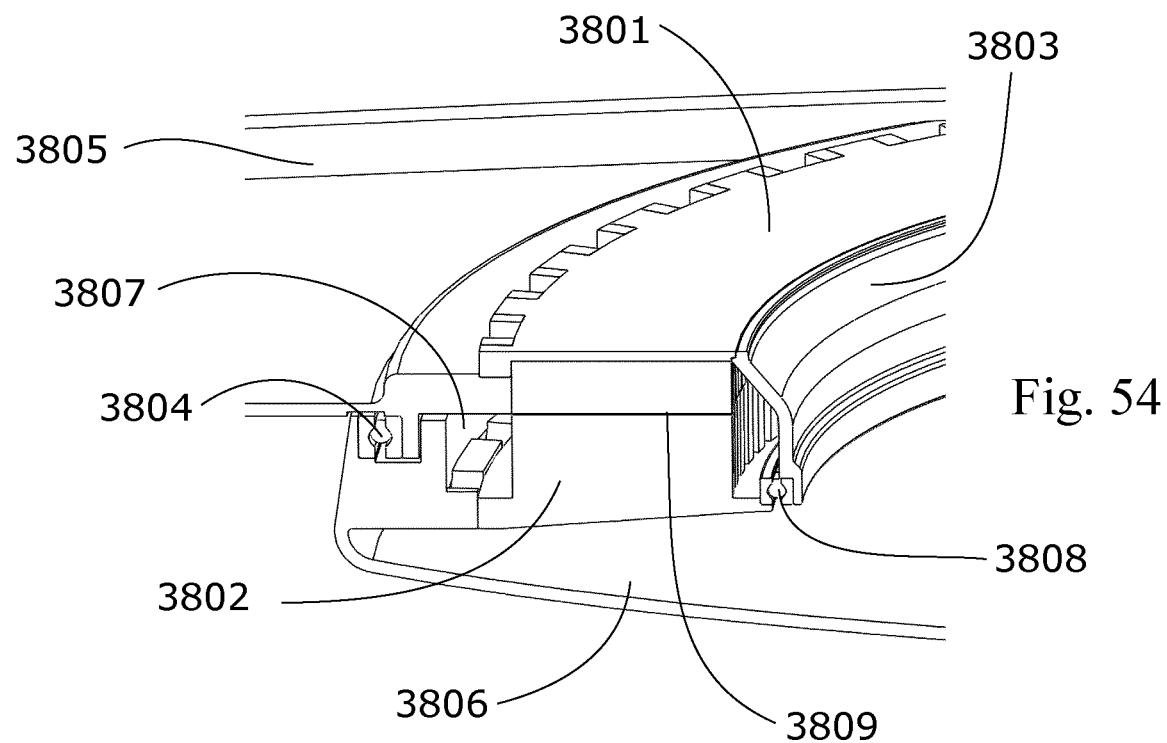
FIG. 54 shows a close up of the section view of the frameless motor/actuator stator, rotor and housing assembly.
Figure 55:
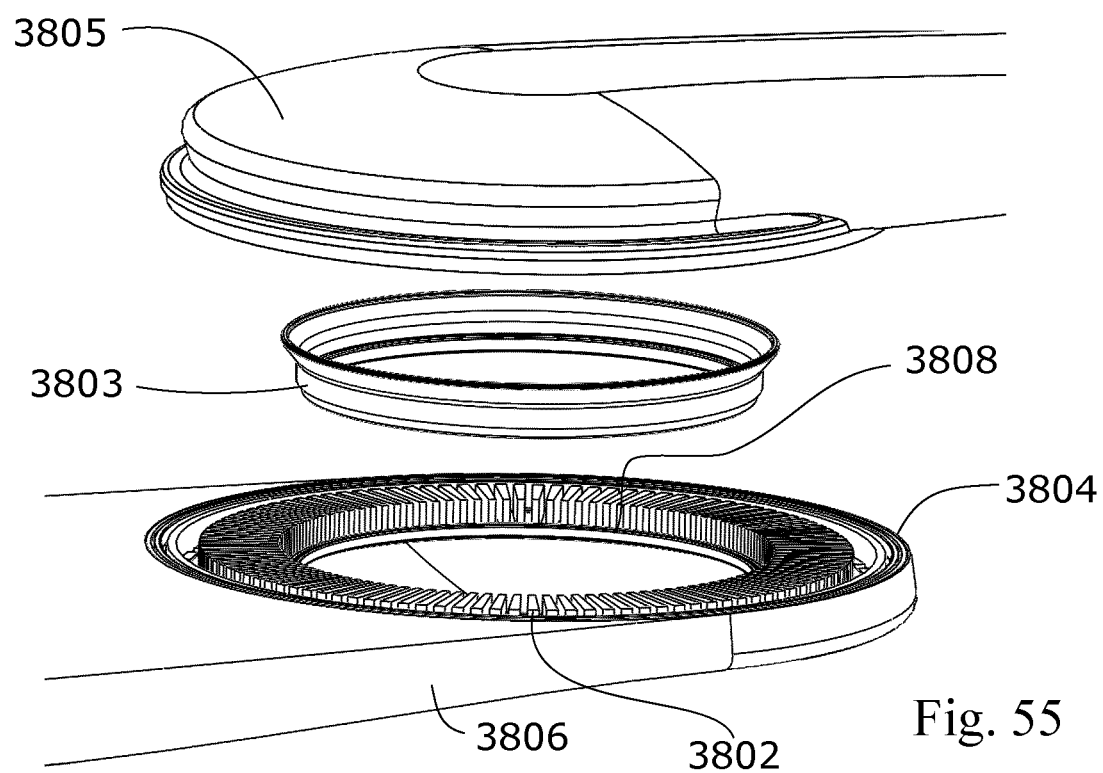
FIG. 55 shows an exploded view of the frameless motor/actuator robot arm assembly.
Figure 56:
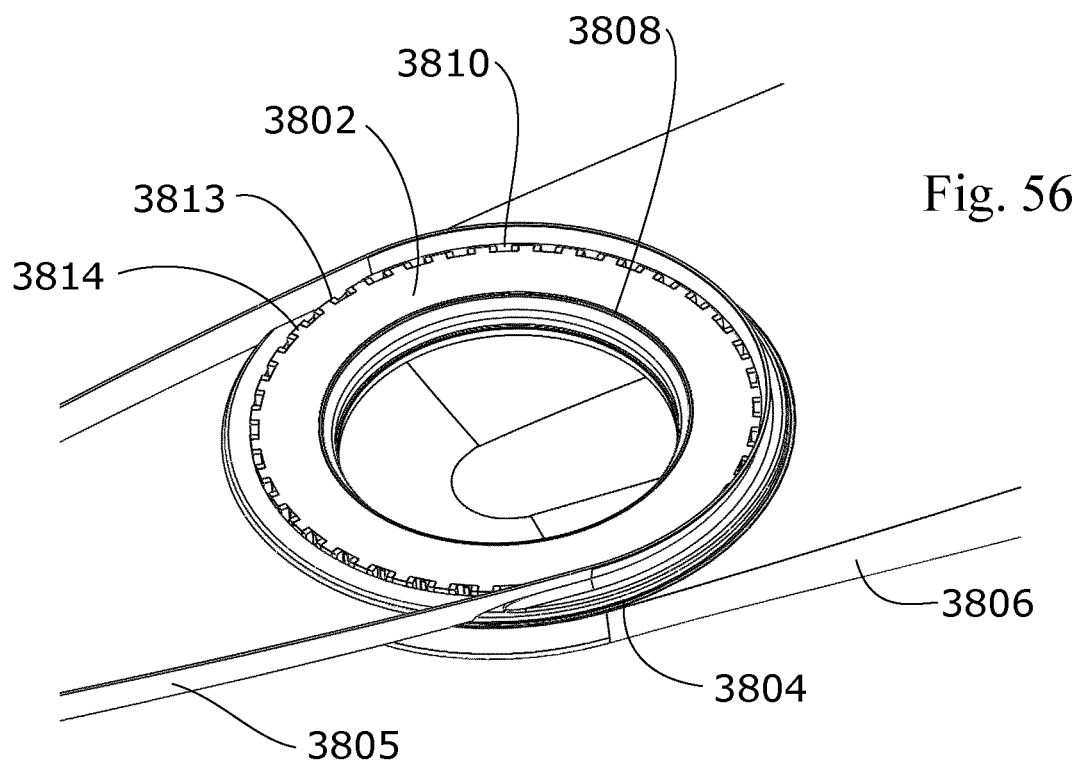
FIG. 56 displays a section view through the housing to view the stator and tab features on the rotor.
Figure 57:
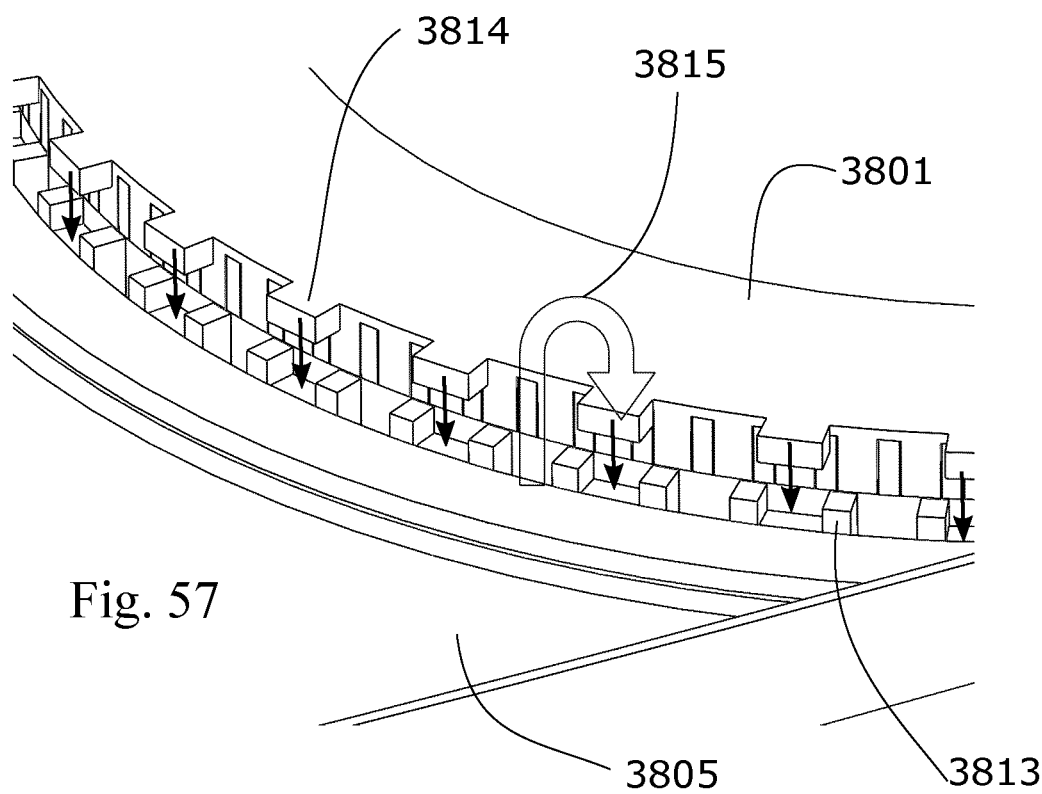
FIG. 57 shows a representation of an up, over and down assembly motion used with the tab features in FIG. 56 to secure the rotor.
Figure 58:
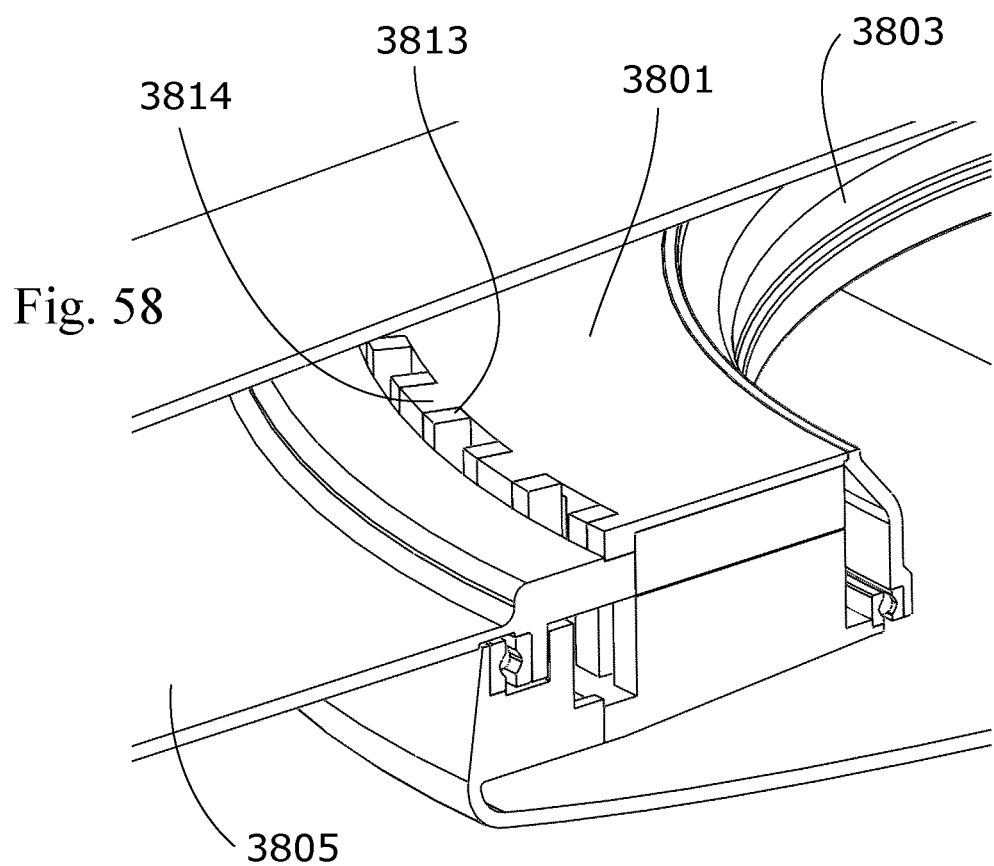
FIG. 58 shows a close up of the section view displaying the tab feature used to secure the rotor.
Figure 59:
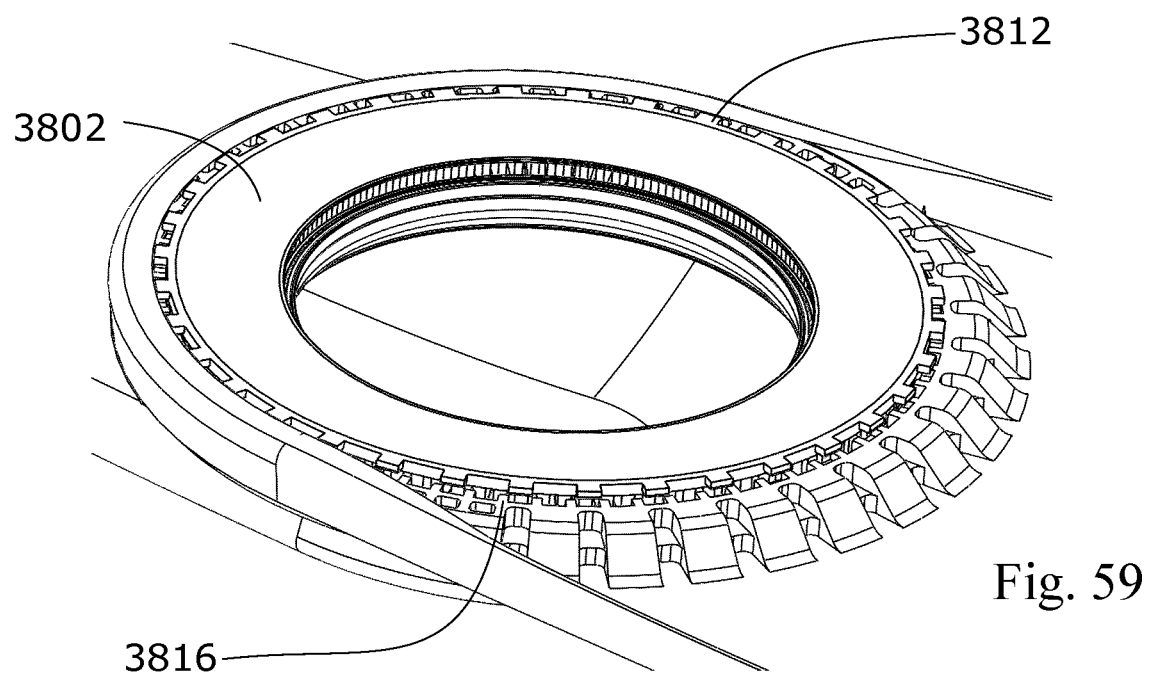
FIG. 59 shows a section view through the housing to display the tab features used on the stator to secure the stator.

In a machine with 25 mm size, the boundary line for $K''_R > 3.6$ is defined by the values shown in Table 3 and the corresponding graph is FIG. 51.

TABLE 3

Set A3

| | | | Points | |
|---|---|---|---|---|
| | | | Pole Pitch | Post Height |
| Post Height> | | | | |
| −4.160 * S + 5.032 | for | 0.723 < S < 0.967 | 0.723 | 2.024 |
| 0.839 * S + 0.198 | for | 0.967 < S < 1.692 | 0.967 | 1.009 |
| 2.713 * S − 2.973 | for | 1.692 < S < 1.939 | 1.692 | 1.617 |
| Post Height< | | | 1.939 | 2.287 |
| −53.233 * S + 105.506 | for | 1.879 < S < 1.939 | 1.879 | 5.481 |
| −1.406 * S + 8.122 | for | 1.465 < S < 1.879 | 1.465 | 6.063 |
| 3.898 * S + 0.353 | for | 1.035 < S < 1.465 | 1.035 | 4.387 |
| 7.535 * S − 3.412 | for | 0.723 < S < 1.035 | 0.723 | 2.036 |
| | | | 0.723 | 2.024 |

Figure 46:
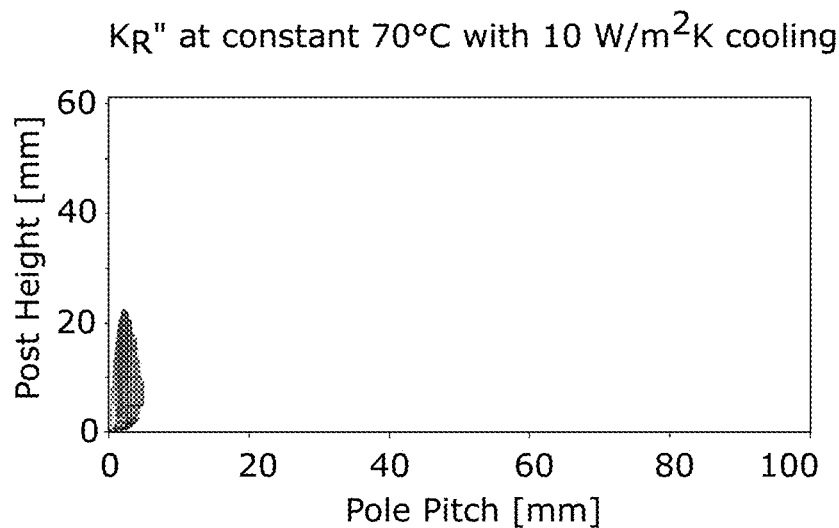
FIG. 46 shows the region of benefit for KR", with respect to the rest of the geometries in the domain, for a machine with 50 mm size and a boundary line for KR">2.2.

In a machine with 50 mm size, the boundary line for $K''_R > 2.2$ is defined by the values in Table 4 and the corresponding graph is FIG. 46.

TABLE 4

Set B1

| | | | Points | |
|---|---|---|---|---|
| | | | Pole Pitch | Post Height |
| Post Height> | | | | |
| 0.254 * S + 0.462 | for | 0.319 < S < 3.667 | 0.319 | 0.543 |
| 2.665 * S + −8.380 | for | 3.667 < S < 5.000 | 3.667 | 1.394 |
| | | | 5.000 | 4.947 |
| Post Height< | | | 4.500 | 14.088 |
| −18.282 * S + 96.357 | for | 4.500 < S < 5.000 | 2.738 | 22.304 |
| −4.663 * S + 35.071 | for | 2.738 < S < 4.500 | 1.447 | 18.967 |
| 2.585 * S + 15.227 | for | 1.447 < S < 2.738 | 0.319 | 0.904 |
| 16.013 * S − 4.204 | for | 0.319 < S < 1.447 | 0.319 | 0.543 |

Figure 47:
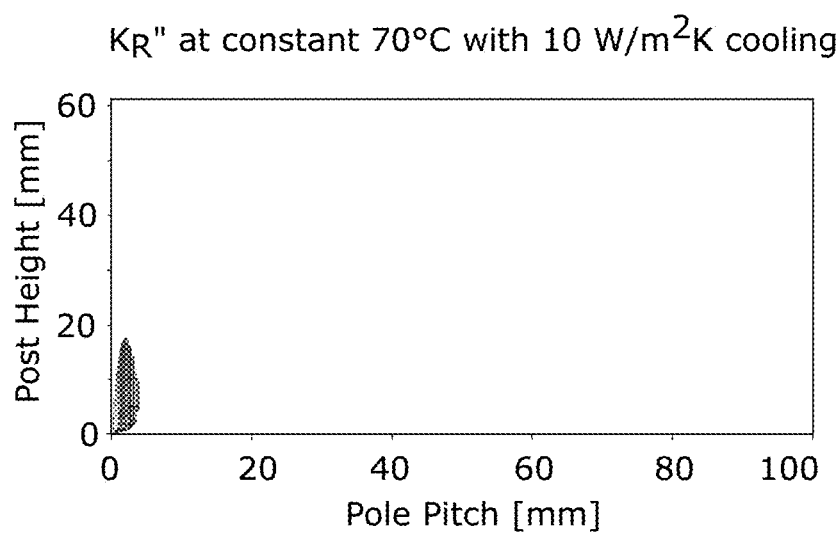
FIG. 47 shows the region of benefit for KR", with respect to the rest of the geometries in the domain, for a machine with 50 mm size and a boundary line for KR">2.5.

In a machine with 50 mm size, the boundary line for $K''_R > 2.5$ is defined by the values in Table 5, and the corresponding graph is FIG. 47.

TABLE 5

Set B2

| | | | Points | |
|---|---|---|---|---|
| | | | Pole Pitch | Post Height |
| Post Height> | | | | |
| 0.269 * S + 0.456 | for | 0.380 < S < 3.016 | 0.380 | 0.558 |
| 3.051 * S − 7.936 | for | 3.016 < S < 4.167 | 3.016 | 1.267 |
| Post Height< | | | 4.167 | 4.779 |
| −14.766 * S + 66.309 | for | 3.667 < S < 4.167 | 3.667 | 12.162 |
| −3.952 * S + 26.654 | for | 2.315 < S < 3.667 | 2.315 | 17.505 |
| 3.108 * S + 10.310 | for | 1.278 < S < 2.315 | 1.278 | 14.282 |
| 14.542 * S − 4.303 | for | 0.389 < S < 1.278 | 0.389 | 1.354 |
| 88.444 * S − 33.051 | for | 0.380 < S < 0.389 | 0.380 | 0.558 |

Figure 48:
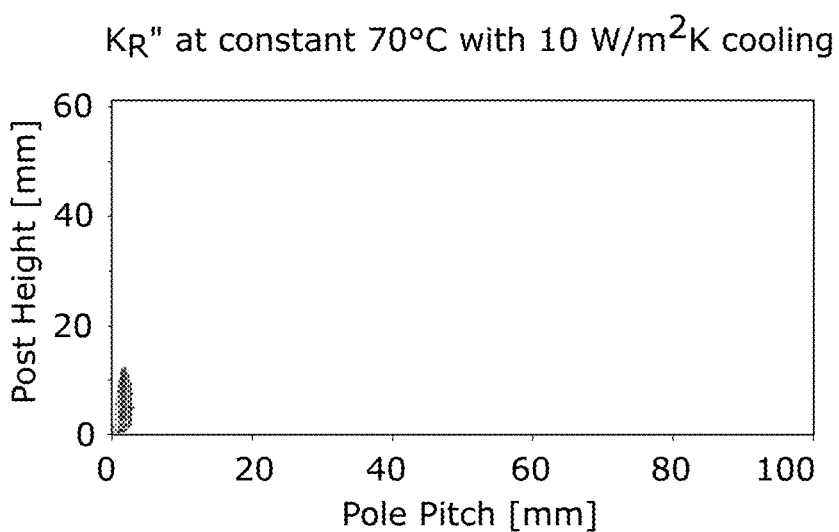
FIG. 48 shows the region of benefit for KR", with respect to the rest of the geometries in the domain, for a machine with 50 mm size and a boundary line for KR">2.9.

In a machine with 50 mm size, the boundary line for $K''_R > 2.9$ is defined by the values in Table 6, and the corresponding graph is FIG. 48.

TABLE 6

Set B3

| | | | Points | |
|---|---|---|---|---|
| | | | Pole Pitch | Post Height |
| Post Height> | | | | |
| 0.191 * S + 0.626 | for | 0.472 < S < 2.181 | 0.472 | 0.716 |
| 2.135 * S − 3.613 | for | 2.181 < S < 3.095 | 2.181 | 1.043 |
| 53.475 * S − 162.511 | for | 3.095 < S < 3.175 | 3.095 | 2.994 |
| Post Height< | | | 3.175 | 7.272 |
| −5.095 * S + 23.450 | for | 2.222 < S < 3.175 | 2.222 | 12.128 |
| 0.805 * S + 10.339 | for | 1.381 < S < 2.222 | 1.381 | 11.451 |
| 10.251 * S − 2.706 | for | 0.572 < S < 1.381 | 0.572 | 3.158 |
| 24.420 * S − 10.810 | for | 0.472 < S < 0.572 | 0.472 | 0.716 |

Figure 43:
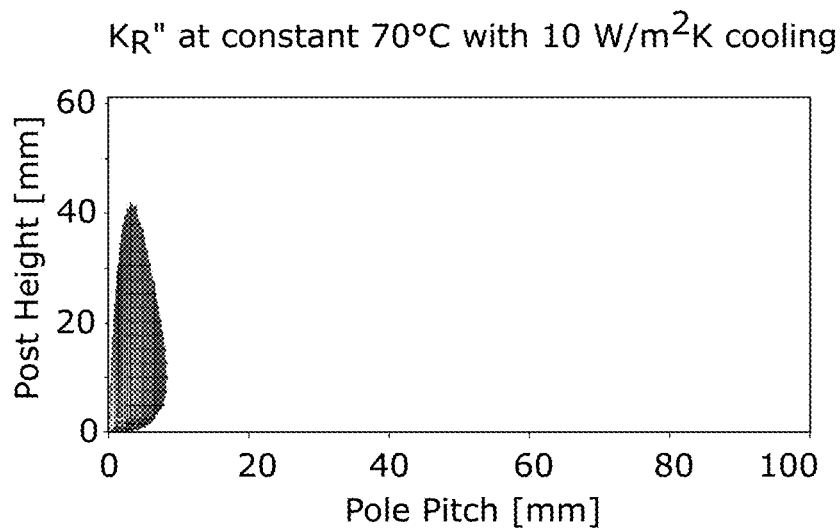
FIG. 43 shows the region of benefit for KR", with respect to the rest of the geometries in the domain, for a machine with 100 mm size and a boundary line for KR">1.5.

In a machine with 100 mm size, the boundary line for $K''_R > 1.5$ is defined by the values in Table 7, and the corresponding graph is FIG. 43.

TABLE 7

Set C1

| | | Points | |
|---|---|---|---|
| | | Pole Pitch | Post Height |
| Post Height> | | | |
| 0.322 * S + 0.359 | for 0.233 < S < 6.667 | 0.233 | 0.434 |
| 2.202 * S − 12.179 | for 6.667 < S < 8.333 | 6.667 | 2.504 |
| Post Height< | | 8.333 | 6.173 |
| −25.555 * S + 219.122 | for 7.778 < S < 8.333 | 7.778 | 20.356 |
| −5.585 * S + 63.794 | for 4.000 < S < 7.778 | 4.000 | 41.455 |
| 3.214 * S + 28.600 | for 1.793 < S < 4.000 | 1.793 | 34.362 |
| 21.749 * S − 4.633 | for 0.233 < S < 1.793 | 0.233 | 0.434 |

Figure 44:
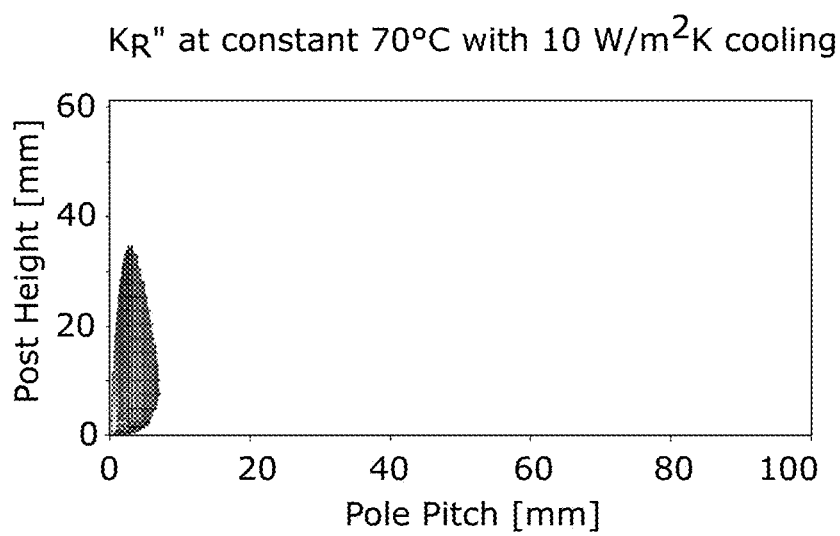
FIG. 44 shows the region of benefit for KR", with respect to the rest of the geometries in the domain, for a machine with 100 mm size and a boundary line for KR">1.7.

In a machine with 100 mm size, the boundary line for $K''_R > 1.7$ is defined by the values in Table 8, and the corresponding graph is FIG. 44.

TABLE 8

Set C2

| | | Points | |
|---|---|---|---|
| | | Pole Pitch | Post Height |
| Post Height> | | | |
| 0.277 * S + 0.593 | for 0.250 < S < 5.182 | 0.250 | 0.662 |
| 2.342 * S − 10.111 | for 5.182 < S < 7.222 | 5.182 | 2.026 |
| Post Height< | | 7.222 | 6.804 |
| −13.149 * S + 101.763 | for 6.111 < S < 7.222 | 6.111 | 21.412 |
| −4.885 * S + 51.265 | for 3.333 < S < 6.111 | 3.333 | 34.983 |
| 4.291 * S + 20.680 | for 1.520 < S < 3.333 | 1.520 | 27.203 |
| 20.788 * S − 4.395 | for 0.251 < S < 1.520 | 0.251 | 0.823 |
| 161.000 * S − 39.588 | for 0.250 < S < 0.251 | 0.250 | 0.662 |

Figure 45:
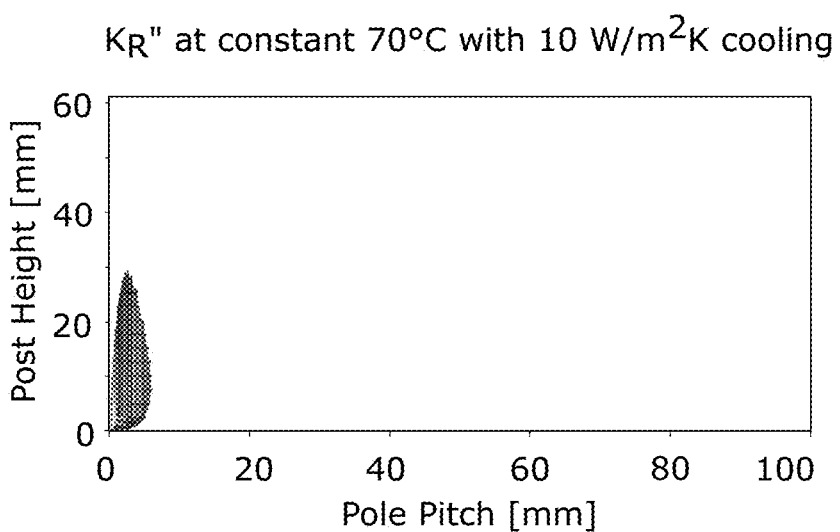
FIG. 45 shows the region of benefit for KR", with respect to the rest of the geometries in the domain, for a machine with 100 mm size and a boundary line for KR">1.9.

In a machine with 100 mm size, the boundary line for $K''_R > 1.9$ is defined by the values in Table 9, and the corresponding graph is FIG. 45.

TABLE 9

Set C3

| | | Points | |
|---|---|---|---|
| | | Pole Pitch | Post Height |
| Post Height> | | | |
| 0.277 * S + 0.591 | for 0.278 < S < 4.425 | 0.278 | 0.668 |
| 1.916 * S − 6.663 | for 4.425 < S < 6.111 | 4.425 | 1.817 |
| Post Height< | | 6.111 | 5.048 |
| −21.337 * S + 135.438 | for 5.556 < S < 6.111 | 5.556 | 16.890 |
| −4.985 * S + 44.588 | for 3.175 < S < 5.556 | 3.175 | 28.76 |
| 2.749 * S + 20.031 | for 1.560 < S < 3.175 | 1.560 | 24.320 |
| 18.321 * S − 4.260 | for 0.278 < S < 1.560 | 0.278 | 0.833 |
| | | 0.278 | 0.646 |

Figure 40:
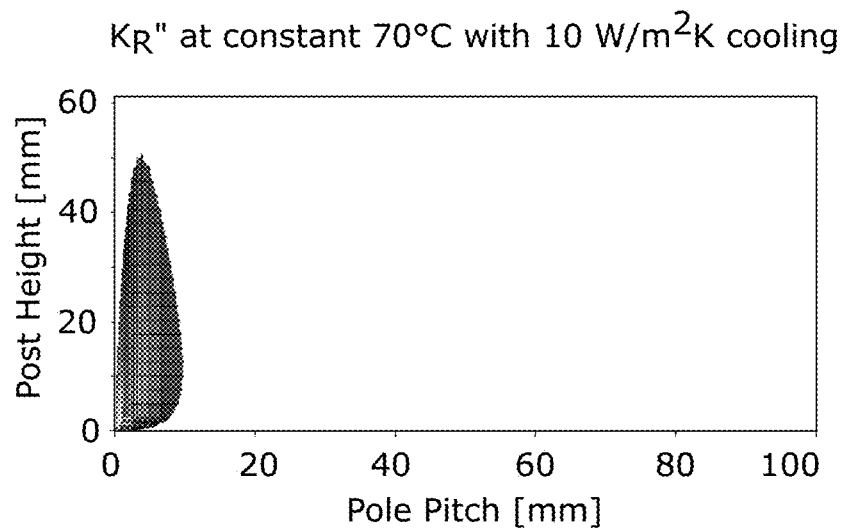
FIG. 40 shows the region of benefit for KR", with respect to the rest of the geometries in the domain, for a machine with 200 mm size and a boundary line for KR">1.3.

In a machine with 200 mm size, the boundary line for $K''_R > 1.3$ is defined by the values in Table 10, and the corresponding graph is FIG. 40.

TABLE 10

Set D1

| | | Points | |
|---|---|---|---|
| | | Pole Pitch | Post Height |
| Post Height> | | | |
| 0.257 * S + 0.327 | for 0.208 < S < 7.778 | 0.208 | 0.381 |
| 1.977 * S − 13.044 | for 7.778 < S < 9.444 | 7.778 | 2.330 |
| Post Height< | | 9.444 | 5.623 |
| −36.195 * S + 347.445 | for 8.889 < S < 9.444 | 8.889 | 25.711 |
| −5.777 * S + 77.062 | for 4.833 < S < 8.889 | 4.833 | 49.142 |
| 1.950 * S + 39.718 | for 2.222 < S < 4.833 | 2.222 | 44.051 |
| 20.301 * S − 1.058 | for 0.389 < S < 2.222 | 0.389 | 6.839 |
| 34.481 * S − 6.574 | 0.208 < S < 0.389 | 0.208 | 0.598 |
| | | 0.208 | 0.381 |

Figure 41:
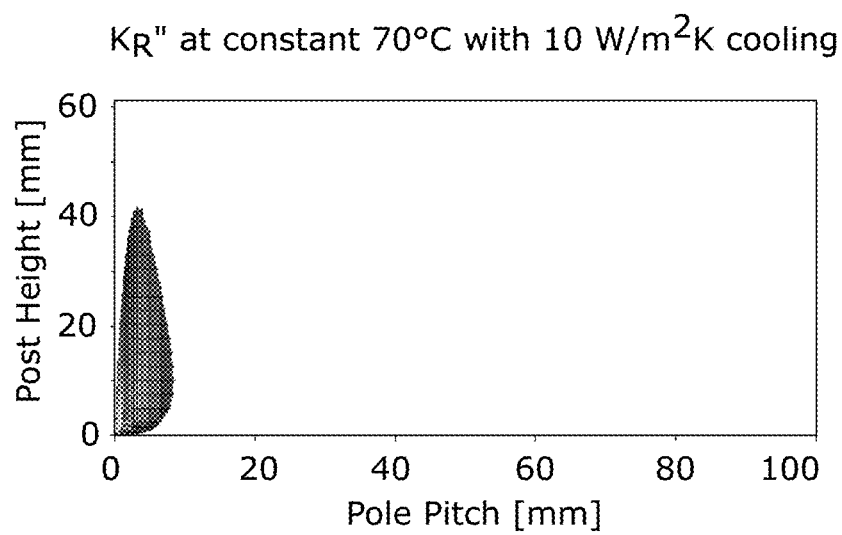
FIG. 41 shows the region of benefit for KR", with respect to the rest of the geometries in the domain, for a machine with 200 mm size and a boundary line for KR">1.5.

In a machine with 200 mm size, the boundary line for $K''_R > 1.5$ is defined by the values in Table 11, and the corresponding graph is FIG. 41.

TABLE 11

Set D2

| | | Points | |
|---|---|---|---|
| | | Pole Pitch | Post Height |
| Post Height> | | | |
| 0.322 * S + 0.359 | for 0.233 < S < 6.667 | 0.233 | 0.434 |
| 2.202 * S + −12.179 | for 6.667 < S < 8.333 | 6.667 | 2.504 |
| Post Height< | | 8.333 | 6.173 |
| −25.555 * S + 219.122 | for 7.778 < S < 8.333 | 7.778 | 20.356 |
| −5.585 * S + 63.794 | for 4.000 < S < 7.778 | 4.000 | 41.455 |
| 3.214 * S + 28.600 | for 1.793 < S < 4.000 | 1.793 | 34.362 |
| 21.749 * S + −4.633 | for 0.233 < S < 1.793 | 0.233 | 0.434 |

Figure 42:
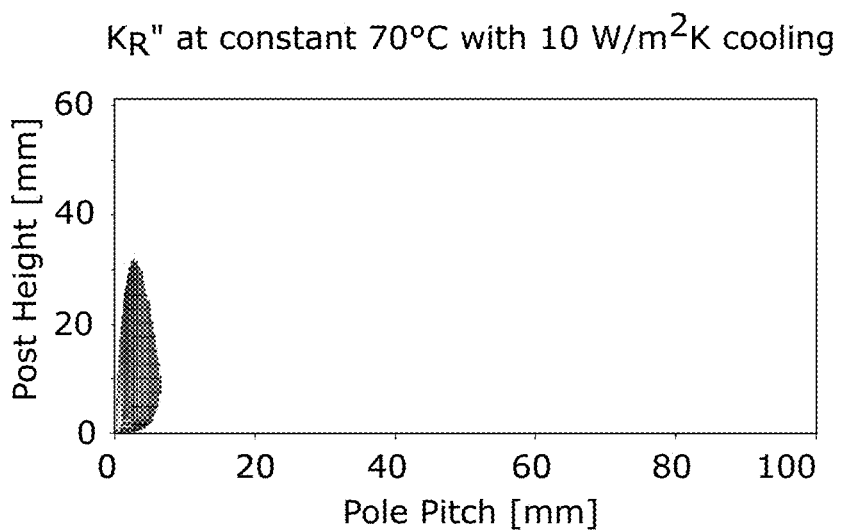
FIG. 42 shows the region of benefit for KR", with respect to the rest of the geometries in the domain, for a machine with 200 mm size and a boundary line for KR">1.8.

In a machine with 200 mm size, the boundary line for $K''_R > 1.8$ is defined by the values in Table 12, and the corresponding graph is FIG. 42.

TABLE 12

Set D3

| | | Points | |
|---|---|---|---|
| | | Pole Pitch | Post Height |
| Post Height> | | | |
| 0.212 * S + 0.600 | for 0.264 < S < 4.833 | 0.264 | 0.656 |
| 3.017 * S + −12.960 | for 4.833 < S < 6.667 | 4.833 | 1.623 |
| Post Height< | | 6.667 | 7.157 |
| −12.356 * S + 89.531 | for 5.556 < S < 6.667 | 5.556 | 20.884 |
| −4.551 * S + 46.170 | for 3.175 < S < 5.556 | 3.175 | 31.72 |
| 3.850 * S + 19.496 | for 1.502 < S < 3.175 | 1.502 | 25.279 |
| 19.751 * S + −4.387 | for 0.264 < S < 1.502 | 0.264 | 0.827 |
| | | 0.264 | 0.656 |

At each machine size, each boundary line is defined for a given K" value, such that for each machine size there is a set of K" values and a corresponding set of boundary lines. Pairs of boundary lines can be chosen, in which one boundary line is chosen from each of two consecutive sizes of device, i.e. 25 mm and 50 mm, 50 mm and 100 mm, or 100 mm and 200 mm. The boundary lines occupy a space or volume defined by size, pole pitch and post height. A boundary surface may be defined as the two-dimensional uninterrupted surface in the space that is the exterior surface of the union of all lines that connect an arbitrary point in the first boundary line and an arbitrary point in the second boundary line. The boundary surface encloses a benefit space. For each pair of boundary lines, the boundary surface defines a benefit space. An electric machine with a size, pole pitch and post height that is within a given benefit space is considered to fall within the embodiment defined by the corresponding boundary lines for that size of machine.

For machine sizes greater than the largest calculated size, the boundary lines calculated for the largest calculated size are used. The benefit space beyond the largest calculated size is thus simply the surface defined by the calculated boundary lines for that size and the volume of points corresponding to greater size but with pole pitch and post height equal to a point on the surface.

The main components of an electric machine comprise a first carrier (rotor, stator, or part of linear machine) having an array of electromagnetic elements and a second carrier having electromagnetic elements defining magnetic poles, the second carrier being arranged to move relative to the first carrier for example by bearings, which could be magnetic bearings. The movement may be caused by interaction of magnetic flux produced by electromagnetic elements of the first carrier and of the second carrier (motor embodiment) or by an external source, in which case the movement causes electromotive force to be produced in windings of the electric machine (generator embodiment). An airgap is provided between the first carrier and the second carrier. The electromagnetic elements of the first carrier include posts, with slots between the posts, one or more electric conductors in each slot, the posts of the first carrier having a post height in mm. The first carrier and the second carrier together define a size of the electric machine. The magnetic poles having a pole pitch in mm. The size of the motor, pole pitch and post height are selected to fall within a region in a space defined by size, pole pitch and post height. The region is defined by 1) a union of a) a first surface defined by a first set of inequalities for a first size of electric machine, b) a second surface defined by a second set of inequalities for a second size of electric machine; and c) a set defined as containing all points lying on line segments having a first end point on the first surface and a second end point on the second surface, or 2) a surface defined by a set of inequalities and all points corresponding to greater size but with pole pitch and post height corresponding to points on the surface.

The first set of inequalities and the second set of inequalities are respectively sets of inequalities A and B, or B and C, or C and D where A is selected from the group of sets of inequalities consisting of the equations set forward in Tables 1, 2 and 3 (respectively sets of equalities A1, A2 and A3), B is selected from the group of sets of inequalities consisting of the equations set forward in Tables 4, 5 and 6 (respectively sets of equalities B1, B2 and B3), C is selected from the group of sets of inequalities consisting of the equations set forward in Tables 7, 8 and 9 (respectively sets of inequalities C1, C2, C3) and D is selected from the group of sets of inequalities consisting of the inequalities set forward in Tables 10, 11 and 12 (respectively sets of inequalities D1, D2 and D3).

The space in which the electric machine is characterized may be formed by any pair of inequalities that are defined by sets of inequalities for adjacent sizes, for example: A1 B1, A1 B2, A1 B3, A2 B1, A2 B2, A2 B3, A3 B1, A3 B2, A3 B3, B1 C1, B1 C2, B1 C3, B2 C1, B2 C2, B2 C3, B3 C1, B3 C2, B3 C3, C1 D1, C1 D2, C1 D3, C2 D1, C2 D2, C2 D3, C3 D1, C3 D2, C3 D3. It may also be formed by any set of inequalities and all points corresponding greater size but having post height and pole pitch within the region defined by the set of inequalities.

All of the devices described in this application may have sizes, pole pitches and post heights falling within the regions and spaces defined by these equations.

The low conductor volume, in this case has the benefit of lower thermal resistance due to the shorter conductors. Within the disclosed range, the need to power these conductors at higher current densities is more than compensated for by the heat dissipation benefits of the device to achieve a given torque-to-weight. Within the disclosed $K''_R$ range, the reduction in weight (which results, in part, from the low conductor volume) can exceed the extra power required (which results from the higher current densities) such that net benefit can be produced in terms of KR. The stated ranges of geometry in a machine of the given diameter provides a heat dissipation effect associated with feature geometry known for much smaller machines, but used according to the principles of the present device, in a large diameter machine.

For the disclosed electric machine, the $K_R$ is the same at low to high power output (until the stator saturates at which time the $K_R$ will be reduced) so different levels of cooling will be needed depending on the power output but the torque-to-weight-to-power consumption remains reasonably constant. The disclosed range of pole density and conductor volume may provide unusually high torque-to-weight for a given rate of heat dissipation with a given method of cooling. The disclosed range of pole density and conductor volume may produce higher torque-to-weight for a given cooling method applied to the back surface of the stator and a given conductor temperature. The primary form of electrical conductor cooling for the disclosed range of pole density and electrical conductor volume is thermal conductive heat transfer from the electrical conductors to the back surface of the stator.

For a single actuator producing a fixed torque, the power consumption rises in the disclosed range, and becomes exponentially larger towards the smallest post heights and slot pitches inside the disclosed range. From simulations of the power consumption necessary to produce 100 N m of torque with a single 200 mm average airgap diameter actuator with a radial tooth length of 32 mm and rotor and windings, it can be seen that the lowest power consumption occurs outside of the disclosed range, and that the power consumption increases significantly inside the disclosed range. In order to minimize power consumption, a designer would be led toward larger slot pitch and larger conductor volume devices. Any actuators using the geometry of the present device will have higher power consumption than those outside of the disclosed range towards larger slot pitch and conductor volume values for this type of application.

With the disclosed structure, in which a pole carrier of the electric machine includes slots and posts, the slots having a slot or pole pitch s and the posts having a height h, in which s is related to h according to the disclosed equations, electric excitation may be applied to conductors in the slots with a current density of at least 70 A/mm2. Electric excitations in excess of 70 A/mm$^2$ are generally considered suitable for the operation of the disclosed device. The cooling effect of having the disclosed slot and conductor structure provides cooling to offset some or all of the heat generated by the current in the conductors. Any remaining heat generated may be dissipated using one or more of the disclosed cooling structures or channels. Motors inside the disclosed range show a reduction of the average flux density in the magnetic flux path for a given electrical input power. This is due, in part, to the reduced flux path length of the shorter posts and reduced distance from post to adjacent post through the backiron, as well as the reduced flux leakage between posts. The result is the ability to run higher current density in motors in the disclosed range without reaching saturation. The combination of increased cooling capability and lower flux density at a given current density as compared to motors outside of the disclosed range, creates a combination of conditions where higher continuous torque-to-weight can be achieved for a given temperature at a given cooling rate, and where the peak momentary torque-to-weight of motors in the disclosed range can be significantly higher due to operating at a lower flux density for a given torque-to-weight in the disclosed range.

Although the foregoing description has been made with respect to preferred embodiments of the present invention it will be understood by those skilled in the art that many variations and alterations are possible. Some of these variations have been discussed above and others will be apparent to those skilled in the art.

In the claims, the word "comprising" is used in its inclusive sense and does not exclude the possibility of other elements being present. The indefinite article "a/an" before a claim feature does not exclude more than one of the feature being present unless it is clear from the context that only a single element is intended.

I claim:

1. An electric machine comprising:
   a stator having an array of electromagnetic elements;
   a rotor mounted on a first bearing comprising an inner thrust bearing and a second bearing comprising an outer thrust bearing, the rotor having an array of rotor posts, each of the rotor posts having a length defining opposed ends and the array of rotor posts extending along the rotor in a direction perpendicular to the length of each of the rotor posts, and the rotor having electromagnetic elements arranged radially inward of the outer thrust bearing and radially outward of the inner thrust bearing defining magnetic poles placed between the plurality of rotor posts;
   an airgap being formed axially between the rotor and the stator when the stator and the rotor are in an operational position; and
   a plurality of rotor flux restrictors being formed on the rotor, each of the plurality of rotor flux restrictors each lying adjacent to one of the opposed ends of the rotor posts,
   wherein the flux restrictors comprise a plurality of inner flux restrictors lying radially inward from the rotor posts and radially outward from the inner thrust bearing and further comprises a plurality of outer flux restrictors lying radially outward from the rotor posts and radially inward from the outer thrust bearings.

2. The electric machine of claim 1 in which the bearings further comprise:
   a first bearing connecting the rotor and the stator, the first bearing being arranged to allow relative rotary motion of the rotor and the stator;
   a second bearing connecting the rotor and the stator, the second bearing being arranged to allow relative rotary motion of the rotor and the stator; and
   in which the array of rotor posts and the plurality of rotor flux restrictors lie on the rotor between the first bearing and the second bearing.

3. The electric machine of claim 2 in which the plurality of rotor flux restrictors further comprises a plurality of holes within the rotor.

4. The electric machine of claim 3 in which the plurality of rotor flux restrictors further comprises a plurality of blind holes.

5. The electric machine of claim 3 in which the plurality of rotor flux restrictors further comprises a plurality of through holes.

6. The electric machine of claim 2 in which:
   the electric machine further comprises an axial electric machine,
   the first bearing further comprises an inner thrust bearing,
   the second bearing further comprises an outer thrust bearing, and
   the electromagnetic elements of the stator and the electromagnetic elements of the rotor are arranged radially inward of the outer thrust bearing and radially outward of the inner thrust bearing, the inner thrust bearing and the outer thrust bearing being arranged to maintain the airgap against a magnetic attraction of the electromagnetic elements of the rotor and the electromagnetic elements of the stator.

7. The electric machine of claim 1 in which the each of the inner and outer flux restrictors are radially aligned in an alternating pattern relative to the rotor posts, so that the inner and outer flux restrictors are adjacent to every second rotor post.

8. The electric machine of claim 7 in which the inner and outer flux restrictors are adjacent to alternate rotor posts so that each rotor post is adjacent to only one of the inner flux restrictors or one of the outer flux restrictors.

9. The electric machine of claim 1 in which each of the inner and outer flux restrictors are radially aligned with the rotor posts, and the inner and outer flux restrictors are adjacent to each rotor post.

10. The electric machine of claim 1 in which for each rotor posts, the rotor post is adjacent to two inner flux restrictors and two outer flux restrictors.

11. The electric machine of claim 1 in which the plurality of inner flux restrictors and the plurality of outer flux restrictors each further comprise a plurality of holes having the same geometry.

12. The electric machine of claim 11 in which the plurality of holes having the same geometry further comprise a plurality of holes having a circular cross-section.

13. The electric machine of claim 12 in which the circular cross-section of each of the plurality of holes has an equal size.

14. The electric machine of any of claim 1 in which the stator further comprises stator posts that form the electromagnetic elements of the stator, with slots between the stator posts, one or more electric conductors in each slot, each of the stator posts having a length defining opposed ends and the array of stator posts extending around the stator circularly in a direction perpendicular to the length of each of the posts and the stator further comprising a plurality of stator flux restrictors being formed on the stator, each of the plurality of stator flux restrictors lying adjacent to one of the opposed ends of the stator posts.

15. The electric machine of claim 1 in which the stator further comprises stator posts that form the electromagnetic elements of the stator, with slots between the stator posts, one or more electric conductors in each slot, the posts of the stator having a post height in mm, the stator and rotor together defining a size of the electric machine, the magnetic poles have a pole pitch S in mm, the size of the electric machine, pole pitch and post height being selected to fall within a region in a space defined by size, pole pitch and post height, the region being defined by either 1) a first union of:
   a) a first surface defined by a first set of inequalities for a first size of electric machine;
   b) a second surface defined by a second set of inequalities for a second size of electric machine; and
   c) a set defined as containing all points lying on line segments having a first end point on the first surface and a second end point on the second surface;

the first set of inequalities and the second set of inequalities being respectively sets of inequalities A and B, or B and C, or C and D, in which the group of inequalities A is for a size of 25 mm, the group of inequalities B is for a size of 50 mm, the group of inequalities C is for a size of 100 mm, the group of inequalities D is for a size of 200 mm; or 2) a second union of a surface as defined by set of inequalities D and a corresponding set of all points with size greater than the surface but with pole pitch and post height corresponding to points within the surface;

where

A is selected from the group of sets of inequalities consisting of:

Set A1:

| Post Height> | | |
|---|---|---|
| −1.070 * S + 2.002 | for | 0.572 < S < 1.189 |
| 1.175 * S + −0.667 | for | 1.189 < S < 2.269 |
| 13.502 * S − 28.637 | for | 2.269 < S < 2.500 |
| Post Height< | | |
| −5.898 * S + 19.863 | for | 1.970 < S < 2.500 |
| 0.229 * S + 7.794 | for | 1.349 < S < 1.970 |
| 7.607 * S − 2.160 | for | 0.723 < S < 1.349 |
| 11.430 * S − 4.924 | for | 0.572 < S < 0.723 |

Set A2:

| Post Height> | | |
|---|---|---|
| −1.340 * S + 2.305 | for | 0.619 < S < 1.120 |
| 1.100 * S − 0.429 | for | 1.120 < S < 2.074 |
| 3.830 * S − 6.082 | for | 2.074 < S < 2.269 |
| Post Height< | | |
| −69.510 * S + 160.318 | for | 2.222 < S < 2.269 |
| −3.430 * S + 13.492 | for | 1.667 < S < 2.222 |
| 2.830 * S + 3.056 | for | 1.133 < S < 1.667 |
| 8.650 * S − 3.545 | for | 0.619 < S < 1.133 |

Set A3:

| Post Height> | | |
|---|---|---|
| −4.160 * S + 5.032 | for | 0.723 < S < 0.967 |
| 0.839 * S + 0.198 | for | 0.967 < S < 1.692 |
| 2.713 * S − 2.973 | for | 1.692 < S < 1.939 |
| Post Height< | | |
| −53.233 * S + 105.506 | for | 1.879 < S < 1.939 |
| −1.406 * S + 8.122 | for | 1.465 < S < 1.879 |
| 3.898 * S + 0.353 | for | 1.035 < S < 1.465 |
| 7.535 * S − 3.412 | for | 0.723 < S < 1.035 |

B is selected from the group of sets of inequalities consisting of:

Set B1:

| Post Height> | | |
|---|---|---|
| 0.254 * S + 0.462 | for | 0.319 < S < 3.667 |
| 2.665 * S + −8.380 | for | 3.667 < S < 5.000 |
| Post Height< | | |
| −18.282 * S + 96.357 | for | 4.500 < S < 5.000 |
| −4.663 * S + 35.071 | for | 2.738 < S < 4.500 |
| 2.585 * S + 15.227 | for | 1.447 < S < 2.738 |
| 16.013 * S − 4.204 | for | 0.319 < S < 1.447 |

Set B2:

| Post Height> | | |
|---|---|---|
| 0.269 * S + 0.456 | for | 0.380 < S < 3.016 |
| 3.051 * S − 7.936 | for | 3.016 < S < 4.167 |
| Post Height< | | |
| −14.766 * S + 66.309 | for | 3.667 < S < 4.167 |
| −3.952 * S + 26.654 | for | 2.315 < S < 3.667 |
| 3.108 * S + 10.310 | for | 1.278 < S < 2.315 |
| 14.542 * S − 4.303 | for | 0.389 < S < 1.278 |
| 88.444 * S − 33.051 | for | 0.380 < S < 0.389 |

Set B3:

| Post Height> | | |
|---|---|---|
| 0.191 * S + 0.626 | for | 0.472 < S < 2.181 |
| 2.135 * S − 3.613 | for | 2.181 < S < 3.095 |
| 53.475 * S − 162.511 | for | 3.095 < S < 3.175 |
| Post Height< | | |
| −5.095 * S + 23.450 | for | 2.222 < S < 3.175 |
| 0.805 * S + 10.339 | for | 1.381 < S < 2.222 |
| 10.251 * S − 2.706 | for | 0.572 < S < 1.381 |
| 24.420 * S − 10.810 | for | 0.472 < S < 0.572 |

C is selected from the group of sets of inequalities consisting of:

Set C1:

| Post Height> | | |
|---|---|---|
| 0.322 * S + 0.359 | for | 0.233 < S < 6.667 |
| 2.202 * S − 12.179 | for | 6.667 < S < 8.333 |
| Post Height< | | |
| −25.555 * S + 219.122 | for | 7.778 < S < 8.333 |
| −5.585 * S + 63.794 | for | 4.000 < S < 7.778 |
| 3.214 * S + 28.600 | for | 1.793 < S < 4.000 |
| 21.749 * S − 4.633 | for | 0.233 < S < 1.793 |

Set C2:

| Post Height> | | |
|---|---|---|
| 0.277 * S + 0.593 | for | 0.250 < S < 5.182 |
| 2.342 * S − 10.111 | for | 5.182 < S < 7.222 |
| Post Height< | | |
| −13.149 * S + 101.763 | for | 6.111 < S < 7.222 |
| −4.885 * S + 51.265 | for | 3.333 < S < 6.111 |
| 4.291 * S + 20.680 | for | 1.520 < S < 3.333 |

-continued

| | | |
|---|---|---|
| 20.788 * S − 4.395 | for | 0.251 < S < 1.520 |
| 161.000 * S − 39.588 | for | 0.250 < S < 0.251 |

Set C3:

| Post Height> | | |
|---|---|---|
| 0.277 * S + 0.591 | for | 0.278 < S < 4.425 |
| 1.916 * S − 6.663 | for | 4.425 < S < 6.111 |

| Post Height< | | |
|---|---|---|
| −21.337 * S + 135.438 | for | 5.556 < S < 6.111 |
| −4.985 * S + 44.588 | for | 3.175 < S < 5.556 |
| 2.749 * S + 20.031 | for | 1.560 < S < 3.175 |
| 18.321 * S − 4.260 | for | 0.278 < S < 1.560 | and
D is selected from the group of sets of inequalities consisting of:
Set D1:

| Post Height> | | |
|---|---|---|
| 0.257 * S + 0.327 | for | 0.208 < S < 7.778 |
| 1.977 * S − 13.044 | for | 7.778 < S < 9.444 |

| Post Height< | | |
|---|---|---|
| −36.195 * S + 347.445 | for | 8.889 < S < 9.444 |
| −5.777 * S + 77.062 | for | 4.833 < S < 8.889 |
| 1.950 * S + 39.718 | for | 2.222 < S < 4.833 |
| 20.301 * S + −1.058 | for | 0.389 < S < 2.222 |
| 34.481 * S + −6.574 | for | 0.208 < S < 0.389 |

Set D2:

| Post Height> | | |
|---|---|---|
| 0.322 * S + 0.359 | for | 0.233 < S < 6.667 |
| 2.202 * S + −12.179 | for | 6.667 < S < 8.333 |

| Post Height< | | |
|---|---|---|
| −25.555 * S + 219.122 | for | 7.778 < S < 8.333 |
| −5.585 * S + 63.794 | for | 4.000 < S < 7.778 |
| 3.214 * S + 28.600 | for | 1.793 < S < 4.000 |
| 21.749 * S + −4.633 | for | 0.233 < S < 1.793 |

Set D3:

| Post Height> | | |
|---|---|---|
| 0.212 * S + 0.600 | for | 0.264 < S < 4.833 |
| 3.017 * S + −12.960 | for | 4.833 < S < 6.667 |

| Post Height< | | |
|---|---|---|
| −12.356 * S + 89.531 | for | 5.556 < S < 6.667 |
| −4.551 * S + 46.170 | for | 3.175 < S < 5.556 |
| 3.850 * S + 19.496 | for | 1.502 < S < 3.175 |
| 19.751 * S + −4.387 | for | 0.264 < S < 1.502 |

16. An electric machine comprising:
a stator having an array of electromagnetic elements;
a rotor mounted on bearings, the rotor having an array of rotor posts, each of the rotor posts having a length defining opposed ends and the array of rotor posts extending along the rotor in a direction perpendicular to the length of each of the rotor posts, and the rotor having electromagnetic elements defining magnetic poles placed between the plurality of rotor posts;
an airgap being formed between the rotor and the stator when the stator and the rotor are in an operational position; and
a plurality of rotor flux restrictors being formed on the rotor, each of the plurality of rotor flux restrictors each lying adjacent to one of the opposed ends of the rotor posts,
wherein the stator further comprises stator posts that form the electromagnetic elements of the stator, with slots between the stator posts, one or more electric conductors in each slot, the posts of the stator having a post height in mm, the stator and rotor together defining a size of the electric machine, the magnetic poles have a pole pitch S in mm, the size of the electric machine, pole pitch and post height being selected to fall within a region in a space defined by size, pole pitch and post height, the region being defined by either
1) a first union of:
a) a first surface defined by a first set of inequalities for a first size of electric machine;
b) a second surface defined by a second set of inequalities for a second size of electric machine; and
c) a set defined as containing all points lying on line segments having a first end point on the first surface and a second end point on the second surface;
the first set of inequalities and the second set of inequalities being respectively sets of inequalities A and B, or B and C, or C and D, in which the group of inequalities A is for a size of 25 mm, the group of inequalities B is for a size of 50 mm, the group of inequalities C is for a size of 100 mm, the group of inequalities D is for a size of 200 mm; or
2) a second union of a surface as defined by set of inequalities D and a corresponding set of all points with size greater than the surface but with pole pitch and post height corresponding to points within the surface;
where
A is selected from the group of sets of inequalities consisting of:
Set A1:

| Post Height > | | |
|---|---|---|
| −1.070 * S + 2.002 | for | 0.572 < S < 1.189 |
| 1.175 * S + −0.667 | for | 1.189 < S < 2.269 |
| 13.502 * S − 28.637 | for | 2.269 < S < 2.500 |

| Post Height < | | |
|---|---|---|
| −5.898 * S + 19.863 | for | 1.970 < S < 2.500 |
| 0.229 * S + 7.794 | for | 1.349 < S < 1.970 |
| 7.607 * S − 2.160 | for | 0.723 < S < 1.349 |
| 11.430 * S − 4.924 | for | 0.572 < S < 0.723 |

Set A2:

| Post Height > | | |
|---|---|---|
| −1.340 * S + 302.305 | for | 0.619 < S < 1.120 |
| 1.100 * S − 0.429 | for | 1.120 < S < 2.074 |
| 3.830 * S − 6.082 | for | 2.074 < S < 2.269 |

| Post Height < | | |
|---|---|---|
| −69.510 * S + 160.318 | for | 2.222 < S < 2.269 |
| −3.430 * S + 13.492 | for | 1.667 < S < 2.222 |
| 2.830 * S + 3.056 | for | 1.133 < S < 1.667 |
| 8.650 * S − 3.545 | for | 0.619 < S < 1.133 |

Set A3:

| | | |
|---|---|---|
| Post Height > | | |
| −4.160 * S + 5.032 | for | 0.723 < S < 0.967 |
| 0.839 * S + 0.198 | for | 0.967 < S < 1.692 |
| 2.713 * S − 2.973 | for | 1.692 < S < 1.939 |
| Post Height < | | |
| −53.233 * S + 105.506 | for | 1.879 < S < 1.939 |
| −1.406 * S + 8.122 | for | 1.465 < S < 1.879 |
| 3.898 * S + 0.353 | for | 1.035 < S < 1.465 |
| 7.535 * S − 3.412 | for | 0.723 < S < 1.035 |

B is selected from the group of sets of inequalities consisting of:

Set B1:

| | | |
|---|---|---|
| Post Height > | | |
| 0.254 * S + 0.462 | for | 0.319 < S < 3.667 |
| 2.665 * S + −8.380 | for | 3.667 < S < 5.000 |
| Post Height < | | |
| −18.282 * S + 96.357 | for | 4.500 < S < 5.000 |
| −4.663 * S + 35.071 | for | 2.738 < S < 4.500 |
| 2.585 * S + 15.227 | for | 1.447 < S < 2.738 |
| 16.013 * S − 4.204 | for | 0.319 < S < 1.447 |

Set B2:

| | | |
|---|---|---|
| Post Height > | | |
| 0.269 * S + 0.456 | for | 0.380 < S < 3.016 |
| 3.051 * S − 7.936 | for | 3.016 < S < 4.167 |
| Post Height < | | |
| −14.766 * S + 66.309 | for | 3.667 < S < 4.167 |
| −3.952 * S + 26.654 | for | 2.315 < S < 3.667 |
| 3.108 * S + 10.310 | for | 1.278 < S < 2.315 |
| 14.542 * S − 4.303 | for | 0.389 < S < 1.278 |
| 88.444 * S − 33.051 | for | 0.380 < S < 0.389 |

Set B3:

| | | |
|---|---|---|
| Post Height > | | |
| 0.191 * S + 0.626 | for | 0.472 < S < 2.181 |
| 2.135 * S − 3.613 | for | 2.181 < S < 3.095 |
| 53.475 * S − 162.511 | for | 3.095 < S < 3.175 |
| Post Height < | | |
| −5.095 * S + 23.450 | for | 2.222 < S < 3.175 |
| 0.805 * S + 10.339 | for | 1.381 < S < 2.222 |
| 10.251 * S − 2.706 | for | 0.572 < S < 1.381 |
| 24.420 * S − 10.810 | for | 0.472 < S < 0.572 |

C is selected from the group of sets of inequalities consisting of:

Set C1:

| | | |
|---|---|---|
| Post Height > | | |
| 0.322 * S + 0.359 | for | 0.233 < S < 6.667 |
| 2.202 * S − 12.179 | for | 6.667 < S < 8.333 |
| Post Height < | | |
| −25.555 * S + 219.122 | for | 7.778 < S < 8.333 |
| −5.585 * S + 63.794 | for | 4.000 < S < 7.778 |
| 3.214 * S + 28.600 | for | 1.793 < S < 4.000 |
| 21.749 * S − 4.633 | for | 0.233 < S < 1.793 |

Set C2:

| | | |
|---|---|---|
| Post Height < | | |
| 0.277 * S + 0.593 | for | 0.250 < S < 5.182 |
| 2.342 * S − 10.111 | for | 5.182 < S < 7.222 |
| Post Height > | | |
| −13.149 * S + 101.763 | for | 6.111 < S < 7.222 |
| −4.885 * S + 51.265 | for | 3.333 < S < 6.111 |
| 4.291 * S + 20.680 | for | 1.520 < S < 3.333 |
| 20.788 * S − 4.395 | for | 0.251 < S < 1.520 |
| 161.000 * S − 39.588 | for | 0.250 < S < 0.251 |

Set C3:

| | | |
|---|---|---|
| Post Height < | | |
| 0.277 * S + 0.591 | for | 0.278 < S < 4.425 |
| 1.916 * S − 6.663 | for | 4.425 < S < 6.111 |
| Post Height > | | |
| −21.337 * S + 135.438 | for | 5.556 < S < 6.111 |
| −4.985 * S + 44.588 | for | 3.175 < S < 5.556 |
| 2.749 * S + 20.031 | for | 1.560 < S < 3.175 |
| 18.321 * S − 4.260 | for | 0.278 < S < 1.560 | and
D is selected from the group of sets of inequalities consisting of:

Set D1:

| | | |
|---|---|---|
| Post Height < | | |
| 0.257 * S + 0.327 | for | 0.208 < S < 7.778 |
| 1.977 * S − 13.044 | for | 7.778 < S < 9.444 |
| Post Height > | | |
| −36.195 * S + 47.445 | for | 8.889 < S < 9.444 |
| −5.777 * S + 77.062 | for | 4.833 < S < 8.889 |
| 1.950 * S + 39.718 | for | 2.222 < S < 4.833 |
| 20.301 * S + −1.058 | for | 0.389 < S < 2.222 |
| 34.481 * S − 6.574 | for | 0.208 < S < 0.389 |

Set D2:

| | | |
|---|---|---|
| Post Height < | | |
| 0.322 * S + 0.359 | for | 0.233 < S < 6.667 |
| 2.202 * S + −12.179 | for | 6.667 < S < 8.333 |
| Post Height > | | |
| −25.555 * S + 219.122 | for | 7.778 < S < 8.333 |
| −5.585 * S + 63.794 | for | 4.000 < S < 7.778 |
| 3.214 * S + 28.600 | for | 1.793 < S < 4.000 |
| 21.749 * S + −4.633 | for | 0.233 < S < 1.793 |

Set D3:

| | | |
|---|---|---|
| Post Height < | | |
| 0.212 * S + 0.600 | for | 0.264 < S < 4.833 |
| 3.017 * S + −12.960 | for | 4.833 < S < 6.667 |

-continued

| Post Height > | | |
|---|---|---|
| −12.356 * S + 89.531 | for | 5.556 < S < 6.667 |
| −4.551 * S + 46.170 | for | 3.175 < S < 5.556 |
| 3.850 * S + 19.496 | for | 1.502 < S < 3.175 |
| 19.751 * S + −4.387 | for | 0.264 < S < 1.502 |

* * * * *